US010891294B1

(12) United States Patent
Bong et al.

(10) Patent No.: US 10,891,294 B1
(45) Date of Patent: Jan. 12, 2021

(54) AUTOMATICALLY MIGRATING COMPUTER CONTENT

(71) Applicant: AuditFile, Inc., Walnut Creek, CA (US)

(72) Inventors: Steven Riley Bong, San Francisco, CA (US); Gary Jude Bong, Walnut Creek, CA (US); Kevin Richard Bong, Walnut Creek, CA (US)

(73) Assignee: AuditFile, Inc., Walnut Creek, CA (US)

( * ) Notice: Subject to any disclaimer, the term of this patent is extended or adjusted under 35 U.S.C. 154(b) by 131 days.

(21) Appl. No.: 15/709,311

(22) Filed: Sep. 19, 2017

Related U.S. Application Data

(63) Continuation-in-part of application No. 14/338,260, filed on Jul. 22, 2014, now abandoned, and a
(Continued)

(51) Int. Cl.
*G06F 16/2457* (2019.01)
*G06Q 10/06* (2012.01)
(Continued)

(52) U.S. Cl.
CPC .... *G06F 16/24573* (2019.01); *G06F 16/1873* (2019.01); *G06F 16/9535* (2019.01);
(Continued)

(58) Field of Classification Search
CPC ......... G06F 16/24573; G06F 161/1873; G06F 16/9535; G06F 17/00; G06Q 10/06375; G06Q 40/12; G06Q 40/10
(Continued)

(56) References Cited

U.S. PATENT DOCUMENTS 7,899,693 B2   3/2011   King
8,566,130 B2   10/2013  Kramer
(Continued)

OTHER PUBLICATIONS

C. J. Van Rijsbergen. Information Retrieval. London: Butterworths. ISBN 3-642-12274-4. (1979).
(Continued)

*Primary Examiner* — Luna Champagne
(74) *Attorney, Agent, or Firm* — Van Pelt, Yi & James LLP

(57) ABSTRACT

A user provided content provided via the Internet is identified. The user provided content belongs to a previous version content item of a content page accessible via the Internet. A previous version content item identifier for the previous version content item is generated including by combining a content from a title of the previous version content item and a content from a description text of the previous version content item. A new version content item identifier for each content item of a plurality of content items belonging to a new version of the content page are generated, including by combining a content from a title of the corresponding content item belonging to the new version and a content from a description text of the corresponding content item belonging to the new version. Measures of similarity between the previous version content item identifier and each of the new version content item identifiers are calculated. The calculated measures of similarity are used to identify which of the new version content item identifiers most closely matches the previous version content item identifier. It is determined whether the calculated measure similarity corresponding to the most closely matched new version content item identifier meets a threshold. In the event the calculated measure similarity corresponding to the most closely matched new version content item identifier meets the threshold, the user provided content is identified
(Continued)

for automatic migration to the new version's content item corresponding to the most closely matched new version content item identifier.

17 Claims, 40 Drawing Sheets

Related U.S. Application Data continuation-in-part of application No. 14/550,393, filed on Nov. 21, 2014, now abandoned.

(51) Int. Cl.
*G06F 16/18* (2019.01)
*G06F 16/9535* (2019.01)
*G06F 17/00* (2019.01)
*G06Q 40/00* (2012.01)

(52) U.S. Cl.
CPC ....... *G06Q 10/06375* (2013.01); *G06Q 40/10* (2013.01); *G06Q 40/12* (2013.12)

(58) Field of Classification Search
USPC .......................................................... 705/51
See application file for complete search history.

(56) References Cited

U.S. PATENT DOCUMENTS

| | | | |
|---|---|---|---|
| 9,430,801 B2 | 8/2016 | Bhatt | |
| 2001/0034611 A1 | 10/2001 | Ooya | |
| 2004/0002973 A1* | 1/2004 | Chaudhuri | ........ G06F 16/24578 |
| 2005/0165782 A1 | 7/2005 | Yamamoto | |
| 2005/0240467 A1 | 10/2005 | Eckart | |
| 2006/0106686 A1 | 5/2006 | King | |
| 2007/0106705 A1 | 5/2007 | Chalana | |
| 2007/0179858 A1* | 8/2007 | Jennings | ................ G06Q 30/06 705/51 |
| 2011/0184776 A1 | 7/2011 | Spradling | |
| 2011/0314365 A1 | 12/2011 | Messerly | |
| 2013/0046573 A1 | 2/2013 | Zubizarreta | |
| 2013/0097157 A1* | 4/2013 | Ng | ........................ G06F 16/248 707/723 |
| 2013/0110686 A1 | 5/2013 | Berrington | |
| 2013/0212455 A1 | 8/2013 | Titera | |
| 2014/0095363 A1* | 4/2014 | Caldwell | ................ G06Q 20/10 705/35 |
| 2015/0046804 A1 | 2/2015 | Weksler | |
| 2015/0100594 A1 | 4/2015 | Hess | |
| 2015/0199352 A1 | 7/2015 | Bush | |

OTHER PUBLICATIONS

Cohen et al., "A comparison of string distance metrics for matching names and records". KDD Workshop on Data Cleaning and Object Consolidation. 3: 738. 2003.

G. Navarro. A Guided Tour to Approximate String Matching. ACM Computing Surveys 33 (1): 3188. doi:10.1145 / 375360.375365. (2001).

Murguta et al., Estimating the effect of the similarity coefficient and the cluster algorithm biogeographic classifications. Ann. Bot. Fennici, 40: 415-421. (2003).

Winkler, W. E. "Overview of Record Linkage and Current Research Directions". Research Report Series, RRS. 2006.

Winkler, W. E. "String Comparator Metrics and Enhanced Decision Rules in the Fellegi-Sunter Model of Record Linkage". Proceedings of the Section on Survey Research Methods. American Statistical Association: 354359. 1990.

\* cited by examiner

Step 1/3

CREATE AN ENGAGEMENT

Project Name:

Next Year's Audit

For Year End:

12/31/2017

Due Date:                          Engagement Fee:

09/06/2018                          9000

File lock deadline (days)

60

Rollforward from another audit?

No

If you select "Yes", you will configure rollforward options on step 2.

[ Cancel ]  [ Next ]

AUTOMATICALLY MIGRATING COMPUTER CONTENT

CROSS REFERENCE TO OTHER APPLICATIONS

This application is a continuation-in-part of co-pending U.S. patent application Ser. No. 14/338,260 entitled AUTOMATIC TAGGING OF TRIAL BALANCE filed Jul. 22, 2014 and is a continuation-in-part of co-pending U.S. patent application Ser. No. 14/550,393 entitled TRACKING AUDIT PROGRESS filed Nov. 21, 2014, both of which are incorporated herein by reference for all purposes.

BACKGROUND OF THE INVENTION

A user is often able to interact with published online content available via the Internet by posting user content. For example, a user is able to post comments regarding published online content. However, when the online content is migrated to a new system/platform or changed to a new version, often the user provided content for the prior version of the published content is lost or treated as not relevant. However, the user provided content for the prior version may still be applicable to the new version. Manually migrating user provided content to the new version or requiring users to post user content again for the new version is inefficient and impractical in many circumstances.

BRIEF DESCRIPTION OF THE DRAWINGS

Various embodiments of the invention are disclosed in the following detailed description and the accompanying drawings.

FIG. 13C is a diagram illustrating an embodiment of a user interface for providing a verification of identified leadsheets associated with accounts of a trial balance.

FIG. 13D is a diagram illustrating an embodiment of a user interface for managing leadsheets.

DETAILED DESCRIPTION

Figure 1:
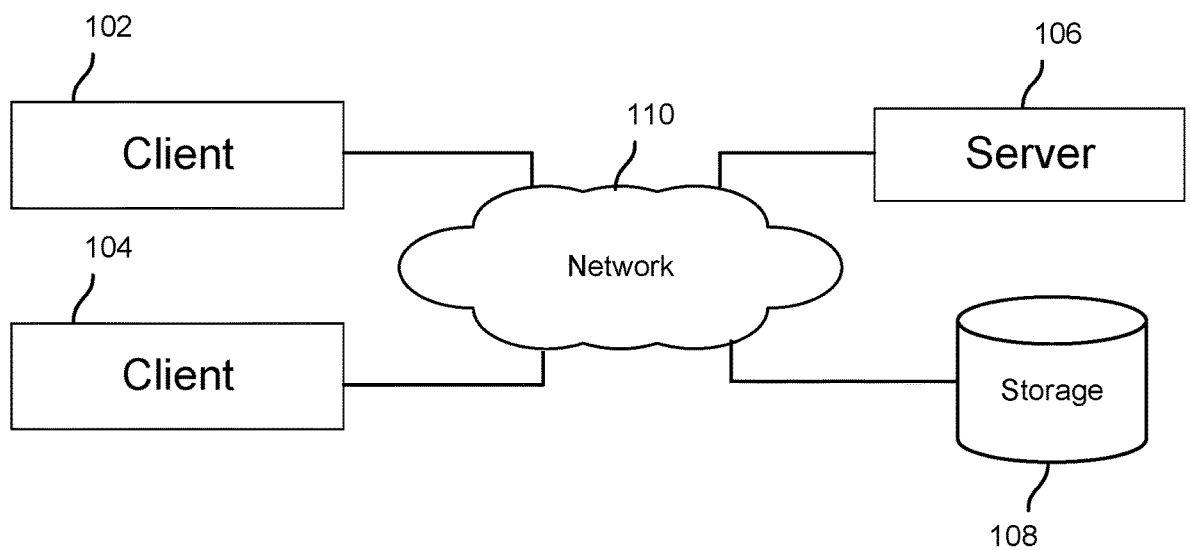
FIG. 1 is a block diagram illustrating an embodiment of an audit processing environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, a user provided content provided via the Internet is identified. The user provided content belongs to a previous version content item of a content page (e.g., published online content) accessible via the Internet. Examples of the user provided content include a text comment, a computer file, a numerical entry, an option selection, or any other content or indication provided by a user that may be migrated to applicable content items in a new version of the content page. An example of the content item is a section item (e.g., including a title and body content) of hierarchically organized content (e.g., content page with a plurality of items of title and body content). The previous version content item may correspond a new version of the content item included in a related, new or next content page. It may be desirable to automatically identify any related new version of the content item to automatically migrate (e.g., roll-forward) the user provided content to the new version of the content item.

A previous version content item identifier for the previous version content item is generated including by combining a content from a title of the previous version content item and a content from a description text the previous version content item. For example, at least portions of the title and text body content of the previous version content item are combined together into a single string of characters and reformatted to a standardized format. A new version content item identifier for each content item of a plurality of content items belonging to a new version of the content page are generated including by combining a content from a title of the corresponding content item belonging to the new version and a content from a description text of the corresponding content item belonging to the new version. For example, at least portions of the title and text body content of the new version content item are combined together into a single string of characters and reformatted to the standardized format.

Measures of similarity between the previous version content item identifier and each of the new version content item identifiers are calculated. The calculated measures of similarity are used to identify which of the new version content item identifiers most closely matches the previous version content item identifier. For example, a highest measure of similarity value is identified and the new version content item identifier corresponding to this highest measure of similarity value is selected as the new version content item identifier most closely matching the previous version content item identifier. It is determined whether the calculated measure similarity corresponding to the most closely matched new version content item identifier meets a threshold. For example, if the most closely matched new version content item identifier is not similar enough to the previous version content item identifier, it is determined that the most closely matched new version content item identifier does not correspond to the previous version content item identifier and the associated user provided content is not to be automatically migrated. In the event the calculated measure similarity corresponding to the most closely matched new version content item identifier meets the threshold, the user provided content is identified for automatic migration to the new version's content item corresponding to the most closely matched new version content item identifier. For example, text comment or a computer file included in the user provided content is to be copied from the previous version content item to the corresponding new version's content item and shown on the new version of the content page as being associated with corresponding the new version's content item.

In some embodiments, the user provided content is migrated (e.g., rolled-forward) from one version of online Internet accessible content representing one audit to another version of online content representing a different audit. For example, an audit is independent examination of records, controls, and documents for a point in time or a period of time. There are many types of audits, including financial statement audits, internal audits, and information technology audits. Auditors may use information found in another audit's file to assist with audit preparation. This process is called "roll-forward" and typically is done manually. However, when using a cloud based and online tool accessible via webpages to help manage and track the audit process, automatically and correctly preforming the roll-forward improves the efficiently of digitally managing and tracking the audit.

In some embodiments, to begin an audit, an auditor creates an audit file in the online tool. In this file, the auditor will start with an audit program, (e.g., helps manage a checklist of procedures to perform the audit). These procedures are tailored to the auditee's type of organization. For example, the audit of retailer will be more concerned with inventory than the audit of a pension plan. These procedures can be written by the auditors themselves, be purchased from a commercial provider of audit literature, or come from government and regulatory organizations. An audit may also involve a mix of literature from different sources. These audit programs may vary from year to year with either small or large changes, for various reasons. An example resulting in a small change is the correction of a typographical error. An example resulting in a large change is a change in laws or regulations. Also, during the planning of an audit, the auditor will customize the audit program even further by creating new procedures to further tailor the audit program to the auditee.

To perform the audit, the auditor completes the procedures found in the audit program. Sometimes, an auditor will attach workpapers and comments to a procedure as supporting documentation. In the case of a financial statement audit, the auditor will usually build a trial balance. A trial balance is a summary at a point in time of all general ledger accounts. It contains the account name, account number, and the current balance. The auditor will assign each account to a leadsheet. A leadsheet is a grouping used by auditors to group accounts to financial statement categories. Auditors may choose to use standard leadsheets, such as Cash or Accounts Receivable, or they may elect to create additional custom leadsheet. For example, if a company has three separate bank accounts, the auditor will group these together on the Cash leadsheet.

In some embodiments, information found in one audit file is automatically rolled-forward/migrated to assist with another audit file preparation. Certain information will be copied changed from the previous year's audit. Other information may need to be changed and some will be discarded. The process of roll-forward must be performed with the utmost care, as it can create the risk that the auditor forgets to update the information properly. In some embodiments, the information considered in a roll-forward consists of procedures added to an audit program, workpapers, and comments on a procedure. Trial balance information may also be included in the roll-forward, which includes leadsheets and account information—including account numbers, names, and balances.

Examples of the workpaper include a computer file, a document, a spreadsheet, an image, a form, a web form, a webpage, a letter, a communication, a checklist, a comment, and any other content associated with an audit. Workpapers may be used as documentary evidence of audit testing, discussions, and observations. For example, a workpaper may document the planning, performance, and/or review of audit work. In another example, a workpaper may provide support for audit communication such as observations, conclusions, and the final report. In another example, a workpaper may facilitate third-party reviews and re-performance requirements. In another example, a workpaper may provide a basis for evaluating the internal audit activity's quality control program.

FIG. 1 is a block diagram illustrating an embodiment of an audit processing environment. Client device 102 and client device 104 are connected to server 106 via network 110. Server 106 stores content on storage 108 via network 110. In other embodiments, rather than being connected to network 110, storage 108 is directly connected to server 106 and/or a part of a different network. Examples of client device 102 and 104 include a personal computer, a desktop computer, an electronic reader, a laptop computer, a smartphone, a tablet computer, a mobile device, a wearable device, a wearable computer, and any other computer or electronic device. A user may utilize either device 102 or device 104 to access server 106. For example, a user may access a financial audit software service provided by server 106 via a web browser of a personal computer or a mobile application of a mobile device. Server 106 provides an audit software solution. For example, server 106 provides a network cloud-based service to manage, track, and perform a financial audit. Server 106 stores user data in storage 108. For example, server 106 stores financial information, audit data, and other related information of one or more users in storage 108. Examples of storage 108 include a storage drive, a networked storage, a database, or any other form of data storage.

In one example, the user of client device 102 utilizes device 102 to access, via network 110, a webpage provided by server 106. The user provides login information on the webpage and server 106 provides access to financial audit information and services accessible by the user. The user of one or more client devices may provide financial data of an audit subject and server 106 processes the provided information to automatically recognize and parse the provided financial data for use in an audit. For example, user provided information is parsed and placed in an internal data structure of server 106 (e.g., in a data structure stored in storage 108) for use in electronically tracking, managing, and performing a financial audit. The user of one or more client devices may also provide workpapers of an audit subject and server 106 handles and manages the provided workpapers of an audit of the audit subject. The user that provides the financial data and/or workpapers may be an auditor or a representative of the audit subject. For example, an accounting department representative of the audit subject may be provided one type of login credentials to provide data and documents to be utilized during the audit to server 106 and an auditor user utilizes a different type of login credential to perform the audit using server 106 (e.g., view, manage, document, and track the provided information in performing the audit). Audit workpapers received via network 110 at server 106 may be stored in storage 108. For example, all workpapers of an audit are stored in a common storage area of storage 108.

In some embodiments, when a workpaper stored by server 106 is requested by a user of client device 102, server 106 retrieves the requested workpaper from storage 108 and provides the requested workpaper via network 110 to client device 102. The workpaper may be provided as a computer file and/or provided as a rendering of the workpaper. For example, a requested workpaper is rendered via a webpage provided by server 106. Server 106 may provide tools and other programs to view, edit, modify, update, and/or save a workpaper. For example, a network cloud-based word processing capability to directly edit and save a workpaper via a network web interface is provided by server 106.

In some embodiments, server 106 determines a completion progress of an audit. For example, an audit managed by an audit management solution provided by server 106 to a user of client device 102 automatically tracks and provides an indication of a completion progress of the managed audit. The completion progress may track completion of tasks of each audit procedure of the audit (e.g., track completion of signoffs for audit procedures). For example, utilizing a web interface provided by server 106, a user of client device 102 is able to manage audit procedures of the audit by marking a signoff of a task of each audit procedure as being completed when the task has been completed. The marked completion of the tasks is automatically tallied to automatically determine the progress of the audit. In some embodiments, server 106 provides an automatically determined completion progress of an audit to client device 102 on a web interface provided by server 106. For example, a progress bar that indicates the completion progress of an audit is visually provided on a webpage.

Examples of network 110 include one or more of the following: a direct or indirect physical communication connection, mobile communication network, a cellular network, a wireless network, Internet, intranet, Local Area Network, Wide Area Network, Storage Area Network, and any other form of connecting two or more systems, components, or storage devices together. In various embodiments, the components shown in FIG. 1 may exist in various combinations of hardware machines. For example, server 106 and storage 108 may be included in the same physical device. Other communication paths may exist and the example of FIG. 1 has been simplified to illustrate the example clearly. For example, server 106 and storage 108 are directly connected. Although single instances of components have been shown to simplify the diagram, additional instances of any of the components shown in FIG. 1 may exist. For example, server 106 may represent a group of servers and storage 108 may represent a storage cluster. Although two client devices 102 and 104 are shown, other client devices that belong to the same or different user of client devices 102 and 104 may exist. Components not shown in FIG. 1 may also exist to perform and provide functions and services described in this document.

Figure 2:
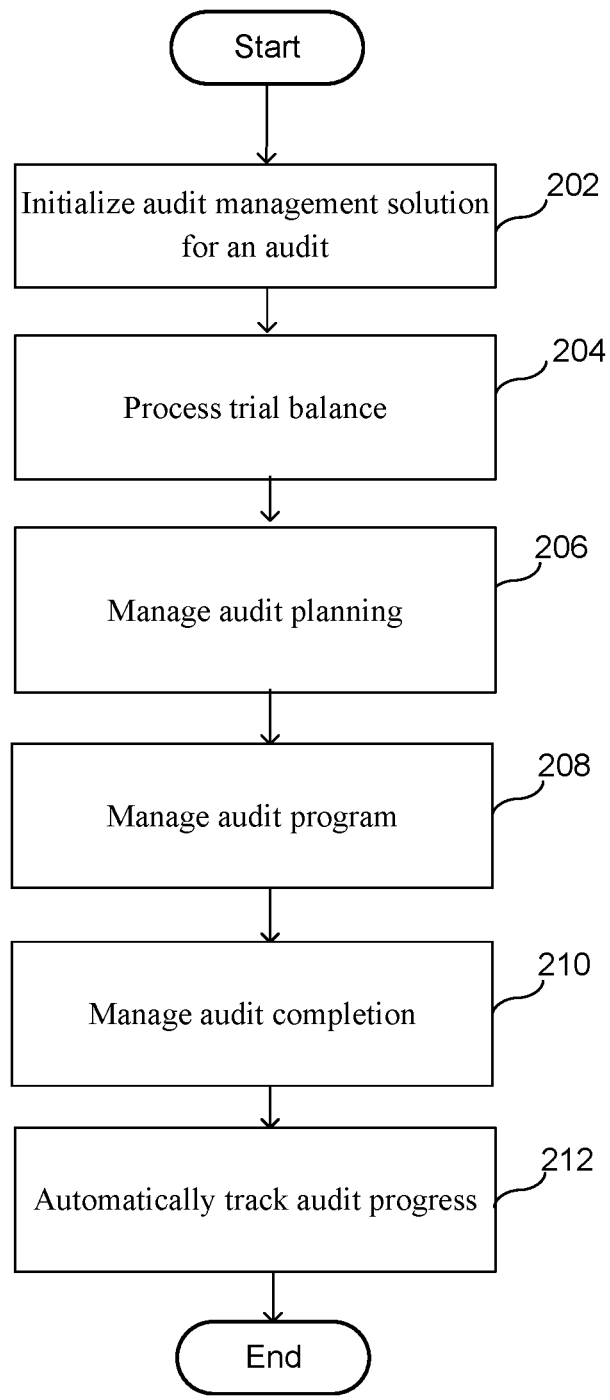
FIG. 2 is a flowchart illustrating an embodiment of a process for managing an audit.

FIG. 2 is a flowchart illustrating an embodiment of a process for managing an audit. The process of FIG. 2 may be implemented on server 106 of FIG. 1.

At 202, an audit management solution for an audit is initialized. In some embodiments, initializing the audit management solution includes setting up a network cloud-based audit management solution. For example, user accounts of users that will have access to the audit are set up and initialized. Each user account may be configured to have different types of access privileges and/or functions. For example, when initializing an auditor engagement team that will be provided access privileges to an audit, an assigned role type (e.g., partner, manager, staff) with associated access/modification privileges and authorized audit procedure sign-off privilege (e.g., privilege to sign off audit procedure as prepared, reviewed, technical reviewed, etc.) may be assigned for each user included in the engagement team. In some embodiments, a representative of an audit subject may be provided a user account that allows the representative to provide information, documents, and files for the audit. For example, the representative is provided user account credentials that allow the representative to log in to a web interface of a server to provide financial information and/or other documentation and files of the audit as well as obtain information (e.g., financial statement, engagement letter, management letter, audit report, board letter, disclosures, surveys, certifications, etc.) via the web interface to remotely provide and access desired information. In some embodiments, initializing the audit management solution includes specifying the audit configuration such as an audit client, an audit name, time period to be audited, audit engagement type (e.g., audit, review, compilation, etc.), financial year end information, fee information, due date, etc.

In some embodiments, initializing the audit management solution includes providing/uploading files to be utilized in the initialized audit to be managed into a general repository of files. Files may be uploaded and saved on a networked storage location associated with the audit for use later while performing the audit. For example, an audit subject has provided computer files that may be useful as workpapers of the audit and the computer files are uploaded to the server of the audit management solution for safekeeping. Because these file have not been analyzed for use in the audit, each individual file does not have to be assigned a specific role in the audit. For example, a file in the general repository may be later assigned to one or more specific audit procedures as a workpaper of the audit procedure(s). The provided may be encrypted before being stored. A user may provide/upload content to the general repository anytime while the audit is active.

At 204, the trial balance is processed. When performing a financial audit, an auditor reviews financial accounts of an audit subject and performs procedures to ensure that financial records of the audit subject are accurate. A trial balance may include a list of accounts of a subject. Often the trial balance includes a listing of account name, account number, current year account balance, previous year account balance, and a debit balance value or a credit balance value (e.g., part of double-entry bookkeeping). The trial balance may be used by an accountant to ensure that the total of all credits balances with the total of all debits in preparation of financial statements. When performing the audit of the audit subject, software tools may be utilized to track accounts of the audit subject. However, the software tool often requires a trial balance to be inputted to the software in a specific format predetermined by the software tool. Because each accountant may track and prepare trial balance information in various formats convenient to the accountant, the trial balance of the audit subject must be often manually converted by the accountant or an auditor to the specific format of the software tool to allow the software tool to input the trial balance information. This manual conversion process is often laborious (e.g., trial balance may contain hundreds of entries) and error prone.

In some embodiments, a trial balance is automatically tagged. In some embodiments, a trial balance is received in a user specific format. For example, a user provides a spreadsheet file of trial balance information formatted in a format desired by the user. Items in the trial balance are tested to identify a first item that likely corresponds to a first data grouping of a first data subset of the trial balance. For example, contents of a user provided spreadsheet with trial balance information are compared against a predetermined list of data classification/type identifiers to identify a column label that identifies content type (e.g., identify account name column, account number column, account balance column, etc.) of a particular column of the spreadsheet. Items in the trial balance are tested to also identify a second item that likely corresponds to a second data grouping of a second data subset of the trial balance. For example, another column label that identifies another content type in another particular column of the spreadsheet is identified. The first data grouping is displayed along with at least a portion of the first data grouping and the second data grouping is displayed along with at least a portion of the second data grouping. For example, a user is provided information that labels/tags portions (e.g., columns) of the trial balance with automatically identified data type column identifiers. If an automatically identified data grouping identifier has been incorrectly identified, a user may be able to correct the error by providing a correct data grouping identifier of an associated data grouping of the trial balance.

In various embodiments, an audit includes procedures to be performed. Each procedure may be performed and reviewed by one or more auditors/reviewers. For example, once an audit procedure has been initially completed, the procedure may be marked/signed off as prepared. Then a higher level reviewer may review the prepared procedure and mark/signoff the procedure as reviewed. Other reviewers such as an expert technical reviewer may further perform/review the procedure and mark/signoff the procedure as a special reviewed (e.g., technical reviewed, tax reviewed, etc.). Thus performing an audit procedure may involve various signoff stages (e.g., prepared, reviewed, special reviewed, etc.) of action/task and an audit management solution may be utilized to plan, list, track, and otherwise manage the audit and its procedures. The audit procedure may include action/tasks to be performed. In some embodiments, an online audit management solution represents each audit procedure as a program object. For example, each audit procedure is provided as a webpage object that a user (e.g., auditor) is able to dynamically interact with to complete, track, and review the audit procedure. The audit procedure program object may be stored in a storage such as a database object of storage 108 of FIG. 1. Using the audit procedure program object, a user may store and associate answers to questions, data forms, checklists, a comment, and/or a workpaper (e.g., computer file) with the audit procedure. In various embodiments, an audit procedure program object may include one or more of the following: a description of the audit procedure, an identifier of a grouping of the audit procedure, an identifier of a category of the audit procedure, an identifier of the audit procedure, questions and associated user responses, data forms, a checklist, a comment, a workpaper, and other user provided data associated with the audit procedure.

In some embodiments, procedures of an audit may be categorized into audit procedure categories. For example, each category of audit procedures may include one or more audit procedures. In some embodiments, all procedures of a single audit procedure category are configured to require the same types of tasks/reviews/signoffs to be performed to complete an audit procedure. For example, types of tasks/ reviews/signoffs (e.g., signoffs as prepared, reviewed, special reviewed, etc.) required to be performed for each audit procedure to complete the audit procedure are configured on a per audit procedure category basis rather than an individual audit procedure basis. In some embodiments, audit procedures are grouped into audit procedure groupings. For example, audit procedure categories are grouped into one or more audit procedure groupings and by association, the audit procedures of an audit procedure category belong to the larger audit procedure grouping. In some embodiments, there exists at least three audit procedure groupings. For example, the three audit procedure groupings include audit planning, audit program, and audit completion of audit procedure groupings (e.g., corresponding audit stages).

At 206, audit planning is managed. In some embodiments, managing the audit planning includes performing and tracking procedures to plan an audit (e.g., financial audit). For example, in managing each procedure of an audit planning procedure grouping, a networked audit management interface (e.g., audit management webpage interface provided by server 106 of FIG. 1) lists and provides a description of the audit procedure and a user is able to utilize the interface to organize and track completion of the procedure (e.g., mark as prepared, reviewed, etc.), as well as comment and associate digital workpapers to the audit procedure.

In various embodiments, managing audit planning includes managing one or more of the following (e.g., each item corresponds to an audit procedure and/or audit procedure category of an audit planning procedure grouping):

Client acceptance (e.g., verify that a client subject of the audit is ethical, the client subject has paid prior due fees, and that performing the audit of the client will not create a conflict of interest with the auditors performing the audit)

Engagement letter (e.g., preparing, obtaining, and storing an engagement letter)

Internal audit (e.g., review prior audits, inquire with predecessor auditor, etc.)

Fraud risk (e.g., assess fraud risk of audit subject)

Team meeting (e.g., document audit team meeting minutes)

Budget (e.g., prepare and upload a budget)

Permanent files (e.g., upload permanent files such as bylaws, leases, contracts, etc.)

Next year notes (e.g., notes for use in subsequent audit)

Related party (e.g., discover and document related financial parties and related risks/procedures)

Minutes (e.g., upload meeting minutes of audit subject)

Materiality and Risk (e.g., determine and set materiality value for financials and risk level)

Statistics (e.g., review financial statistics and comment on financial ratios)

Estimates (e.g., test material estimates in financials and document results)

Preliminary analytical review (e.g., perform preliminary review and document items that are outside of expectations and the planned audit response to these items)

Prior year financial statements (e.g., upload copy of prior year financial statements)

Prior year tax returns (e.g., upload copy of prior year tax returns)

Internal control (e.g., document and evaluate internal control)

Confirmation tracking (e.g., prepare, review and track external confirmations in accordance with audit procedures planned)

At 208, the audit program is managed. In some embodiments, managing the audit program includes performing and tracking procedures in performing a substance of the audit. For example, in managing each procedure of an audit program procedure grouping, a networked audit management interface (e.g., audit management webpage interface provided by server 106 of FIG. 1) lists and provides a description of the audit procedure and a user is able to utilize the interface to organize and track completion of the procedure (e.g., mark as prepared, reviewed, etc.) as well as comment and associate digital workpapers to the procedure.

In various embodiments, managing the audit program includes planning, analytics, inquiry, documentation, confirmation, disclosure, fraud risk inquiry, calculation, and/or inspection of one or more of the following (e.g., each item corresponds to an audit program and/or audit procedure category of an audit program procedure grouping): Cash, Investments, Accounts Receivable, Inventory, PPE (property, plant, and equipment), Other Assets, Accounts Payable, Accrued Liabilities, Debt, Equity, Revenue, Other Income and Expense, Expenses, and Taxes.

At 210, audit completion is managed. In some embodiments, managing the audit completion includes performing and tracking procedures in finalizing the completion of the audit. For example, in managing each procedure of an audit completion procedure grouping, a networked audit management interface (e.g., audit management webpage interface provided by server 106 of FIG. 1) lists and provides a description of the audit procedures and a user is able to utilize the interface to organize and track completion of the procedure (e.g., mark as prepared, reviewed, etc.) as well as comment and associate digital workpapers to the procedure.

In various embodiments, managing audit completion includes uploading, inquiring, determining, performing, reviewing, obtaining, issuing, and/or generating one or more of the following (e.g., each item corresponds to an audit procedure and/or audit completion category of an audit completion procedure grouping): Subsequent Event Review, Going Concern Assessment, Journal Entry Testing, Final Analytical Review, Legal Letter, Representation Letter, Disclosure Checklist, Board Letter, Management Letter, Audit Report, Financial Statements, Financials, Final Supervision and Review, and Peer Auditor Review.

At 212, the audit progress is automatically tracked. In some embodiments, the tracking audit progress includes determining which review tasks/signoffs of audit procedures have been completed. For example, each audit procedure of the audit includes signoffs of various stages (e.g., prepared, reviewed, technical reviewed, tax reviewed, other special reviewed, etc.) that must be completed and a user may update a completion progress of stages of review in program objects corresponding to the audit procedures of the audit. In some embodiments, determination is made on which signoffs have been completed for which audit procedures and the progresses of the audit procedures are summed to determine various metrics of completion progresses. For example, completion metrics for each audit procedure review stage may be determined (e.g., percentage completion of audit procedure prepared stages). In some embodiments, completion metrics for various audit procedure tiers are determined. For example, separate completion percentages for each audit procedure category, each audit procedure category groupings, and the total audit procedure are determined. In some embodiments, the tracked and determined audit progress is provided to a user. For example, a user is provided an interactive visualization of the total progress of the audit being performed by the user. As the user performs and marks completion of the tasks/review stages of audit procedures using a network cloud-based audit management solution, the audit progress may be dynamically updated to indicate to the user the remaining and completed progress of the audit. The user may utilize the progress information to more precisely plan the completion of the audit.

Figure 3:
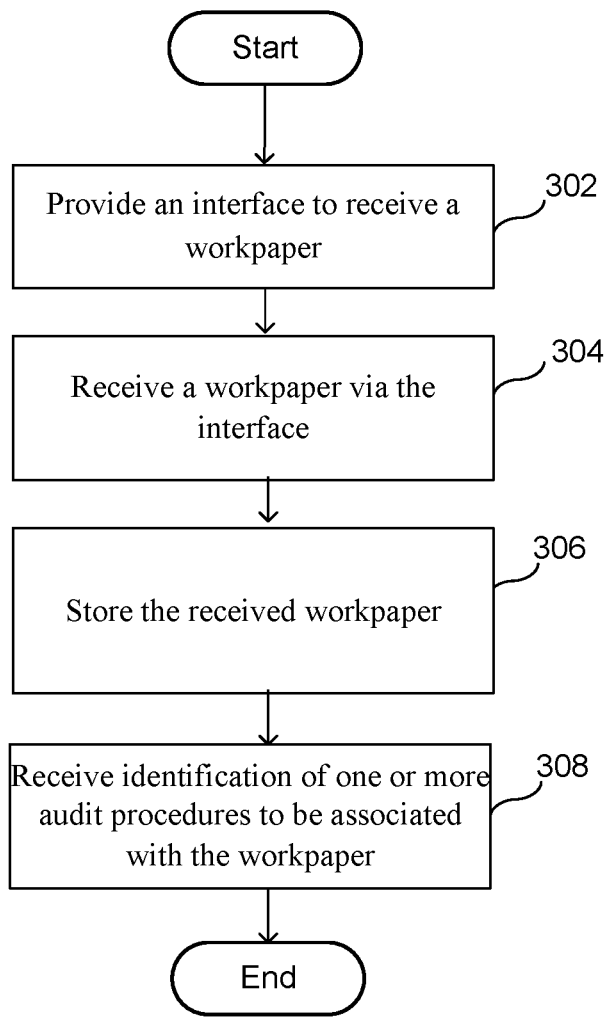
FIG. 3 is a flowchart illustrating an embodiment of a process for associating a workpaper with an audit procedure.

FIG. 3 is a flowchart illustrating an embodiment of a process for associating a workpaper with an audit procedure. The process of FIG. 3 may be implemented on server 106 of FIG. 1. In some embodiments, the process of FIG. 3 is included in 206, 208, and/or 210 of FIG. 2. For example, while managing an audit procedure, the process of FIG. 3 is used to receive and associate a workpaper with an audit procedure.

At 302, an interface to receive a workpaper is provided. For example, a web interface is provided to allow a user to upload a workpaper. The interface may be an interface specific to a particular audit procedure. For example, a provided webpage includes an interface that can be utilized to manage an audit procedure by allowing users to track that the audit procedure has been prepared, reviewed, and/or special reviewed as well as associate and store comments and workpapers for the specific audit procedure. This interface may be specific to a particular audit procedure and any workpaper provided via the interface specific to the particular audit procedure is only associated with the particular audit procedure. An example of a single audit procedure interface is shown in FIG. 4B.

In some embodiments, the provided interface is not specific to a single audit procedure. For example, a generic interface where a workpaper for any audit procedure may be provided for storage is provided. This may allow a user to provide a workpaper for storage on a server to be categorized and utilized at a later point in time. By providing a "sandbox" where workpapers for any procedure may be uploaded without initially requiring the user to associate the workpapers to specific audit procedures, a user may be able to quickly save workpapers remotely for later use and allow a third party user such as a representative of the audit subject to provide documents for use by auditors without providing the third party user full access to an audit management solution. In some embodiments, the provided generic interface provides a listing of all workpapers currently uploaded and saved on the network cloud for the audit. The listing may provide indication of which workpapers are associated with which specific audit procedures as well as identify those that are not currently associated with specific audit procedures. An example of the generic interface not specific to a single audit procedure is provided in FIG. 4A.

At 304, a workpaper is received via the interface. In some embodiments, receiving the workpaper includes receiving an indication of the workpaper. For example, a user drags and drops a computer file on the provided interface to provide that computer file as a workpaper. In another example, a user selects a user interface button to indicate that the user desires to provide a workpaper and the user is provided a dialog window/box that the user can use to navigate a file directory structure of a storage of the user to select the file to be provided as a workpaper. In another example, a user provides a directory path and file name of the workpaper to be provided. In some embodiments, the workpaper to be received is received from a networked storage. For example, a user selects a file stored on a third party cloud storage service to be provided as the workpaper. In some embodiments, receiving the workpaper includes receiving an indication of a web resource to be utilized as a workpaper. For example, the workpaper may include a link to a webpage and an identification of the link is received. In another example, the workpaper is a link to a web form, webpage, audit procedure program object, and/or other portion of the cloud-based audit management solution. In some embodiments, receiving the workpaper includes receiving the workpaper via a network connection. For example, a computer file indicated by a user is uploaded to a network storage of a cloud-based audit management solution.

At 306, the received workpaper is stored. In some embodiments, storing the workpaper includes storing the workpaper in a workpaper repository. For example, all received workpapers for an audit are stored in a common storage repository location (e.g., common file directory, common database, common data store, etc.). In some embodiments, storing the workpaper includes assigning a unique identifier to the workpaper. For example, a unique numeric identifier is generated for the workpaper. The unique identifier may be unique across a single audit, across all audits of the same audit subject, across all audits of a user organization (e.g., audit firm), and/or across all workpapers of an audit management solution. Assigning the unique identifier may include modifying or adding the unique identifier to a filename or other existing identifier of the workpaper. In some embodiments, storing the received workpaper includes storing the workpaper in a networked storage (e.g., storage 108 of FIG. 1). In some embodiments, storing the workpaper includes encrypting the workpaper before storing the workpaper.

At 308, an identification of one or more audit procedures to be associated with the workpaper is received. In some embodiments, a user identification of one or more audit procedures to be associated with the workpaper is received. For example, after the workpaper has been received and stored, a user accesses the interface (e.g., interface shown in FIG. 4A) at a later time when the user is ready to assign/categorize the workpaper as being associated with one or more identified audit procedures. In some embodiments, when the workpaper is associated with an audit procedure, the workpaper is accessible and displayed on an interface (e.g., webpage) utilized to manage the audit procedure. For example, when a user accesses a webpage interface to manage the audit procedure (e.g., to view the status of the procedure, mark the procedure as prepared, etc.) an identification of the associated workpaper(s) is displayed as being associated with the audit procedure. In some embodiments, the associating the workpaper with an audit procedure includes associating an identifier of the workpaper (e.g., unique identifier assigned to the workpaper) with a program object of the audit procedure. For example, a data structure (e.g., database, list, table, etc.) is modified to associate an identifier of a workpaper with an identifier of an audit procedure program object. In some embodiments when the workpaper is associated with a plurality of audit procedures, an update to the workpaper (e.g., re-upload of the workpaper) updates the workpaper for all of the associated audit procedures.

In some embodiments, the identification of one or more audit procedures to be associated with the workpaper is automatically determined within the context of an interface where the workpaper was provided. For example, a specific webpage (e.g., interface shown in FIG. 4B) utilized to manage an audit procedure is provided and a workpaper provided via the specific webpage is automatically associated with the specific audit procedure of the specific webpage without additional indication from a user that the indicated workpaper is to be associated with the specific audit procedure.

In some embodiments, the identification of one or more audit procedures to be associated with the workpaper is automatically determined by determining that a received workpaper is an update to an existing workpaper that has been previously received and associated with one or more audit procedures. For example, a received workpaper is analyzed to determine that this workpaper identifies a unique identifier that indicates the workpaper is to replace/update a previously received workpaper and the newly received workpaper is automatically associated with the audit procedure(s) of the previously received workpaper.

Figure 4A:
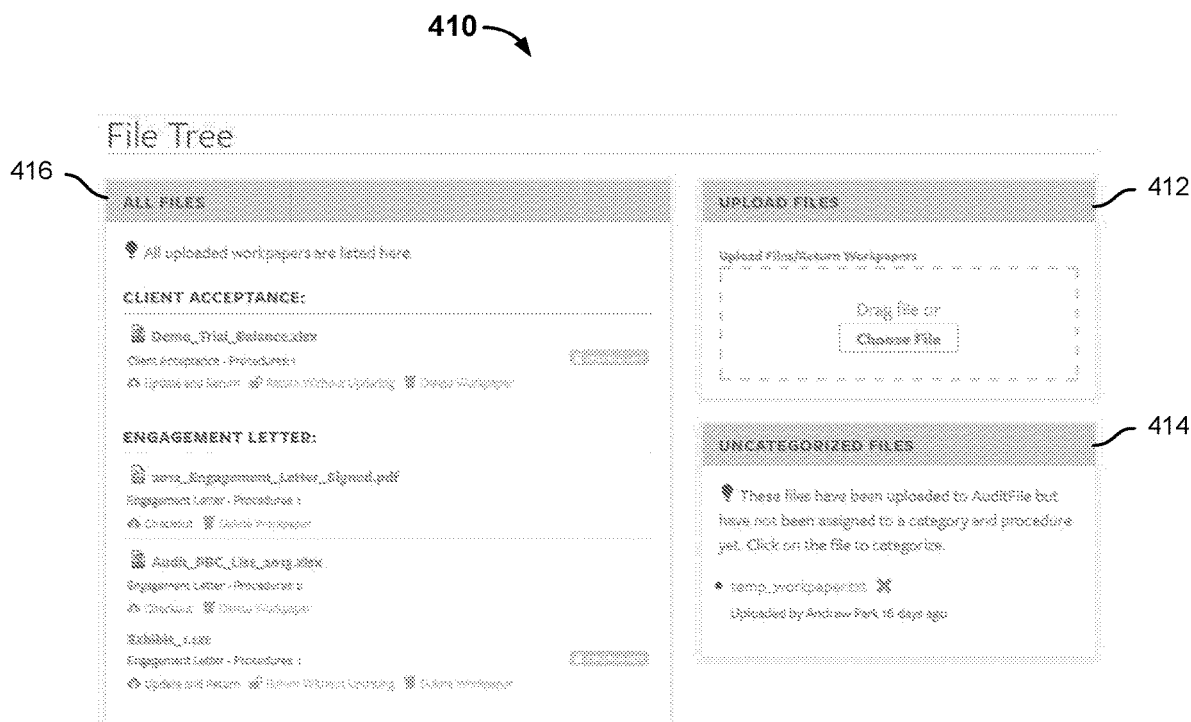
FIG. 4A is an example interface illustrating an embodiment of a general interface for receiving and managing a workpaper.
Figure 4B:
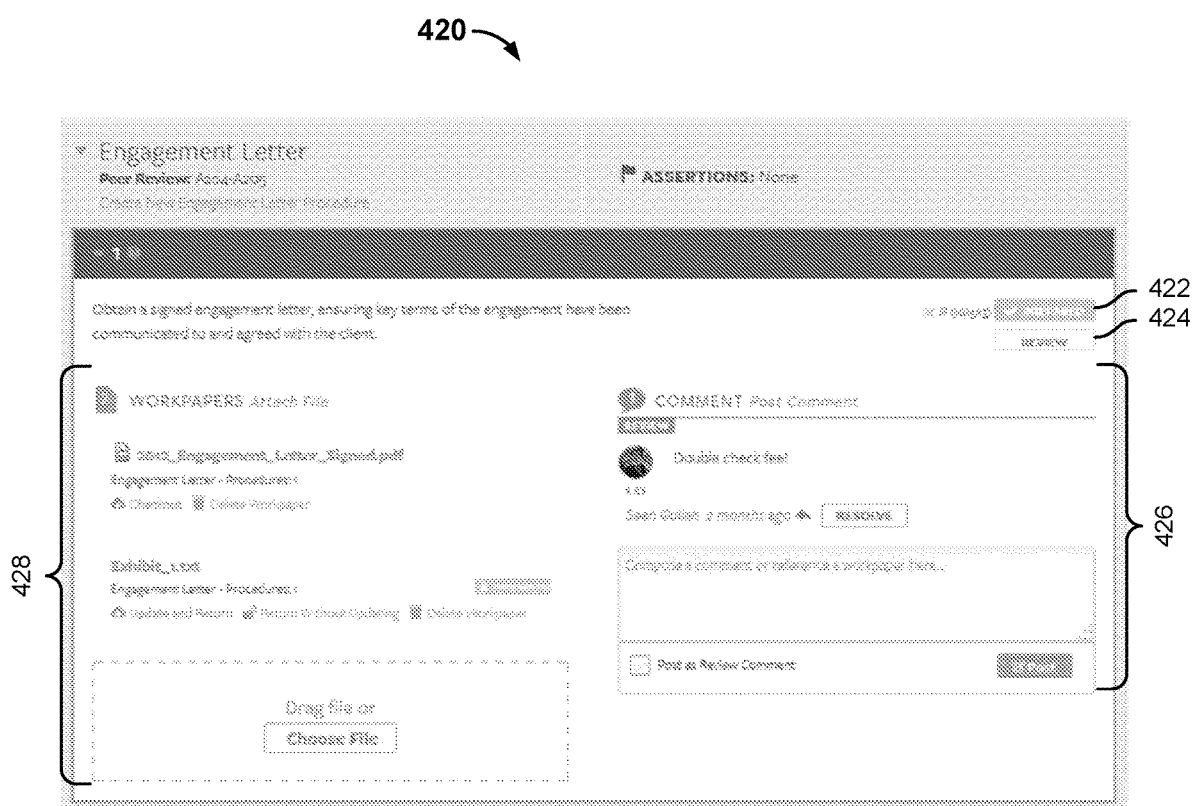
FIG. 4B is an example interface illustrating an embodiment of an interface for managing a specific audit procedure.

FIG. 4A is an example interface illustrating an embodiment of a general interface for receiving and managing a workpaper. The interface shown in FIG. 4A may be provided by server 106 to be displayed by client device 102 of FIG. 1. Interface 410 shows at least a portion of a "filetree" webpage interface. The "filetree" interface allows a user to provide a workpaper without initially identifying an audit procedure associated with the workpaper. Upload file interface element 412 allows a user to drag and drop one or more files into an area of element 412 to specify the dragged and dropped file(s) for uploading. Interface element 412 also includes a choose file button that when selected allows a user to select one or more files from a directory listing of available files of the user (e.g., from a dialog box showing a directory tree of files of a user system) for uploading.

Interface 410 includes interface element 414 that lists workpapers that have been uploaded to a network cloud-based audit management server but have not yet been assigned to a particular audit procedure. An authorized user may delete a workpaper listed in interface element 414 by selecting an "x" icon next to the filename of the workpaper to be deleted. When a user is ready to categorize/associate a workpaper listed in interface element 414 with one or more audit procedures, a user may select the displayed file name of the workpaper to specify one or more audit procedures to be associated with the workpaper. When a workpaper listed in interface element 414 is selected to specify associated workpaper(s), an example interface may provide an option to either utilize the selected workpaper to replace/update an existing workpaper that has been already categorized/associated with one or more audit procedures (e.g., provide a listing of workpapers that can be replaced/updated with the selected workpaper and a user may indicate one or more workpapers from the listing to be replaced with the selected workpaper) or treat the selected workpaper as a new workpaper to be categorized/associated with one or more audit procedures selected from a list of available procedures that may be associated with the selected workpaper.

Interface 410 includes interface element 416 that lists all workpapers that have been uploaded and categorized/associated with one or more audit procedures. Interface element 416 lists each audit procedure and associated workpaper of the corresponding audit procedure. An authorized user may obtain/download a workpaper listed in interface element 416 by selecting the listed workpaper. If an authorized user desires to edit/update a workpaper and prevent other users from modifying the workpaper while the authorized user edits/updates the workpaper, the user may select the "Checkout" link of the desired workpaper to checkout the workpaper. Once the workpaper has been checked out, the user may check in/return/update the checked out workpaper by selecting the "Update and Return" option of the checked out workpaper and/or specify the updated workpaper using interface element 412 (e.g., updated workpaper files specified using interface element 412 may be automatically detected as an updated version and utilized to automatically replace the checked out workpaper and change the status of the checked out workpaper as not checked out). If a user decides to not update a checked out workpaper, a user may select the "Return Without Updating" option of the appropriate checked out workpaper to change the status of the checked out workpaper as no longer checked out. A workpaper may be removed/deleted by selecting the "Delete Workpaper" option of the appropriate listed workpaper.

FIG. 4B is an example interface illustrating an embodiment of an interface for managing a specific audit procedure. The interface shown in FIG. 4B may be provided by server 106 to be displayed by client device 102 of FIG. 1. Interface 420 shows at least a portion of an engagement audit procedure management webpage interface. The interface 420 allows a user to track and manage the audit procedure, associated signoffs, associated comments, and associated workpapers. Interface 420 shows a description of the audit procedure and associated audit tasks to be performed for the audit procedure. When a first user (e.g., junior auditor) with the appropriate signoff credentials has initially completed the procedure, the first user may select prepared button 422 to indicate that the first user has prepared the audit procedure. As shown in FIG. 4B, button 422 has been selected by a user and the example of FIG. 4B shows that the shown audit procedure has been tracked as prepared. The initials of the user that marked the audit procedure as completed is shown along with the date the procedure was marked. Then a second user (e.g., audit manager) with appropriate signoff credentials may select the review button 424 to indicate that the procedure has been reviewed by the second user. In other examples, additional signoff buttons may exist to allow another user to indicate additional levels of signoff (e.g., signoff on technical review).

Interface 420 includes interface element 426 where a user may post any associated comments about the audit procedure. A comment may be a review comment (e.g., indicated by checking the review comment box) that is to be resolved (e.g., a user selects the resolved button to indicate the review comment has been resolved) before locking and completing the audit. A comment may be a comment to be recorded in the audit records (e.g., not a review comment), and the comment is stored/archived as being associated with the audit procedure.

Interface 420 also lists workpapers associated with the shown audit procedure. An authorized user may upload a workpaper using upload file interface element 428 that allows a user to drag and drop one or more files into an area of element 428 to specify the dragged and dropped file(s) for uploading. Interface element 428 also includes a choose file button that when selected allows a user to select one or more files from a directory listing of available files of the user (e.g., from a dialog box showing a directory tree of files of a user system) for uploading. Any file specified/uploaded using interface element 428 is automatically associated with the specific audit procedure of interface element 428.

Interface 420 lists all workpapers that have been uploaded and categorized/associated with the specific audit procedure of interface 420. An authorized user may obtain/download a listed workpaper by selecting the listed workpaper from interface 420. If an authorized user desires to edit/update a workpaper and prevent other users from modifying the workpaper while the authorized user edits/updates the workpaper, the user may select the "Checkout" link of the desired workpaper to checkout the workpaper. Once the workpaper has been checked out, the user may check in/return/update the checked out workpaper by selecting the "Update and Return" option of the checked out workpaper and/or specify the updated workpaper using interface element 428 (e.g., updated workpaper files specified using interface element 428 may be automatically detected as an updated version and utilized to automatically replace the checked out workpaper and change the status of the checked out workpaper as not checked out). If a user decides to not update a checked out workpaper, a user may select the "Return Without Updating" option of the appropriate checked out workpaper to change the status of the checked out workpaper as no longer checked out. A workpaper may be removed/deleted by selecting the "Delete Workpaper" option of the appropriate listed workpaper.

Figure 5:
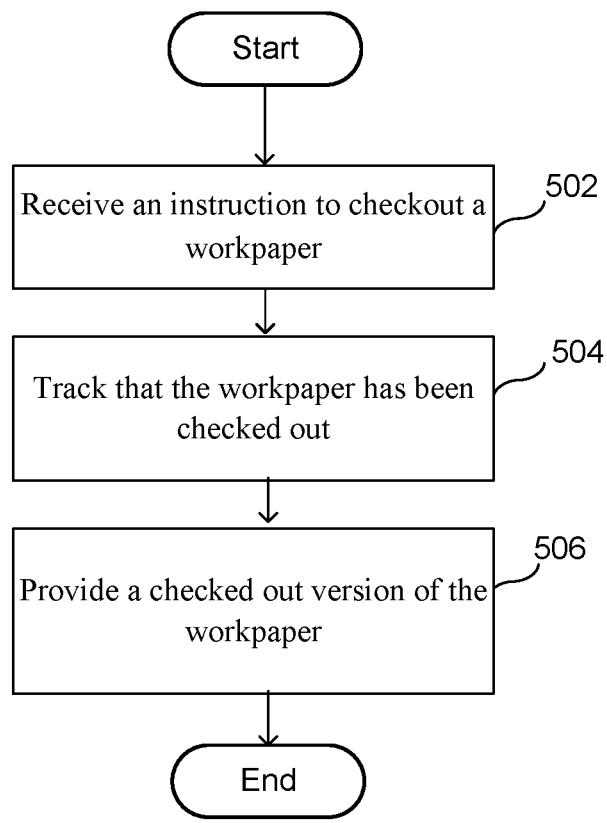
FIG. 5 is a flowchart illustrating an embodiment of a process for checking out a workpaper.

FIG. 5 is a flowchart illustrating an embodiment of a process for checking out a workpaper. The process of FIG. 5 may be implemented on server 106 of FIG. 1. In some embodiments, the process of FIG. 5 is included in 206, 208, and/or 210 of FIG. 2. In some embodiments, the workpaper to be checked out is the workpaper received and processed using at least a portion of the process of FIG. 3.

At 502, an instruction to checkout a workpaper is received. For example, a workpaper that has been uploaded and saved on an online cloud-based audit management solution is requested to be downloaded to allow a recipient to modify the workpaper. In some embodiments, receiving the instruction includes receiving an indication that a user has indicated via a web interface (e.g., webpage interfaces shown in FIGS. 4A and 4B) that selected workpaper is desired to be checked out and downloaded. In some embodiments, it is determined whether a user that requested the workpaper to be checked out is authorized to access the workpaper. For example, access credentials of a user account of the user that requested to checkout workpaper is verified to ensure that the user is authorized to checkout the workpaper. In some embodiments, if it is determined that the user is not authorized to checkout the workpaper, the process stops and an error message is provided.

At 504, it is tracked that the workpaper has been checked out. For example, a data structure (e.g., a database, a list, a table, etc.) that stores an entry associated with the workpaper is modified/updated to indicate that the workpaper has been checked out. In some embodiments, when a workpaper is checked out, the workpaper is not allowed to be checked out again until the checked out workpaper has been checked in. This may ensure that only one user is allowed to make changes to the workpaper at one time. However, another user may access the workpaper (e.g., download the workpaper) even though workpaper has been checked out by another user (e.g., read privileges allowed but not write privileges when workpaper checked out by another user).

In some embodiments, tracking that the workpaper has been checked out includes storing an identifier of a user that checked out the workpaper (e.g., stored in the data structure managing the workpaper). This user identifier may be indicated to other users to allow other users to view who has checked out the workpaper. In some embodiments, the workpaper may be associated with a plurality of audit procedures and when the workpaper is checked out using an interface of one audit procedure, the workpaper is indicated to be checked out for all audit procedures associated with the workpaper.

At 506, a checked out version of the workpaper is provided. For example, the checked out version of the workpaper is provided via a network for a recipient to download the papers. In another example, a link to the workpaper is provided. In another example, a webpage that includes the workpaper is provided. In some embodiments, the file of the checked out version of the workpaper includes an identifier that identifies the file as the checked out version of the workpaper. For example, a unique workpaper identifier (e.g., identifier determined in 306 of FIG. 3) is appended to a filename of a provided workpaper. When a modified version of the checked out workpaper is received by the audit management system at a subsequent time, this unique workpaper identifier may be utilized by the audit management system to identify that the received workpaper is an updated version of the checked out workpaper and to replace the checked out workpaper with the newly received workpaper. In various embodiments, a workpaper identifier identifying the checked out version of the workpaper may be included in one or more of the following associated with the workpaper: a filename, a metadata, a content location identifier, a configuration file, and file contents.

Figure 6:
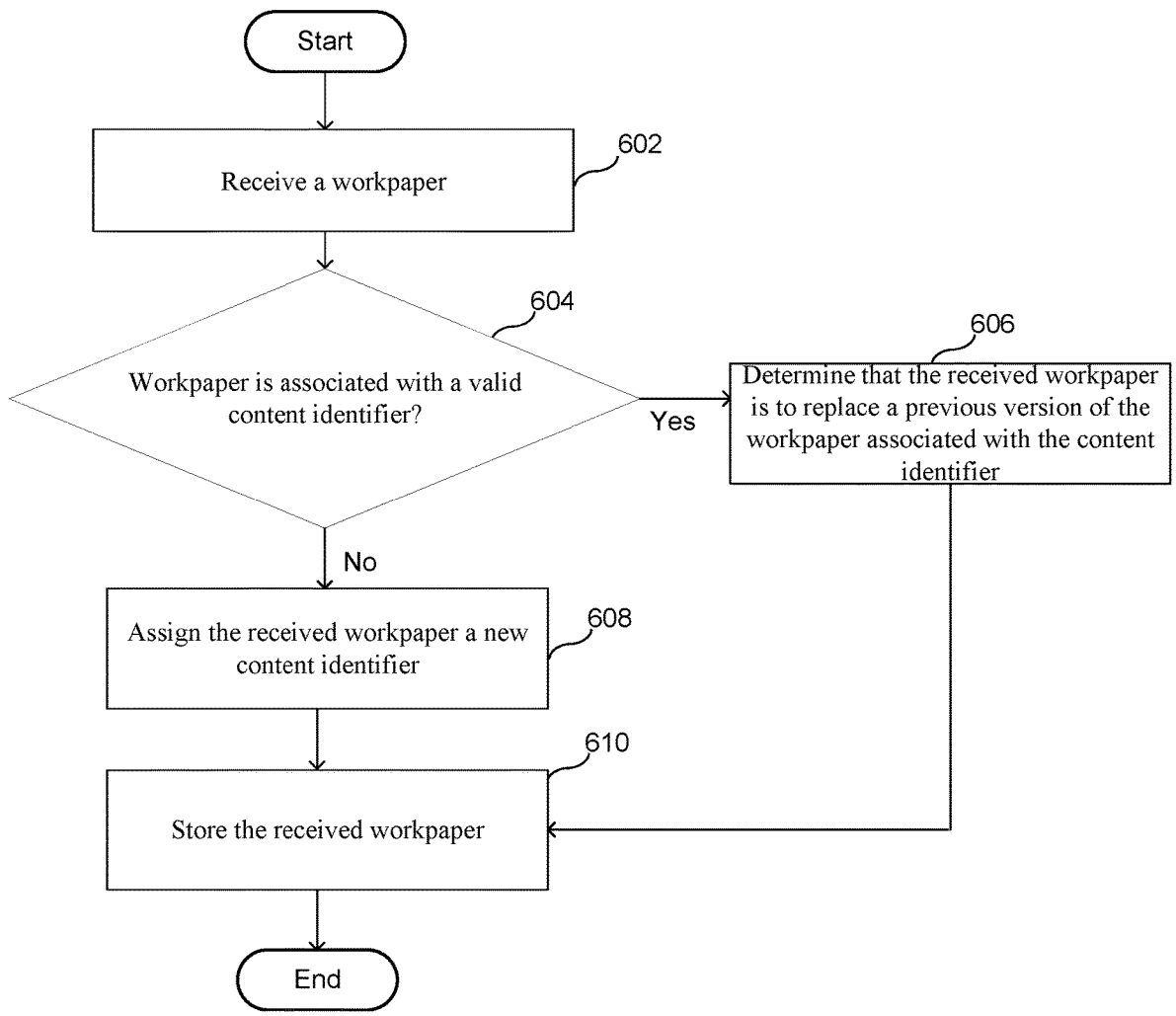
FIG. 6 is a flowchart illustrating an embodiment of a process for checking in a workpaper.

FIG. 6 is a flowchart illustrating an embodiment of a process for checking in a workpaper. The process of FIG. 6 may be implemented on server 106 of FIG. 1. In some embodiments, the process of FIG. 6 is included in 206, 208, and/or 210 of FIG. 2. In some embodiments, the workpaper to be checked in is the workpaper received and processed using at least a portion of the process of FIG. 3. In some embodiments, the workpaper to be checked in is the workpaper checked out using at least a portion of the process of FIG. 5.

At 602, a workpaper is received. In some embodiments, receiving the workpaper includes receiving the workpaper via an interface configured to receive a workpaper to be saved on a cloud-based audit management solution (e.g., received using the interfaces shown FIG. 4A and/or 4B). In some embodiments, receiving the workpaper includes receiving an indication of the workpaper. For example, a user drags and drops a computer file on the provided interface to provide the computer file as a workpaper. In another example, a user selects a user interface button to indicate that the user desires to provide a workpaper and the user is provided a dialog window/box that the user can use to navigate a file directory structure of a storage of the user to select the file to be provided as a workpaper. In another example, a user provides a directory path and file name of the workpaper to be provided. In some embodiments, the workpaper to be received is received from a networked storage. For example, a user selects a file stored on a third party cloud storage service to be provided as the workpaper. In another example, the received workpaper is a link to a web form, webpage, audit procedure program object, and/or other portion of the cloud-based audit management solution. In some embodiments, receiving the workpaper includes receiving the workpaper via network connection. For example, a computer file indicated by a user is uploaded to a network storage of a cloud-based audit management solution.

At 604, it is determined whether the workpaper is associated with a valid content identifier. In some embodiments, determining whether the workpaper is associated with the content identifier includes analyzing an attribute of the workpaper to determine whether the workpaper is a version of a workpaper that has been previously received. For example, it is determined whether the workpaper is a workpaper that has been checked out using at least a portion of the process of FIG. 5. In some embodiments, determining whether the workpaper is associated with the content identifier includes determining whether a unique identifier assigned by an audit management solution system is associated with the received workpaper. For example, a unique workpaper identifier (e.g., identifier determined in 306 of FIG. 3 and/or provided in 506 of FIG. 5) may be included in a filename of a received workpaper. In various embodiments, the content identifier identifying the workpaper within an audit management solution may be included in one or more of the following associated with the workpaper: a filename, a metadata, a content location identifier, a configuration file, and file contents. In some embodiments, determining whether the workpaper is associated with a valid content identifier includes determining whether a filename and/or a metadata of the workpaper matches a regular expression that identifies whether a content identifier is included in the filename/metadata. For example, a regular expression is utilized to extract a unique identifier appended to a filename of the workpaper.

In some embodiments, determining whether the workpaper is associated with a valid content identifier includes determining whether an identified identifier is valid. For example, a potential content identifier is identified from the workpaper (e.g., using regular expression matching) and the potential content identifier is matched against a listing of valid content identifiers to determine whether the potential content identifier exists within the listing. The listing of valid content identifiers may be included in the data structure that stores the associations between previously received workpapers of an audit and audit procedures of the audit. In some embodiments, determining whether the workpaper is associated with a valid content identifier includes determining whether an identified identifier is associated with an identifier assigned to a workpaper that has been checked out using at least a portion of the process of FIG. 5. For example, a potential content identifier is identified from the workpaper (e.g., using regular expression matching) and the potential content identifier is matched against a listing of identifiers of workpapers that have been checked out.

In some embodiments, determining whether the workpaper is associated with a valid content identifier includes determining whether a user that provided the received workpaper is allowed to upload/update/save the received workpaper. For example, only certain authorized users with authorized user account types are allowed to upload/update/save the workpaper or certain types of workpapers. If the user is not authorized to provide the workpaper, the process may end and an error message may be provided.

In some embodiments, determining whether the received workpaper is associated with a valid content identifier includes determining whether a filename of the received workpaper matches a filename of a previous version of the workpaper that has been saved by an audit management solution. In some embodiments, determining whether the received workpaper is associated with a valid content identifier includes comparing content type (e.g., file extension, category of content, etc.) of the received workpaper with a content type of a previous version of the workpaper that has been previously saved. For example, if it is determined that the types do not match, a user is provided a warning that types do not match and asked whether to proceed with updating the previous version with the newly received version. In some embodiments, determining whether the received workpaper is associated with a valid content identifier includes comparing a timestamp (e.g., creation time, modification time, etc.) of the received workpaper with a timestamp of a previous version of the workpaper that has been previously saved. For example, if it is determined that the creation times do not match or the timestamp of the newly received workpaper is not after the timestamp of the previous version, a user is provided a warning and asked whether to proceed with updating the previous version with the newly received version.

If at 604 it is determined that the received workpaper is associated with a valid content identifier, at 606 it is determined that the received workpaper is to replace a previous version of the workpaper associated with the content identifier. For example, it is determined that the received workpaper is to replace a previous version of the workpaper stored by a network cloud-based audit management solution. In some embodiments, if the received workpaper is to replace the previous version of the workpaper that had been checked out, the workpaper is marked as checked in (e.g., update data structure tracking workpaper checkout, indicate the user that checked in the workpaper, indicate time the workpaper was checked in, etc.). In some embodiments, determining that the received workpaper is to replace the previous version of the workpaper associated with the content identifier includes deleting the previous version of the workpaper from a networked storage workpaper content repository of an audit management solution and assigning the received workpaper the unique content identifier of the previous version of the workpaper (e.g., modify the filename, metadata, and/or content of the received workpaper with the identifier).

If at 604 it is determined that the received workpaper is not associated with a valid content identifier, at 608 the received workpaper is assigned a new content identifier. For example, a unique numeric identifier is generated for the received workpaper. The unique identifier may be unique across a single audit, across all audits of the same audit subject, across all audits of a user organization (e.g., audit firm), and/or across all workpapers of an audit management solution. Assigning the unique identifier may include modifying or adding the unique identifier to a filename, other existing identifier, metadata, and/or contents of the received workpaper. In some embodiments, if an explicit instruction has been received to replace a specified previously received and saved workpaper with the newly received workpaper, the newly received workpaper is determined to replace the indicated workpaper to be replaced. For example, the indicated previous version of the workpaper is deleted from a networked storage workpaper content repository of an audit management solution and the received workpaper is assigned the unique content identifier of the indicated workpaper to be replaced (e.g., modify the filename, metadata, and/or content of the received workpaper with the identifier of the indicated workpaper to be replaced).

At 610, the received workpaper is stored. In some embodiments, storing the workpaper includes storing the workpaper in a workpaper repository. For example, all received workpapers for an audit are stored in a common storage repository location (e.g., common file directory, common database, common data store, etc.). In some embodiments, storing the received workpaper includes storing the workpaper in a networked storage (e.g., storage 108 of FIG. 1). In some embodiments, storing the workpaper includes encrypting the workpaper before storing the workpaper. In some embodiments, storing the workpaper includes associating the workpaper with audit procedures that are associated with the unique identifier of the workpaper.

Figure 7:
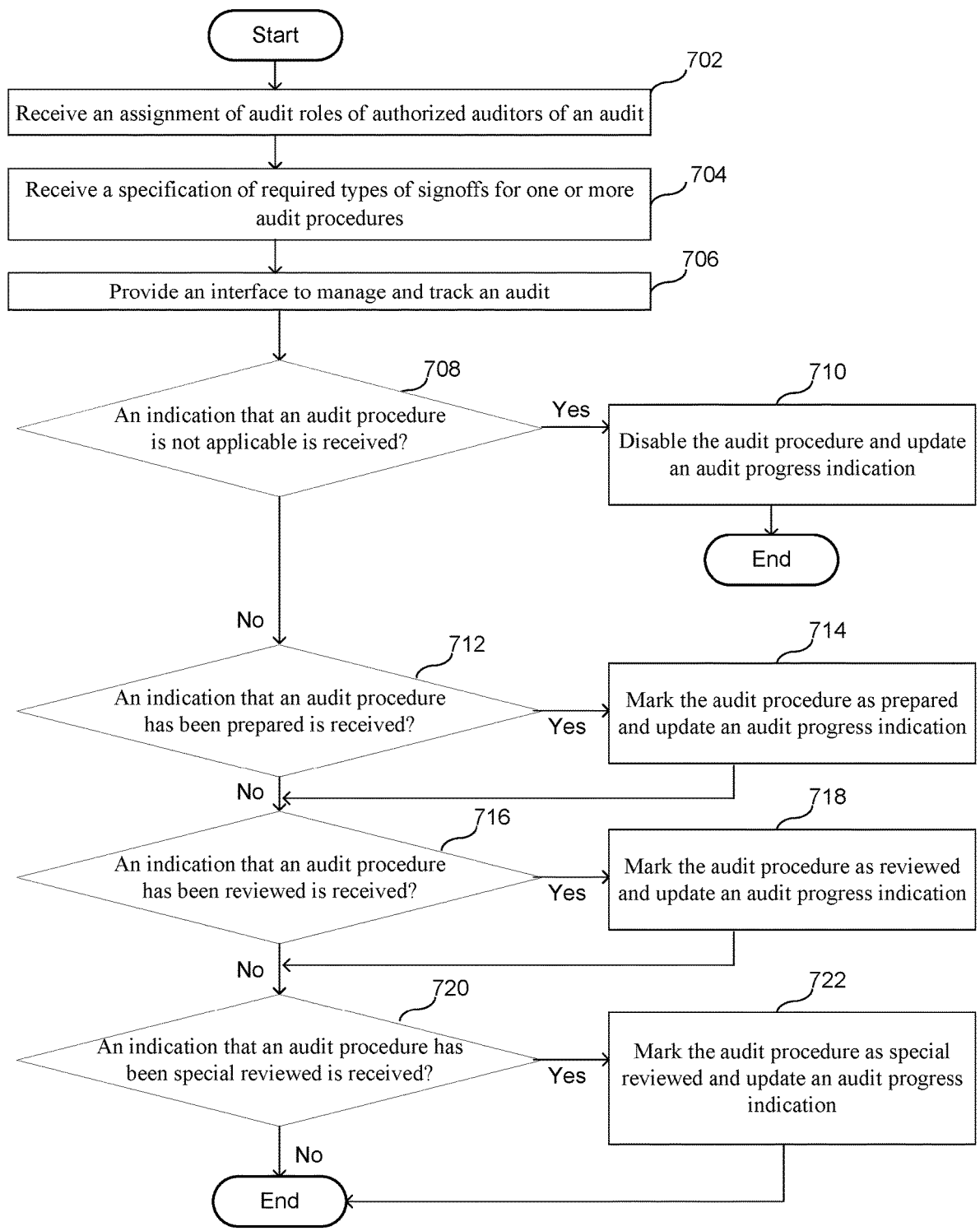
FIG. 7 is a flowchart illustrating an embodiment of a process for tracking completion of an audit procedure.

FIG. 7 is a flowchart illustrating an embodiment of a process for tracking completion of an audit procedure. The process of FIG. 7 may be implemented on server 106 of FIG. 1. In some embodiments, at least a portion of the process of FIG. 7 is included in 212 of FIG. 2.

At 702, an assignment of audit roles of authorized auditors of an audit is received. In some embodiments, user accounts of users that will have access to the audit managed using a network cloud-based audit management solution are set up and initialized. Each user account may be configured to have different types of audit roles, access privileges, and/or functions. For example, when initializing an auditor engagement team that will be provided access privileges to an audit, an assigned role type (e.g., partner, manager, staff) with associated access/modification privileges and authorized audit procedure signoff privilege (e.g., privilege to sign off audit procedure as prepared, reviewed, technical reviewed, tax reviewed, other special reviewed, etc.) may be assigned for each user included in the engagement team. The user account may be utilized to log in to a web interface of a server to manage and track audit procedures.

At 704, a specification of required types of signoffs for one or more audit procedures is received. For example, a configuration/specification of stages/types of signoffs required to be performed to complete an audit procedure is received for one or more audit procedures of the audit. The audit procedures of the audit may be categorized into audit procedure categories. In some embodiments, all procedures of a single audit procedure category are configured to require the same types/levels of signoffs to be performed to complete an audit procedure of the audit procedure category. For example, types of signoffs (e.g., prepared, reviewed, special reviewed, etc.) to be performed for each audit procedure to complete the audit procedure are configured on a per audit procedure category basis rather than individual audit procedure basis. In some embodiments, audit procedures are grouped into audit procedure groupings. For example, audit procedure categories are grouped into audit procedure groupings.

At 706, an interface to manage and track an audit is provided. The interface may be utilized to navigate an organized/categorized listing of the audit procedures of an audit, and for each audit procedure, an audit management interface such as the interface shown in FIG. 4B may be provided to enable a user to manage and track the corresponding audit procedure. In various embodiments, the audit procedure management interface of an audit procedure allows a user to manage the audit procedure by associating a comment, associating a workpaper, storing responses to questions/forms, and/or indicating a task/signoff item of the audit procedure as having been signed off/completed. For example, an audit procedure requires a plurality of different types of signoffs/task completions to complete the audit procedure and authorized users are able to indicate/mark that a particular type of required signoff/task that the corresponding user is authorized to complete has been completed.

At 708, it is determined whether an indication that an audit procedure is not applicable is received. For example, an audit management solution provides a preconfigured set of audit procedures (e.g., preconfigured set determined based on type of audit being performed, a previous audit performed, standard default set, etc.) for an audit to be managed and a user may indicate that a particular audit procedure is not applicable to the audit being managed. In some embodiments, indication that the audit procedure is not applicable is only accepted from a user of a user account that is authorized to provide the indication. For example, only users logged in to user accounts with account privilege to render an audit procedure not applicable are allowed to provide the indication. In some embodiments, the indication is received using an interface such as the interface shown in FIG. 4B. For example, prior to selecting button 422 shown in FIG. 4B, a user is provided a button that a user may select to provide the indication that the associated audit procedure is not applicable.

If at 708 it is determined that the indication that the audit procedure is not applicable is received, at 710, the audit procedure is disabled and an audit progress indication is updated. For example, a program object associated with the audit procedure is configured to be disabled in the audit. In some embodiments, the disabling the audit procedure includes visually indicating that the audit procedure has been disabled. For example, in an interface such as the interface shown in FIG. 4B, the interface that can be utilized to manage audit procedure is greyed out and interactive buttons/data inputs are disabled. In some embodiments, disabled audit procedures are excluded from being utilized to calculate a progress of an audit. For example, an audit progress indication is updated to reflect that the audit procedure is not applicable and not utilized in determining the audit progress indication.

At 712, it is determined whether an indication that an audit procedure has been prepared is received. For example, once the audit procedure has been completed by a lower level auditor, the procedure may be indicated/signed off as prepared by the lower level auditor. Then a higher level reviewer may review the performed procedure and mark/signoff the procedure as reviewed. Other reviewers such as an expert technical reviewer may further perform/review the procedure and mark/signoff the procedure as having been special reviewed (e.g., signed off as technical reviewed, tax reviewed, etc.). Thus performing an audit procedure may involve various stages of actions/tasks/signoffs (e.g., prepared, reviewed, special reviewed, etc.). In some embodiments, an indication/signoff that the audit procedure has been prepared is only accepted from a user of a user account that is authorized to provide the indication. For example, only users logged in to user accounts with account privilege to signoff the audit procedure as prepared are allowed to provide the indication. In some embodiments, the indication is received using an interface such as the interface shown in FIG. 4B. For example, an indication that button 422 shown in FIG. 4B has been selected is received.

If at 712 it is determined that the indication that the audit procedure been prepared is received, at 714, the audit procedure is marked as prepared (e.g., signed off as prepared) and an audit progress indication is updated. For example, a program object of the audit procedure is updated to be in a prepared state. In some embodiments, the marking the audit procedure as prepared includes visually indicating that the audit procedure has been prepared. For example, in an interface such as the interface shown in FIG. 4B, a button that is utilized to indicate that the associated procedure has been prepared is updated to indicate the audit procedure has been prepared. An indication of the user that prepared the audit procedure and a time/date of when the audit procedure was prepared may be also visually indicated. In some embodiments, updating the audit progress indication includes determining a progress of an audit and updating the audit progress indication (e.g., visually indicate the audit progress). In some embodiments, the audit procedure is disabled from being able to be indicated/signed off as reviewed/special reviewed prior to being signed off prepared and when the audit procedure is marked/signed off as prepared, the audit procedure is disabled from being able to be indicated as not applicable and enabled to be signed off reviewed/special reviewed.

At 716, it is determined whether an indication that an audit procedure has been reviewed is received. For example, once the audit procedure has been completed by a lower level auditor, the procedure may be indicated/signed off as prepared by the lower level auditor. Then a higher level reviewer may review the performed procedure and mark/signoff the procedure as reviewed. In some embodiments, indication that the audit procedure has been reviewed is only accepted from a user of a user account that is authorized to provide the indication. For example, only users logged in to user accounts with account privilege to signoff the audit procedure as reviewed is allowed to provide the indication. In some embodiments, the indication is received using an interface such as the interface shown in FIG. 4B. For example, an indication that button 424 shown in FIG. 4B has been selected is received.

If at 716 it is determined that the indication that the audit procedure has been reviewed is received, at 718, the audit procedure is marked as reviewed (e.g., signoff as reviewed) and an audit progress indication is updated. For example, a program object associated with the audit procedure is updated to be in a reviewed state. In some embodiments, the marking the audit procedure as reviewed includes visually indicating that the audit procedure has been reviewed. For example, in an interface such as the interface shown in FIG. 4B, a button that is utilized to indicate that the associated procedure has been reviewed is updated to indicate the audit procedure has been reviewed. An indication of the user that reviewed the audit procedure and a time/date of when the audit procedure was reviewed may be also visually indicated. In some embodiments, updating the audit progress indication includes determining a progress of an audit and updating the audit progress indication (e.g., visually indicate the audit progress). In some embodiments, the audit procedure is only able to be reviewed (e.g., signoff as reviewed) if the audit procedure has been previously prepared (e.g., signed off as prepared).

At 720, it is determined whether an indication that an audit procedure has been special reviewed is received. Step 720 may be optional. For example, if the audit procedure has been configured in 704 to not require any type of special reviews, steps 720 and 722 are not performed. The audit procedure may require a plurality of different types of special reviews. In some embodiments, indication that the audit procedure has been special reviewed is only accepted from a user of a user account that is authorized to provide the indication. For example, only users logged in to user accounts with account privilege to signoff the audit procedure as special reviewed is allowed to provide the indication. In some embodiments, the indication is received using an interface such as the interface shown in FIG. 4B. For example, an indication that a special review button (not shown in FIG. 4B) below button 424 in FIG. 4B has been selected is received.

If at 720 it is determined that the indication that the audit procedure been special reviewed is received, at 722, the audit procedure marked/signed off as special reviewed (e.g., signoff as special reviewed) and an audit progress indication is updated. For example, a program object associated with the audit procedure is updated to be in one or more special reviewed states. In some embodiments, the marking the audit procedure as special reviewed includes visually indicating that the audit procedure has been special reviewed. For example, in an interface such as the interface shown in FIG. 4B, a button that is utilized to indicate that the associated procedure has been special reviewed (e.g., indicated as signed off as technical reviewed, tax reviewed, etc.) is updated to indicate the audit procedure has been special reviewed. An indication of the user that special reviewed the audit procedure and a time/date of when the audit procedure was special reviewed may be also visually indicated. In some embodiments, updating the audit progress indication includes determining a progress of an audit and updating the audit progress indication (e.g., visually indicate the audit progress). In some embodiments, the audit procedure is only able to be special reviewed (e.g., signoff as a particular special reviewed) if the audit procedure has been previously prepared (e.g., signed off as prepared). In some embodiments, updating the audit progress indication includes including the audit progress of the special review in a general review progress. For example, progress of reviews (e.g., marked/signed off in 718) and special reviews (e.g., marked/signed off in 722) are combined (e.g., not distinguished separately) and reported together in a combined audit progress indication.

Figure 8:
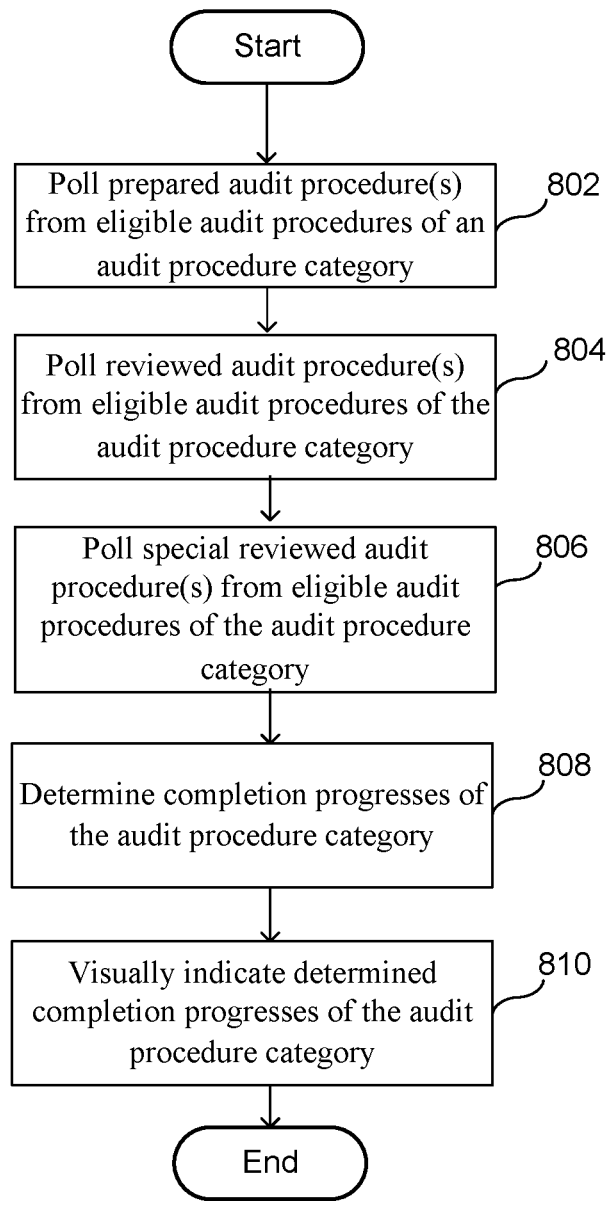
FIG. 8 is a flowchart illustrating an embodiment of a process for automatically determining an audit progress of an audit procedure category.

FIG. 8 is a flowchart illustrating an embodiment of a process for automatically determining an audit progress of an audit procedure category. The process of FIG. 8 may be implemented on server 106 of FIG. 1. In some embodiments, the process of FIG. 8 is included in 212 of FIG. 2. In some embodiments, the process of FIG. 8 is repeated for each audit procedure category.

At 802, prepared audit procedure(s) are polled from eligible audit procedures of an audit procedure category. In some embodiments, polling prepared procedures includes determining for the audit procedure category, which eligible audit procedure(s) have been marked/signed off as prepared. For example, audit procedure program object(s) belonging to the audit procedure category are analyzed/iterated to count the number of audit procedure(s) that have been marked to be prepared (e.g., marked in 714 of FIG. 7). In some embodiments, eligible procedures are procedures of the audit procedure category that have been not marked as not applicable (e.g., not marked as not applicable in 710 of FIG. 7) and are configured to require a signoff as prepared (e.g., configured in 704 of FIG. 7). In some embodiments, polling prepared procedures includes determining for each audit procedure category, which eligible audit procedure(s) have been not marked as prepared. For example, a total number of eligible procedures, a total number of procedures marked as prepared, and a total number of procedures not marked as prepared are determined for the audit procedure category. In some embodiments, a percentage of eligible audit procedures that have been signed off as prepared in the audit procedure category is determined.

At 804, reviewed audit procedure(s) are polled from eligible audit procedures of the audit procedure category. In some embodiments, polling reviewed procedures includes determining for the audit procedure category, which eligible audit procedure(s) have been marked/signed off as reviewed. For example, audit procedure program object(s) belonging to the audit procedure category are analyzed/iterated to count the number of audit procedure(s) that have been marked to be reviewed (e.g., marked in 718 of FIG. 7). In some embodiments, eligible procedures are procedures of the audit procedure category that have been not marked as not applicable (e.g., not marked as not applicable in 710 of FIG. 7) and are configured to require a signoff as reviewed (e.g., configured in 704 of FIG. 7). In some embodiments, polling prepared procedures includes determining for each audit procedure category, which eligible audit procedure(s) have been not marked as reviewed. For example, a total number of eligible procedures, a total number of procedures marked as reviewed, and a total number of procedures not marked as reviewed are determined for the audit procedure category. In some embodiments, a percentage of eligible audit procedures that have been signed off as reviewed in the audit procedure category is determined.

At 806, special reviewed procedure(s) are polled from eligible audit procedures of the procedure category. In some embodiments, polling special reviewed procedures includes determining for the audit procedure category, which eligible audit procedure(s) have been marked/signed off as special reviewed (e.g., marked as technical reviewed, tax reviewed, etc.). For example, audit procedure program object(s) belonging to the audit procedure category are analyzed/iterated to count the number of audit procedure(s) that have been marked as special reviewed (e.g., marked in 722 of FIG. 7). In some embodiments, eligible procedures are procedures that have been not marked as not applicable (e.g., not marked as not applicable in 710 of FIG. 7) and are configured to require special reviewed signoff (e.g., configured in 704 of FIG. 7). The special review of a procedure may include one or more required specialized audit procedure reviews beyond the review signoff polled in 804. One or more different types of special reviews (e.g., tax review, technical review, etc.) may be required for different audit procedures and polling the special reviewed procedures may include counting how many of which type of special reviews have been marked as having been performed for audit procedures of the audit procedure category. In some embodiments, polling special reviewed procedures includes determining for the audit procedure category, which eligible audit procedure(s) have been not marked as special reviewed. For example, a total number of eligible special procedures for each special review type, a total number of procedures marked as special reviewed for each special review type, and a total number of procedures not marked as special reviewed for each special review type are determined for the audit procedure category. In some embodiments, a percentage of eligible audit procedures that have been special reviewed for each special review $t_{yp}e$ in the audit procedure category is determined.

At 808, completion progresses of the audit procedure category are determined. In some embodiments, determining the completion progresses for the audit procedure category includes determining which percentage/portion of eligible audit procedures of the audit category has been marked as prepared (e.g., marked in 714 of FIG. 7). For example, using data determined in 802, a total number of audit procedures marked/signed off as prepared in the audit procedure category is divided by a total number of eligible procedures of the audit procedure category to determine the percentage of eligible audit procedures marked as prepared in the audit procedure category.

In some embodiments, determining the completion progresses for the audit procedure category includes determining which percentage/portion of eligible audit procedures of the audit procedure category has been marked as reviewed (e.g., marked in 718 of FIG. 7). For example, using data determined in 804, a total number of audit procedures marked as reviewed in the audit procedure category is divided by a total number of eligible procedures of the audit procedure category to determine the percentage of eligible audit procedures marked as reviewed in the audit procedure category.

In some embodiments, determining the completion progresses for the audit procedure category includes determining which percentage/portion of eligible audit procedures of the audit procedure category has been marked as special reviewed (e.g., marked in 722 of FIG. 7). For example, using data determined in 806, a total number of special reviewed marks/signoffs in the audit procedure category is divided by a total number of possible special reviewed signoffs/marks to determine the percentage of eligible audit procedures marked as special reviewed in the audit procedure category.

In some embodiments, determining the completion progresses for an audit procedure category includes determining which percentage/portion of eligible audit procedures of the audit procedure category has been marked as reviewed (e.g., marked in 718 of FIG. 7) and special reviewed (e.g., marked in 722 of FIG. 7). For example, using data determined in 804 and 806, a sum of a total number or signoffs as reviewed or special reviewed is divided by a sum of a total number of possible signoffs as reviewed or special reviewed (e.g., completion progress=(total number reviewed signoffs+total number of special reviewed signoffs)/(total number of possible reviewed signoffs+total number of possible special reviewed signoffs)).

Figure 11A:
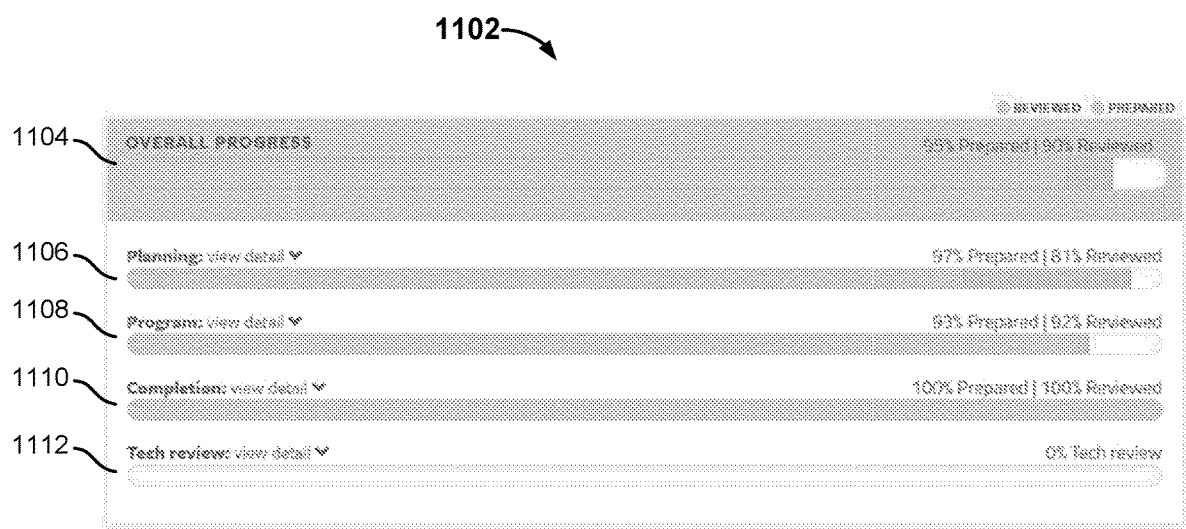
FIG. 11A is a diagram illustrating an embodiment of an interface element of a visualization of audit procedure progress indicators.
Figure 11B:
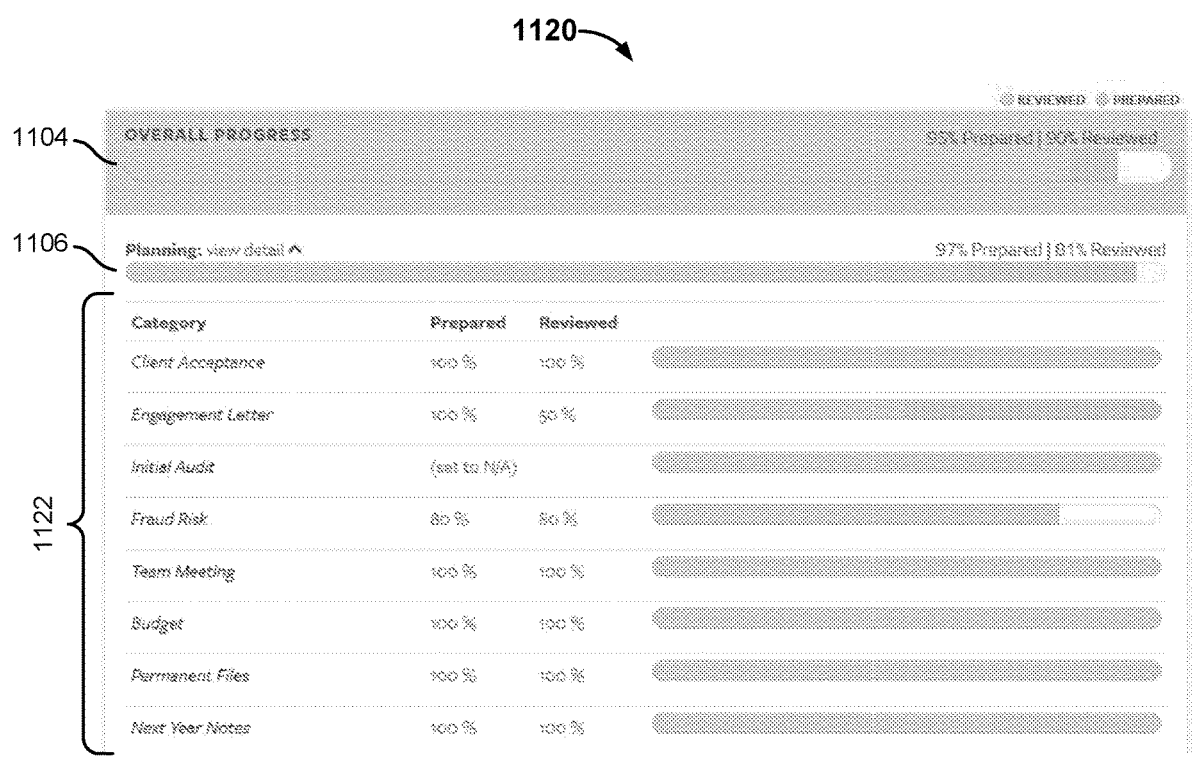
FIG. 11B is an example interface illustrating an embodiment of an interface element showing a visualization of audit procedure category progress indicators.

At 810, determined completion progresses of the audit procedure category are visually indicated. For example, the determined completion progresses of audit procedure categories are listed. In some embodiments, the determined completion progresses of the audit procedure category are displayed in a graphical format. For example, a progress bar, a bar chart, a pie chart, or another type of chart may be visually provided. In some embodiments, a combined progress bar display that overlays a single reviewed or special reviewed audit procedure signoff progress bar over a prepared audit procedure signoff progress bar is provided. For example, the visual indications shown in FIG. 11B are provided.

Figure 9:
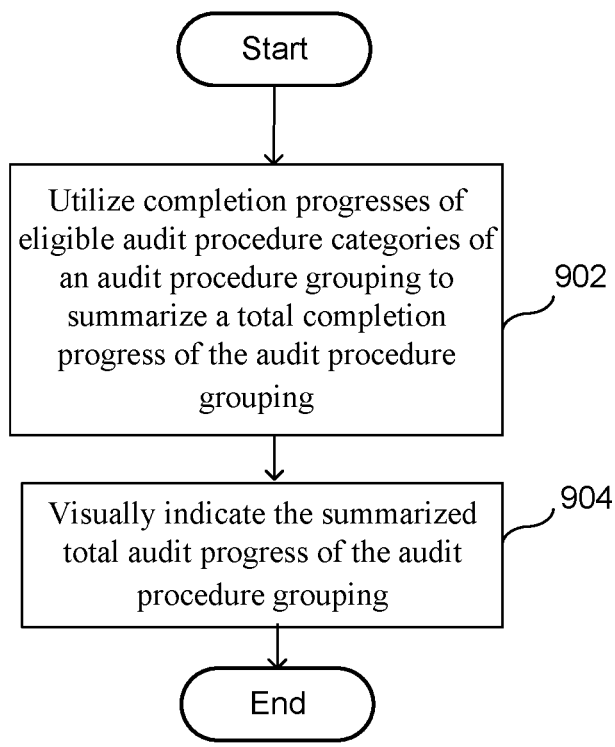
FIG. 9 is a flowchart illustrating an embodiment of a process for automatically determining an audit progress of an audit procedure grouping.

FIG. 9 is a flowchart illustrating an embodiment of a process for automatically determining an audit progress of an audit procedure grouping. The process of FIG. 9 may be implemented on server 106 of FIG. 1. In some embodiments, the process of FIG. 9 is included in 212 of FIG. 2. In some embodiments, the process of FIG. 9 is repeated for each audit procedure grouping (e.g., grouping of audit procedure categories).

At 902, completion progresses of eligible audit procedure categories of an audit procedure grouping are utilized to summarize a total completion progress of the audit procedure grouping. For example, completion progresses of audit procedure categories included in the audit procedure grouping and determined in 808 of FIG. 8 are summed to determine the total completion progress of the audit procedure grouping. In some embodiments, summarizing the total completion progress of the audit procedure grouping includes determining separate completion progresses for different types of tasks/signoffs of audit procedures. For example, individual completion progresses for audit procedures signed off as prepared and for audit procedures signed off as reviewed of the audit procedure grouping are determined.

In some embodiments, summarizing a total completion progress of the audit procedure grouping includes determining a total progress of signoffs as prepared for the audit procedure grouping. For example, a total number of signoffs as prepared (e.g., total number of audit procedures that have been marked as prepared) of the audit procedure grouping and a total number of eligible signoffs of the audit procedure grouping that could be signed off as prepared (e.g., total number of audit procedures that are eligible to be prepared) are determined (e.g., determined by summing information determined in 802). The total number of signoffs marked as prepared may be divided by the total number of eligible signoffs that could be marked as prepared to determine a percentage completion progress of prepared signoffs. In some embodiments, one or more weighting factors are utilized when determining the total completion progress of signoffs as prepared. For example, each signoff of an audit procedure that has been marked as prepared is weighted according to a weighting factor that approximates an amount of effort and/or amount of time required to perform the audit work required to prepare the audit procedure. In one example, when determining the total number of signoffs marked as prepared, each contributing signoff marked as prepared is multiplied by a corresponding weighting factor.

In some embodiments, summarizing a total completion progress of the audit procedure grouping includes determining a total progress of signoffs as reviewed for the audit procedure grouping. For example, a total number of signoffs marked as reviewed (e.g., total number of audit procedures that have been marked as reviewed) and a total number of eligible signoffs of the audit procedure grouping that could be marked as reviewed (e.g., total number of audit procedures that are eligible to be reviewed) are determined (e.g., determined by summing information determined in 804). The total number of signoffs marked as reviewed may be divided by the total number of eligible signoffs that could be marked as reviewed to determine a percentage completion progress of signoffs as reviewed. In some embodiments, one or more weighting factors are utilized when determining the total reviewed audit procedure progress. For example, each signoff of an audit procedure that has been marked as reviewed is weighted according to a weighting factor that approximates an amount of effort and/or amount of time required to perform the audit work required to review the audit procedure. In one example, when determining the total number of signoffs marked as reviewed, each contributing signoff marked as reviewed is multiplied by a corresponding weighting factor.

In some embodiments, summarizing a total completion progress of the audit procedure grouping includes determining a total progress of signoffs as special reviewed for the audit procedure grouping. For example, a total number of signoffs marked as one or more types of special reviewed (e.g., total number of audit procedures that have been marked as one or more types of special reviewed) and a corresponding total number of eligible signoffs of the audit procedure grouping that could be marked as special reviewed (e.g., total number of corresponding audit procedures that are eligible to be special reviewed) are determined (e.g., determined by summing information determined in 806). The total number of signoffs marked as one or more types of special reviewed may be divided by the corresponding total number of eligible signoffs that could be marked as special reviewed to determine a percentage completion progress of signoffs as reviewed. In some embodiments, one or more weighting factors are utilized when determining the total special reviewed audit procedure progress. For example, each signoff of an audit procedure that has been marked as special reviewed is weighted according to a weighting factor that approximates an amount of effort and/or amount of time required to perform the audit work required to special review the audit procedure. In one example, when determining the total number of signoffs marked as special reviewed, each contributing signoff marked as special reviewed is multiplied by a corresponding weighting factor.

In some embodiments, summarizing the total completion progress of the audit procedure grouping includes determining a combined completion progress of reviewed and one or more types of special reviewed signoffs of the audit procedure grouping. One example is a completion progress status indicator that indicates a single combined completion progress (e.g., percentage) that indicates completion progress of completing reviewed and one or more types of special reviewed signoffs. In some embodiments, for the audit procedure grouping, a total number of signoffs marked as reviewed (e.g., total number of audit procedures that have been marked as reviewed), a total number of signoffs marked as one or more types of special reviewed (e.g., total number of audit procedures that have been marked as special reviewed), a total number of eligible signoffs that could be marked as reviewed (e.g., total number of audit procedures that are eligible to be reviewed), a total number of eligible signoffs that could be marked as reviewed (e.g., total number of audit procedure signoffs that are eligible to be reviewed), and a corresponding total number of eligible signoffs that could be marked as one or more types of special reviewed (e.g., total number of audit procedure signoffs that are eligible to be special reviewed) are determined (e.g., determined by summing information determined in 804 and 806).

In some embodiments, determining the combined completion progress includes determining a completion progress percentage. In one example, the total number of signoffs marked as reviewed or special reviewed may be divided by the total number of eligible signoffs that could be marked as reviewed or special reviewed to determine the combined percentage completion progress. However, an audit procedure with a large number of signoffs may dominate and skew the combined audit progress. In some embodiments, signoffs of the audit procedures are normalized according to the number of signoffs required to complete the audit procedure when determining the combined audit progress.

In some embodiments, the number of different types of signoffs required to complete audit procedures of each applicable audit procedure category is determined. For example, each audit procedure category is configured to require one or more configured types of signoffs (e.g., prepared, reviewed, tax reviewed, technical reviewed, other special reviewed, etc.) for each member audit procedure (e.g., every member audit procedure of a single audit procedure category all require the same types of signoffs) and the number of signoff types for audit procedure categories included in the audit procedure grouping is determined.

In some embodiments, determining the combined completion progress includes determining a normalized combined completion progress. In some embodiments, determining the normalized completion progress includes determining for each audit procedure category included in the audit procedure grouping a total number of signoffs marked as reviewed or special reviewed divided by the number of different types of signoffs required to complete the audit procedures of the audit procedure category and summing each of the results together as the numerator value. In some embodiments, determining the normalized combined audit progress includes determining for each audit procedure category included in the audit procedure grouping a total number of eligible signoffs that could be marked as reviewed or special reviewed divided by the number of different types of signoffs required to complete the audit procedures of the audit procedure category and summing each of the results together as the denominator value. This numerator value may be divided by this denominator value to determine the normalized completion progress percentage of the combined audit progress. An example formula notation for this calculation is shown below.

$$\frac{\sum\left(\begin{array}{l}\text{\# of signoffs marked}\\ \text{as reviewed or}\\ \text{special reviewed for}\\ \text{first procedure}\\ \text{category}\\ \hline \text{\# of types of}\\ \text{signoffs for the}\\ \text{first category}\end{array}+\begin{array}{l}\text{\# of signoffs marked}\\ \text{as reviewed reviewed}\\ \text{for second procedure}\\ \text{category}\\ \hline \text{\# of types of}\\ \text{signoffs for the}\\ \text{second category}\end{array}+\ldots\right)}{\sum\left(\begin{array}{l}\text{\# of signoffs that}\\ \text{could be marked}\\ \text{as reviewed or}\\ \text{special reviewed for}\\ \text{the first category}\\ \hline \text{\# of types of}\\ \text{signoffs for the}\\ \text{first category}\end{array}+\begin{array}{l}\text{\# of signoffs that}\\ \text{could be marked}\\ \text{as reviewed or}\\ \text{special reviewed for}\\ \text{the second category}\\ \hline \text{\# of types of}\\ \text{signoffs for the}\\ \text{second category}\end{array}+\ldots\right)}$$

In some embodiments, one or more weighting factors are utilized when determining the combined audit procedure progress. For example, each signoff of an audit procedure that has been marked as reviewed or special reviewed is weighted according to a weighting factor that approximates an amount of effort and/or amount of time required to perform the audit work required to review/special review the audit procedure. In one example, when determining the total number of signoffs marked as reviewed or special reviewed, each contributing signoff marked as reviewed or special reviewed is multiplied by a corresponding weighting factor.

At 904, the summarized total audit progress of the audit procedure grouping is visually indicated. For example, the total audit progresses for various audit procedure groupings are listed. In some embodiments, the determined total audit progresses of the audit procedure groupings are displayed in a graphical format. For example, a progress bar, a bar chart, a pie chart, or another type of chart may be visually provided. In some embodiments, for each audit procedure grouping, a combined progress bar that includes an overlay of a reviewed/special reviewed audit procedure signoff progress bar over a prepared audit procedure signoff progress bar is provided. For example, the visual indication shown in FIG. 11A is provided.

Figure 10:
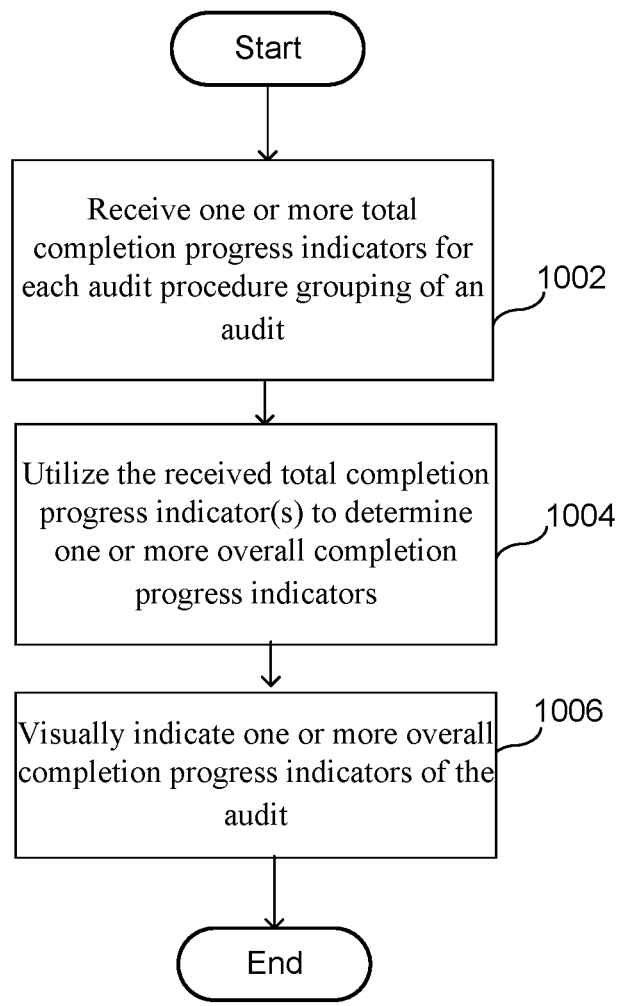
FIG. 10 is a flowchart illustrating an embodiment of a process for automatically determining an overall audit progress.

FIG. 10 is a flowchart illustrating an embodiment of a process for automatically determining an overall audit progress. The process of FIG. 10 may be implemented on server 106 of FIG. 1. In some embodiments, the process of FIG. 10 is included in 212 of FIG. 2.

At 1002, one or more total completion progress indicators for each audit procedure grouping of an audit are received. In some embodiments, total completion progress indicators (e.g., percentage completion indicators) of each audit procedure grouping for each different type of signoff category (e.g., prepared, reviewed, technical reviewed, tax reviewed, other special reviewed, etc.) determined in 902 of FIG. 9 are received. For example, for each audit procedure grouping of an audit (e.g., planning audit procedure grouping, program audit procedure grouping, completion audit procedure grouping), a total completion progress indicator for (1) completed prepared signoffs and (2) completed reviewed and special reviewed signoffs are received.

At 1004, the received total completion progress indicator(s) are utilized to determine one or more overall completion progress indicators. In some embodiments, determining the overall completion progress indicator includes averaging one or more of the received total completion progress indicator(s) of audit procedure groupings. For example, received total completion progress indicators of audit procedure groupings for completed signoffs as prepared are averaged to determine an overall completion progress indicator for signoffs as prepared and received total completion progress indicators of audit procedure groupings for completed signoffs as reviewed and special reviewed are averaged to determine an overall completion progress indicator for signoffs as reviewed and special reviewed. In some embodiments, determining the overall completion progress indicator includes weighting and summing one or more of the received total completion progress indicator(s) of audit procedure groupings. For example, each received total completion progress indicator of an audit procedure grouping (e.g., completion percentage indicators of associated audit procedure grouping for a single type of signoff) to be utilized to determine the overall completion progress indicator (e.g., overall completion progress indicator for a single type of signoff) is multiplied by a weighting factor that approximates proportional amounts of effort and/or amount of time required to perform the audit work required to complete the associated audit procedure grouping and summed together. In some embodiments, the sum of all of weighting factors utilized to determine the overall audit progress indicator must equal one.

In one example, an overall completion percentage indicator for signoffs as prepared is determined by adding together the result of multiplying a total completion percentage indicator for signoffs as prepared of planning audit procedure grouping by its weighting factor (e.g., 0.2), the result of multiplying a total completion percentage indicator for signoffs as prepared of program audit procedure grouping by its weighting factor (e.g., 0.7), and the result of multiplying a total completion percentage indicator for signoffs as prepared of completion audit procedure grouping by its weighting factor (e.g., 0.1). In other words, Overall Audit Progress=(Weight A*Planning Audit Procedure Group Progress)+(Weight B*Program Audit Procedure Group Progress)+(Weight C*Completion Audit Procedure Group Progress). Although the example of overall completion percentage indicator for signoffs as prepared has been described above, the formula can be generalized for overall completion percentage indicator for signoffs as reviewed, special reviewed and/or a combination reviewed and special reviewed.

At 1006, one or more overall completion progress indicators of the audit are visually indicated. For example, overall completion progresses for various signoff types/categories are listed. In some embodiments, the determined overall completion progresses of the audit are displayed in a graphical format. For example, a progress bar, a bar chart, a pie chart, or another type of chart may be visually provided. In some embodiments, a combined progress bar that includes an overlay of a reviewed/special reviewed audit procedure signoff progress bar over a prepared audit procedure signoff progress bar is provided. For example, the visual indication shown in FIG. 11A is provided.

FIG. 11A is a diagram illustrating an embodiment of an interface element of a visualization of audit procedure progress indicators. Interface element 1102 shows overall audit procedure progress bar element 1104, planning audit procedure category progress bar element 1106, program audit procedure category progress bar element 1108, completion audit procedure category progress bar element 1110, and total technical review progress bar element 1112.

In some embodiments, overall audit procedure progress bar element 1104 has been at least in part generated using at least a portion of the process of FIG. 10. Element 1104 shows an overall signoff as reviewed completion progress bar (e.g., showing 90% completion) in a first color overlaid over an overall signoff as prepared completion progress bar (e.g., showing 95% completion) in a second color. The overall signoff as reviewed completion progress bar may track a combination completion progress of both signoffs as reviewed and special reviewed. In some embodiments, overall audit procedure progress bar element 1104 presents a weighted sum of data presented in audit procedure category progress bar elements 1106, 1108 and 1110.

In some embodiments, audit procedure category progress bar elements 1106, 1108 and 1110 have been at least in part generated using at least a portion of the process of FIG. 9. Element 1106 (and similarly in elements 1108 and 1110) shows an overall signoff as reviewed completion progress bar (e.g., showing 81% completion) in a first color overlaid over an overall signoff as prepared completion progress bar (e.g., showing 97% completion) in a second color. The overall reviewed signoff completion progress bars of elements 1106, 1108 and 1110 may track a combination completion progress of both signoffs as reviewed and special reviewed.

As shown in interface element 1102, total technical review progress bar element 1112 shows total signoff completion progress of all signoffs as technical reviewed (e.g., special review signoff) of audit procedures of an audit. In various embodiments, a separate progress bar element for each different type of signoff as special reviewed required in one or more audit procedures of the audit may be provided. For example, by separately presenting progress indication for a type of signoff as special review, the overall completion progress of each different type of special review signoff required to complete the audit can be quickly interpreted by a user.

By selecting the "view detail" arrow provided next to labels of elements 1106, 1108, 1110 and 1112, a listing of completion progresses of audit procedure categories contributing to the total completion indication provided in the corresponding element 1106, 1108, 1110 or 1112 is provided, as shown in FIG. 11B.

FIG. 11B is an example interface illustrating an embodiment of an interface element showing a visualization of audit procedure category progress indicators. Interface element 1120 shows a portion of a resulting interface when a user selects the "view detail" arrow next to the label of element 1106 shown in FIG. 11A. Audit procedure category completion progress listing 1122 includes a listing of completion progresses of audit procedure categories (e.g., generated using at least a portion of the process of FIG. 8) contributing to the total completion indication provided in the element 1106. The example shows a name of the audit procedure category and corresponding completed signoff as prepared percentage (or indicated as set to not applicable N/A), completed signoff as reviewed percentage, and overlaid progress bar graphical indication of both prepared and reviewed signoff percentages. The total signoff as reviewed completion progress may track a combination completion progress of signoffs as either reviewed or special reviewed.

Figure 12:
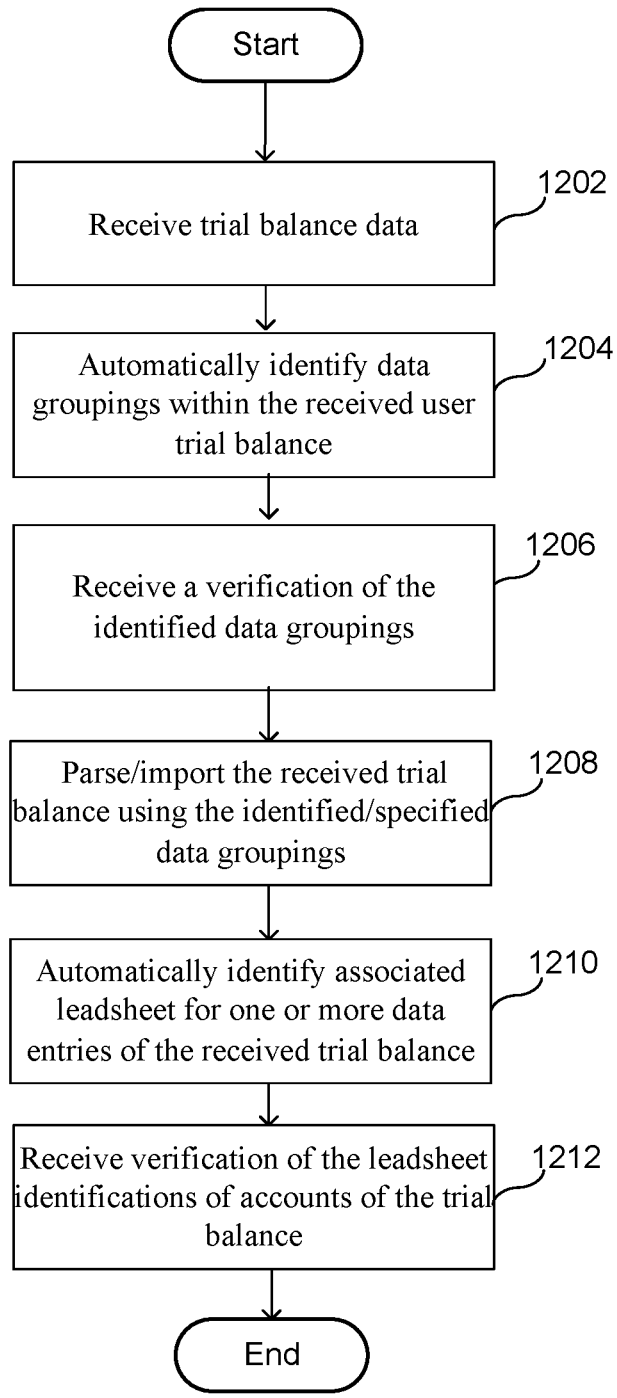
FIG. 12 is a flowchart illustrating an embodiment of a process for processing a trial balance.

FIG. 12 is a flowchart illustrating an embodiment of a process for processing a trial balance. The process of FIG. 12 may be implemented on server 106 and/or client device 102/104 of FIG. 1. In some embodiments, at least a portion of the process of FIG. 12 is included in 204 of FIG. 2.

At 1202, trial balance data is received. For example, a user uploads a spreadsheet file with trail balance data to a server for processing. In some embodiments, receiving the trial balance includes receiving one or more of the following: a spreadsheet (e.g., Microsoft Excel spreadsheet format, OpenDocument Spreadsheet format, comma-separated values format, etc.), a table, database records, and accounting software data. In some embodiments, the trial balance lists accounts of an entity (e.g., audit subject) and their account balances. The trial balance may include other information such as account name, account number, current year balance, previous year balance, associated entity/fund, current year credit, current year debit, previous year credit, previous year debit, and/or associated leadsheet identifier. The trial balance may be prepared by an accountant and provided to an auditor, and the auditor may provide the trial balance to an audit software/service to perform auditing using the audit software/service. The trial balance may be utilized to verify that all credits equal all debits. In some embodiments, the received trial balance is indicated as including additional account entries to be uploaded/imported/added in addition to accounts specified in a previously received and processed trial balance.

In some embodiments, receiving the trial balance includes receiving the trial balance via a network. For example, a user uploads the trial balance using an application that provides the trial balance to a server via a network for processing. In some embodiments, receiving the trial balance includes receiving the trial balance on an audit software provided on a software-as-a-service (SAAS) platform. For example, the trial balance is provided to a network server for storage and processing. In some embodiments, the trial balance is formatted in a user specific format. For example, the trial balance has been formatted/organized in a format created by the accountant of the entity of the trial balance. Various different user specific formats may utilize different labeling conventions, different data ordering, different types of included data, different numeric formatting, different spacing, different totaling conventions, etc. By allowing a user specific format trial balance to be provided rather than forcing a single trial balance format convention, a user providing the trial balance does not need to perform tedious manual conversions of trial balance formats. However, the system receiving the user specific format trial balance needs to perform special processing to comprehend the received trial balance that is not in a predetermined format. In some embodiments, the provided trial balance is required to follow a minimal constraint (e.g., specification of minimum type(s) of data required for each account included in the trial balance). For example, each account included in the trial balance is required to specify at least an account name, an account number, and/or a current account balance. In some embodiments, the trial balance is received from client 102 at server 106 via network 110 of FIG. 1.

In some embodiments, the received trial balance is indicated as including one or more replacement account entries that replace/correct one or more account entries of a previously received and processed trial balance. For example, if it is detected (e.g., account number/name/fund/entity match) that the received trial balance data includes an entry for an account that has been already imported/added from processing a previously received trial balance, account information associated with the previously received trial balance is removed/replaced with account information of the newly received trial balance and a user is provided an indication (e.g., in a list of imported/added/detected accounts of the trial balance) that the replacement has been detected. In some embodiments, the received trial balance is indicated as replacing an entire previously received trial balance and all account information imported/added/detected from the previously received trial balance is deleted/removed before importing/adding/detecting data of the newly received trial balance.

Figure 13A:
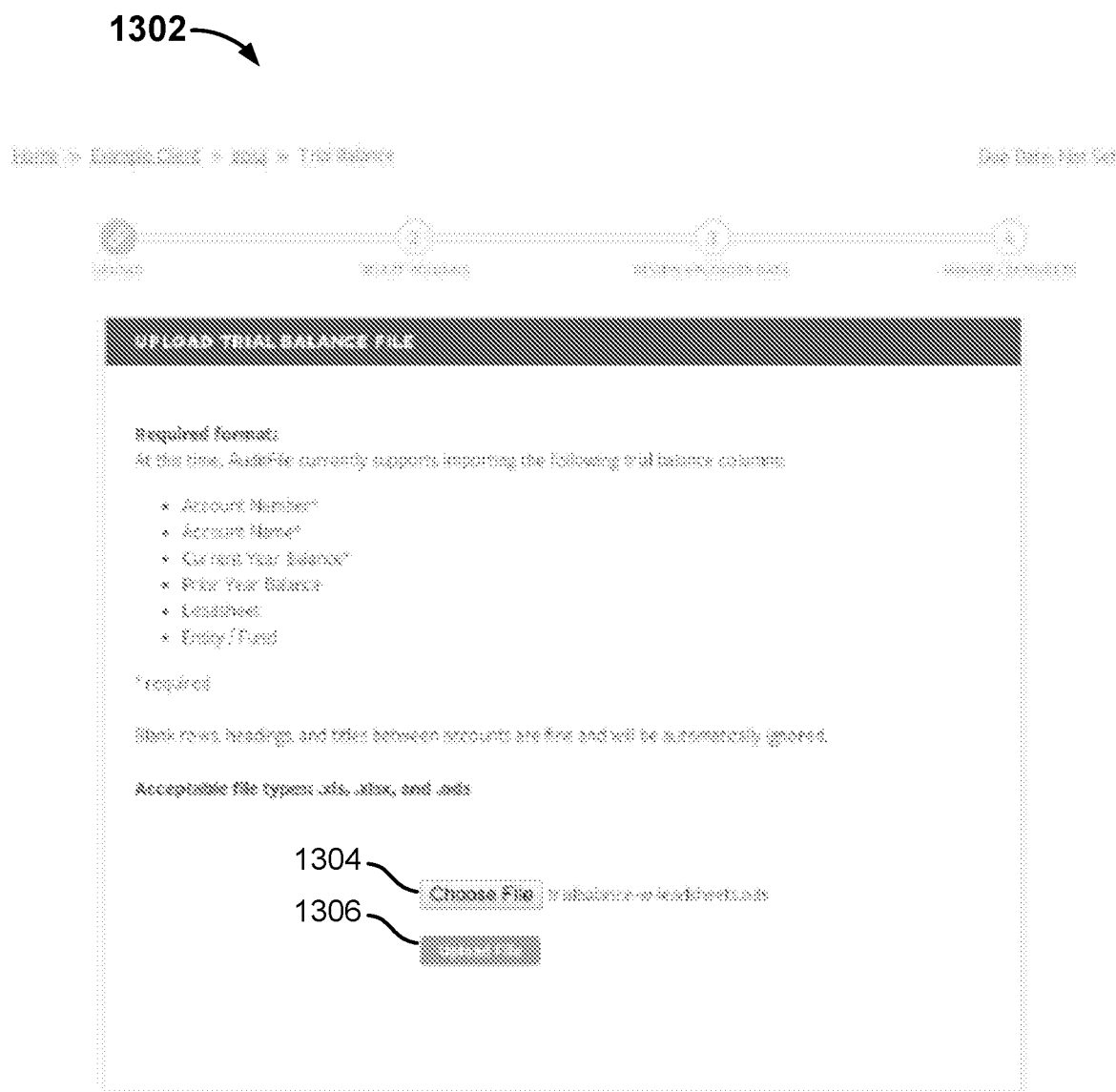
FIG. 13A is a diagram illustrating an embodiment of a user interface for providing a trial balance.

FIG. 13A is a diagram illustrating an embodiment of a user interface for providing a trial balance. For example, a user of user system 102 and/or 104 of FIG. 1 is provided interface 1302 using data provided from server 106 of FIG. 1 to provide the trial balance received in 1202 of FIG. 12. Interface 1302 shows instructions regarding a type of trial balance file accepted by an audit software and provides button 1304 that allows a user to select a file stored on a user storage (e.g., storage of user system 102/104 of FIG. 1) to be provided to the audit software. When a user selects button 1306, the trial balance file selected using button 1304 is provided to an audit software for processing. For example, the selected content is provided to a server via a network (e.g., network 110 of FIG. 1) for processing at a server (e.g., server 106 of FIG. 1).

Returning to FIG. 12, at 1204, data groupings within the received user trial balance are automatically identified. For example, the received trial balance includes column heading identifiers that identify types of data in the corresponding column and the one or more column heading identifiers are automatically identified as corresponding to a respective known predetermined category of data. In some embodiments, a data grouping includes a column of a spreadsheet/table. In some embodiments, identifying a data grouping includes identifying an entry in the received trial balance as a column heading identifier that corresponds to one of one or more predetermined types of trial balance data recognizable by an audit software. For example, the following types of trial balance data are recognizable by an audit software: account name, account number, current year balance, previous year balance, associated entity/fund, current year credit, current year debit, previous year credit, previous year debit, and/or associated leadsheet identifier. For each type of trial balance data type, one or more character patterns (e.g., character string permutations of known possible identifiers) that correspond to the specific trial balance data type may be predetermined. Data items (e.g., spreadsheet cell content) of the received trial balance may be analyzed to identify whether any of the data items match these character patterns or are sufficiently similar to these characters patterns. If a match or a close match is found, the data grouping (e.g., column/row of a spreadsheet, row, database record grouping, etc.) may be identified as a known trial balance data type grouping.

In some embodiments, if an exact match or a close match is found, one or more other entries within the data grouping of the match are tested to verify that a correct trial balance data type grouping has been identified. For example, if a match to a current year balance column identifier has been found, one or more other cells of the column of the match are tested to verify that these cells include a numerical number (e.g., a predetermined percentage of cells pass the test) before the column of the match is identified as the current year balance column in a trial balance spreadsheet.

At 1206, a verification of the identified data groupings is received. For example, automatically identified columns are provided (e.g., provided to a user device) for display to a user. The user may verify that the data groupings have been correctly identified by the automated identifier, correct any identification errors, or identify any new data groupings. For example, a user is provided information that labels/tags portions of the trial balance with automatically identified data type column identifiers. If an automatically identified data grouping identifier has been incorrectly identified or any data grouping was unable to be automatically identified, a user may be able to correct the error by providing a correct data grouping identifier of an associated data grouping of the trial balance. For example, for each column in the received trial balance, a drop down menu or another selection menu is provided to enable a user to provide/correct/verify a trial balance data type grouping associated with the column.

Figure 13B:
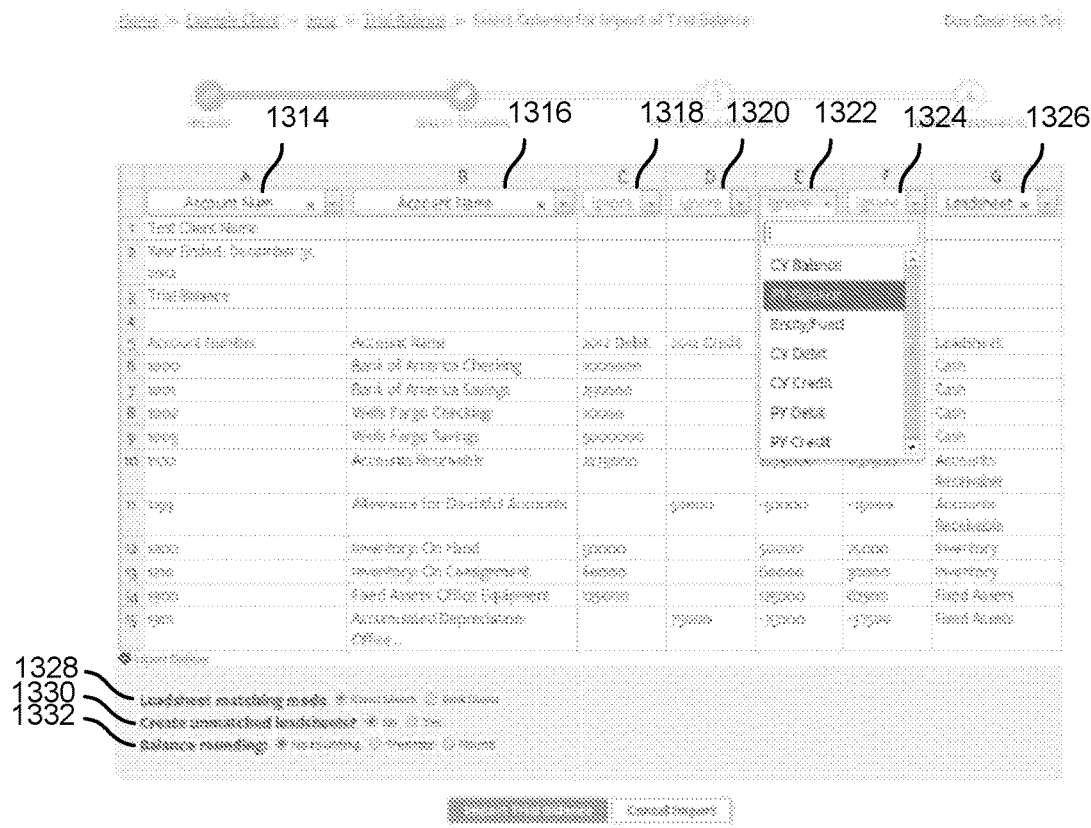
FIG. 13B is a diagram illustrating an embodiment of a user interface for providing a verification of identified data groupings.

FIG. 13B is a diagram illustrating an embodiment of a user interface for providing a verification of identified data groupings. For example, a user of user system 102 and/or 104 of FIG. 1 is provided interface 1312 using data provided from server 106 of FIG. 1 to receive verification of the identified data groupings received in 1206 of FIG. 12. Interface 1312 shows the first fifteen rows and seven columns of a received trial balance that have been analyzed. For example, the trial balance received in 1202 of FIG. 12 has been processed in 1204 to automatically identify one or more data groupings (e.g., columns) in the trial balance. Interface 1312 shows data grouping column identifications 1314, 1316, 1318, 1320, 1322, 1324, and 1326. Data grouping column identifications 1314, 1316 and 1326 have been automatically identified using at least a portion of the process in 1204 of FIG. 12. For example, as shown in Interface 1312, column identification 1314 identifies that the column has been identified as including account numbers. If this identification is incorrect, a user may select the drop-down menu of identification 1314 to select the correct grouping column identification (or indicate to ignore the column) within a provided list of available options or input (e.g., keyboard input) a custom grouping column identification. Data grouping column identifications 1318, 1320, 1322, and 1324 have not been automatically identified (e.g., was unable to be automatically identified) and as shown for column identification 1322, a user may provide the grouping column identification within a provided list of identification options or input a custom grouping column identification.

Column identification 1326 identifies that the associated column has been identified as including an identifier of a leadsheet for an associated account entry of the trial balance. For example, row number 12 of the leadsheet shown in interface 1312 identifies that the account named "Inventory: On Hand" belongs on the "Inventory" leadsheet. Option 1328 of interface 1312 allows a user to specify how to analyze the leadsheet identifier column. When identifying an associated leadsheet of an account, a user can specify whether corresponding data in the leadsheet identifier column must exactly match a predetermined leadsheet identifier or allow "best guess" fuzzy string matching to the most similar predetermined leadsheet identifier. Option 1330 of interface 1312 allows a user to specify how to interpret a leadsheet identifier in the leadsheet identifier column that does not match an entry in a predetermined list of leadsheets. If unmatched leadsheets are to be created, a new leadsheet is created in the event the specified leadsheet identifier in the trial balance does not match any of the predetermined list of leadsheets. Option 1332 of interface 1312 allows a user to specify how to round numerical numbers in the trial balance when parsing/importing the trial balance.

Returning to FIG. 12, at 1208, the received trial balance is parsed/imported using the identified/specified data groupings. For example, parsing the received trial balance includes identifying one or more rows of the trial balance as including information about a financial account and obtaining from the rows, data in specific columns identified by the identified data groups to place the obtained data in a data structure of an audit software such as an audit software service provided by server 106 of FIG. 1. In some embodiments, how to parse data and/or where to place the data in an internal data structure is determined based at least in part on the identified/specified data grouping of the data. For example, by knowing which data cell of a trial balance spreadsheet belongs to which predetermined trial balance data type, desired data from the trial balance can be exported from the received trial balance. In some embodiments, the parsed data is stored in an internal data structure such as a table, database, list, or any other data structure. The internal data structure may be stored in memory and/or stored in a storage such as storage 108 of FIG. 1.

At 1210, the associated leadsheet is automatically identified for one or more data entries of the received trial balance. In some embodiments, each account in a trial balance is categorized under one or more leadsheets to allow grouping of accounts under account type groups. For example, by separating accounts under different account types, one account type group may be audited/processed differently from another account type group. In some embodiments, automatically identifying the associated leadsheet includes analyzing contents of leadsheet data grouping identified in 1204. For example, in 1204, a leadsheet column that includes leadsheet identifiers has been identified and in 1210, by examining content in the leadsheet column, the associated leadsheet of an account may be identified.

For each predetermined leadsheet, one or more character patterns (e.g., permutations of known possible identifiers) that correspond to the identifier of the leadsheet may be predetermined. In some embodiments, automatically identifying the associated leadsheet of an account includes determining whether a leadsheet identifier (e.g., located using a data grouping identified in 1204) of the account matches or is sufficiently similar to any character patterns associated with the predetermined leadsheets. If a match or a close match (e.g., similarity measure meets a threshold) is found, the account may be identified as belonging to the identified leadsheet. If a match cannot be found, the account may be identified as unidentified to a specific leadsheet or identified as belonging to a new type of leadsheet corresponding to a leadsheet identifier specified for the account in the trial balance.

At 1212, verification of the leadsheet identifications of accounts of the trial balance is received. For example, an automatically identified leadsheet (or indication that leadsheet is unidentified) for each account in the trial balance is indicated (e.g., provided to a user device) for display to a user. The user may verify that the associated leadsheet for an account has been correctly identified by the automated identifier, correct any identification errors, or identify any new leadsheets. For example, a user is provided information that labels/tags each account in the trial balance with identifiers of an automatically identified leadsheet or an indication that a leadsheet has not been identified for the account. If an automatically identified leadsheet identifier has been incorrectly identified or any account was unable to be automatically identified to a leadsheet, a user may be able to correct the error by specifying a correct leadsheet for the account. For example, for each identified account in the trial balance, a drop down menu or another selection menu is provided to enable a user to provide/correct/verify the associated leadsheet. In some embodiments, for each automatically identified leadsheet, a confidence indicator of the automatic identification is provided. In some embodiments, based on the indication of confidence, a confidence grouping is assigned and displayed to the user. For example, the confidence indicator is a numeric value and if the confidence indicator is within a first numeric range corresponding to the highest confidence level, the associated account is visually colored as green and if the confidence indicator is within a second numeric range corresponding to a lower confidence level, the associated account is visually colored as red. Any number or confidence groupings and associated visual indications may exist in various embodiments.

Figure 13C:
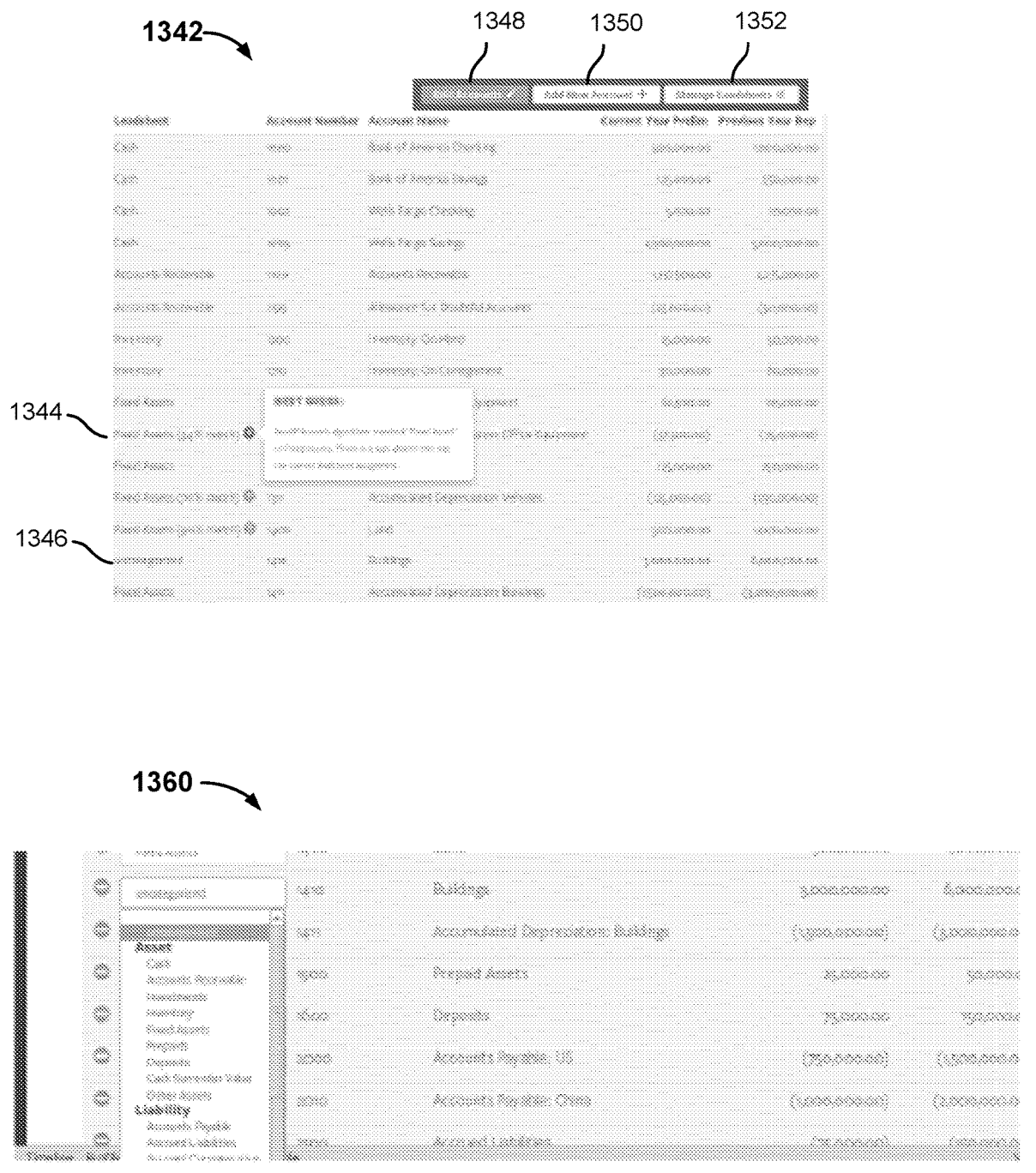

FIG. 13C is a diagram illustrating an embodiment of a user interface for providing a verification of identified leadsheets associated with accounts of a trial balance. For example, a user of user system 102 and/or 104 of FIG. 1 is provided interface 1342 using data provided from server 106 of FIG. 1 to receive verification of the automatically identified leadsheets in 1210 of FIG. 12. Interface 1342 may be utilized to provide the verification in 1212 of FIG. 12.

Interface 1312 of FIG. 13B shows the accounts that are to be identified and parsed in 1208 of FIG. 12 from the trial balance received in 1202. For each account, the identifier of the associated leadsheet and other parsed details (e.g., account number, account name, current year balance, previous year balance, etc.) of the account are determined. When a leadsheet identifier specified in the received trial balance for an account does not exactly match an entry in a predetermined list of leadsheets, the closest matching predetermined leadsheet may be assigned to the account if a measurement of similarity between the leadsheet identifier and the identifier of the predetermined leadsheet meets a threshold. As shown in interface 1342 of FIG. 13C, if a leadsheet identifier in a trial balance was matched to a predetermined leadsheet identifier based on the similarity measurement rather than an exact match, the similarity measurement (e.g., measurement of correctness) is provided to a user. For example, line 1344 shows that the account of line 1344 was matched to the "Fixed Assets" leadsheet even though its trial balance leadsheet identifier entry specified "Faxed Assets" (e.g., likely a typographical error) and the measurement of similarity between "Faxed Assets" and "Fixed Assets" is 94%. By selecting or hovering over the "?" icon, a user is provided an explanation of the "best guess" similarity match as well as the originally specified leadsheet identifier in the received trial balance.

Accounts that were unable to be automatically assigned a leadsheet (e.g., measurement of similarity between a leadsheet identifier in the trial balance and each preconfigured leadsheet identifier is below a threshold) are visually indicated in interface 1342 as highlighted in red color. Line 1346 highlighted in red shows that the "Buildings" account has not been categorized under a leadsheet. Other accounts shown in interface 1342 have been highlighted in green to indicate that a leadsheet has been automatically matched. In some embodiments, an account listing is colored a different color to indicate that although a leadsheet was matched to the account automatically, the measurement of similarity between the leadsheet identifier in the trial balance and the predetermined identifier of the assigned leadsheet is within a certain range (e.g., a range that may result in an incorrect match). For example, account entries shown on an interface are shaded yellow (e.g., similarity measurement between 50-70%) to indicate user review of the automatic match is desirable.

A user may select button 1348 to edit the leadsheet matched to an account, specify a leadsheet for the account, or remove the account. For example, once button 1348 has been selected, a user may specify the leadsheet for line 1346 by selecting a leadsheet from a list of leadsheets in a dropdown selection menu as shown in interface 1360. A user may select button 1350 to add a new account. A user may select button 1352 to manage (e.g., add, remove, edit) the list of possible leadsheets that an account may be assigned to.

Figure 13D:
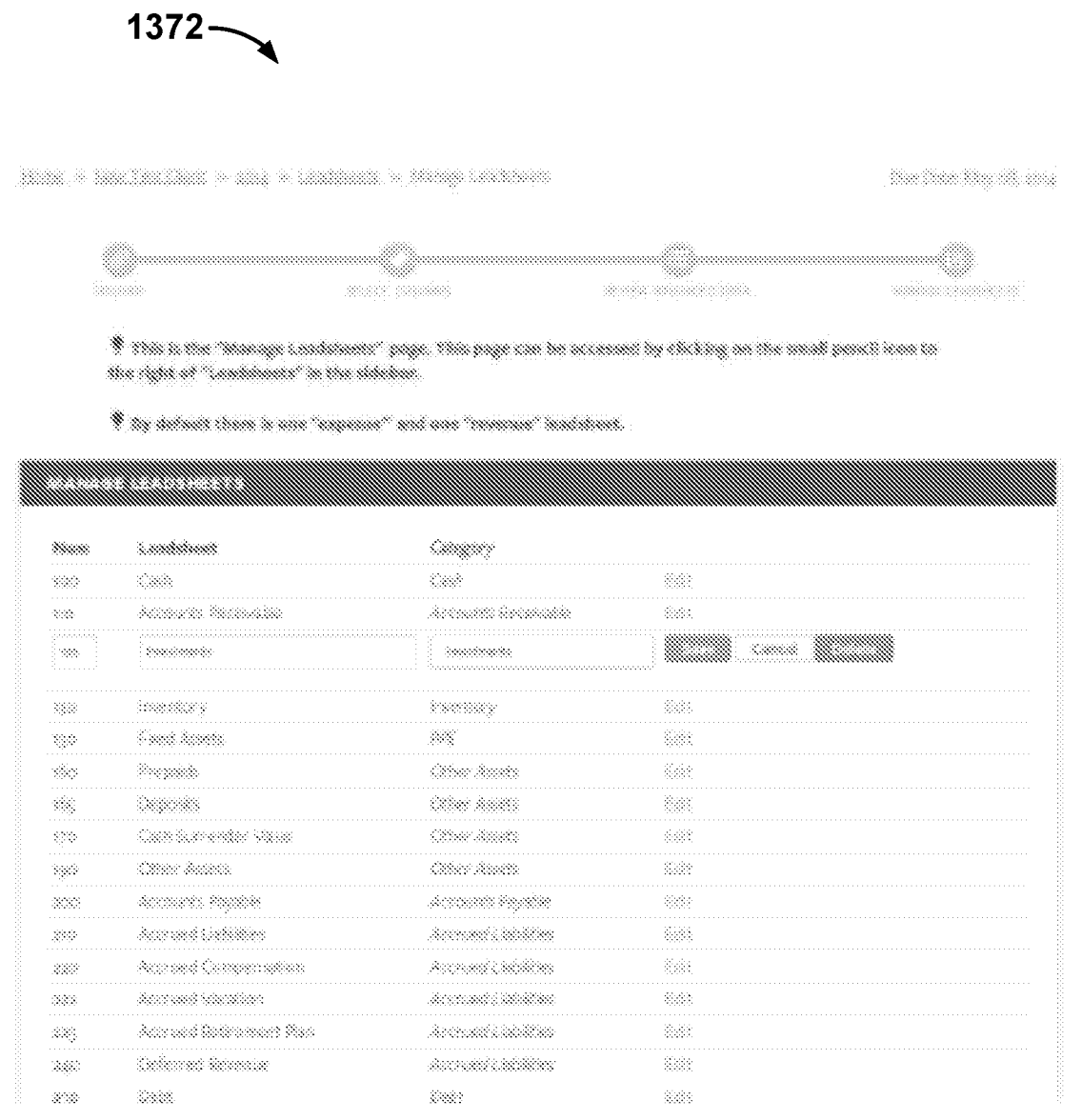

FIG. 13D is a diagram illustrating an embodiment of a user interface for managing leadsheets. For example, a user of user system 102 and/or 104 of FIG. 1 is provided interface 1372 when a user selects button 1352 of FIG. 13C. As shown in interface 1372, a user may edit the leadsheet number, leadsheet identifier, and leadsheet category (e.g., multiple leadsheets may be assigned to the same category and leadsheets in the same leadsheet category may be audited together, audited using the same/similar procedure, and/or organized together). Additionally, a user may delete a leadsheet and add a new leadsheet.

Figure 14:
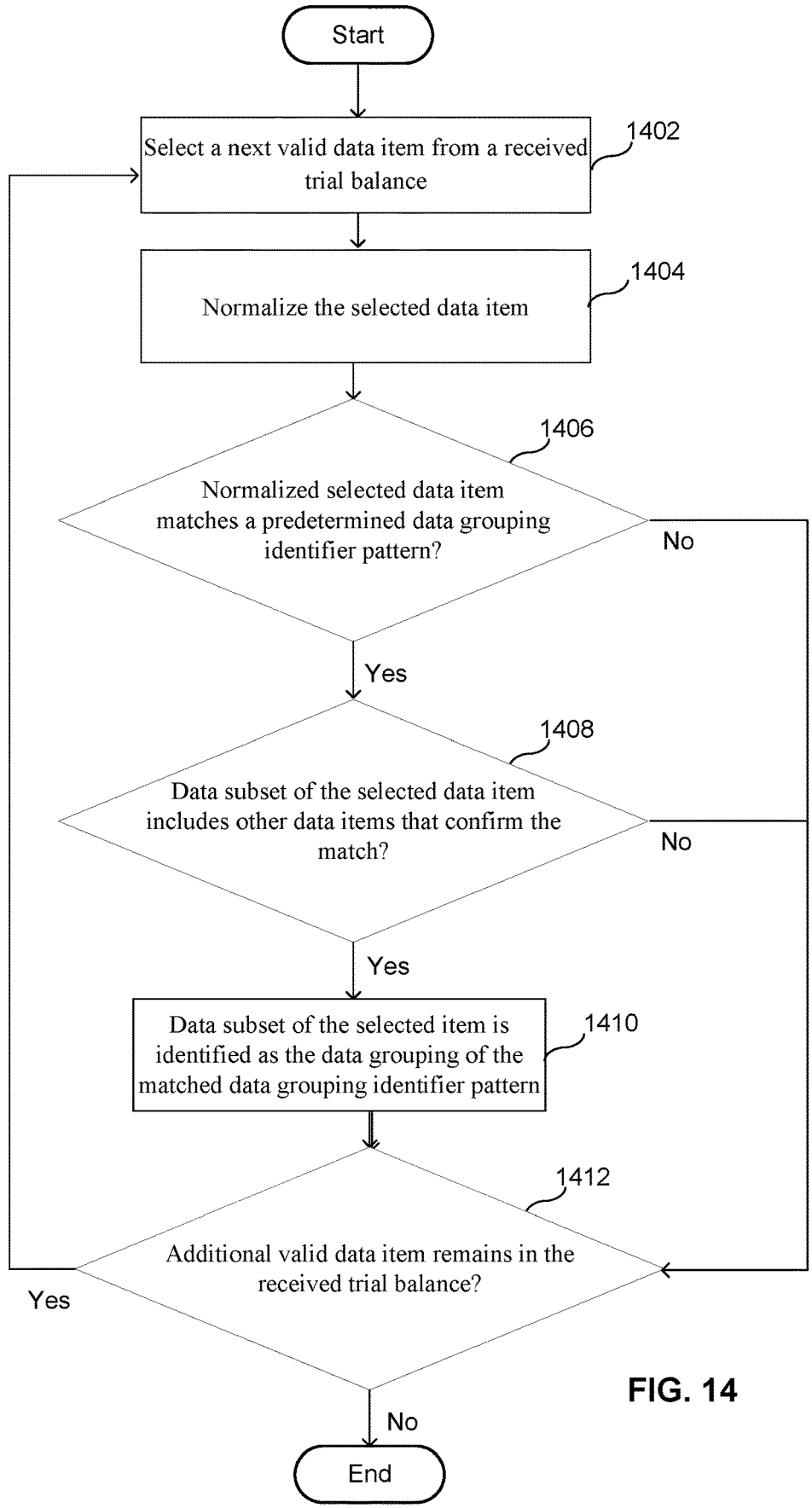
FIG. 14 is a flowchart illustrating an embodiment of a process for automatically identifying a data grouping within a received user trial balance.

FIG. 14 is a flowchart illustrating an embodiment of a process for automatically identifying a data grouping within a received user trial balance. The process of FIG. 14 may be implemented on client device 102/104 and/or server 106 of FIG. 1. In some embodiments, the process of FIG. 14 is included in 1204 of FIG. 12.

At 1402, a next valid data item is selected from a received trial balance. In some embodiments, the trial balance was received in 1202 of FIG. 12. In some embodiments, selecting the next valid data item includes selecting the next data item to analyze in the received trial balance. For example, the next data cell to analyze in a received trial balance spreadsheet is selected for analysis. In some embodiments, selecting the next valid data item includes selecting a next data item that matches a criteria. For example, a data item in the trial balance is valid if the data item includes content (i.e., not blank) and is not a numeric value (e.g., cell typed as numeric value or only includes numeric content). In some embodiments, the next valid data item can be only selected within a specified portion of the received trial balance. For example, the next valid data time may be only selected within the first fifteen rows of the received trial balance and each next valid data cell within these fifteen rows is identified one by one in processing order for processing on each iteration of 1402 of the process of FIG. 14. The specified portion of the trial balance may be preconfigured and/or dynamically determined.

At 1404, the selected data item is normalized. In some embodiments, normalizing the selected data item includes formatting content of the data item to place the selected data item in a consistent state for comparison. Normalizing the selected data item may include changing the case of one or more characters and/or removing spacing of one or more characters. For example, the selected data item is converted to all lower case and all spacing is removed.

At 1406, it is determined whether the normalized selected data item matches a predetermined data grouping identifier pattern. For example, for each type of data grouping (e.g., each type of data column including a certain type data) that can be automatically identified, one or more identifier patterns are predetermined. Examples of the data grouping include the following: account name data grouping, account number data grouping, current year balance data grouping, previous year balance data grouping, associated entity/fund data grouping, current year credit data grouping, current year debit data grouping, previous year credit data grouping, previous year debit data grouping, and leadsheet identifier data grouping. In some embodiments, the received trial balance is searched to locate column heading identifiers that match predetermined identifiers of automatically detectable column data groupings.

The data grouping identifier patterns for each data grouping may include a list of character strings (e.g., in the normalized format of 1404) of common identifiers of the associated data grouping that could be specified in a received trial balance (e.g., common column heading identifier in normalized format without capitalization and spaces). The data grouping identifier patterns may capture variations, deviations, alternate spellings, synonyms, and abbreviations of an identifier that identifies the data grouping. For example, for the account name data grouping, the following grouping identifier patterns are predetermined: 'acctname', 'accountname', 'description', 'actname', 'name', and 'account'. In another example, for the entity/fund data grouping, the following grouping identifier patterns are predetermined: 'fund', 'funds', 'entity', and 'entities'. In another example, for the account number data grouping, the following grouping identifier patterns are predetermined: 'acctnum', 'actnum', 'number', 'acct#', 'act#', 'account', 'id', 'actno', 'acctno', 'accountnumber', and '#'. In another example, for the leadsheet data grouping, the following grouping identifier patterns are predetermined: 'l/s', 'ls', 'leadsheets', 'leadcode', and 'lead'. In some embodiments, the data grouping identifier patterns include a regular expression.

In the example shown in FIG. 13B, interface 1312 shows that column A of the shown trial balance has been automatically identified as the account number data grouping because in cell A5 of the trial balance, the "Account Number" has been normalized to "accountnumber" and matched with an identifier pattern associated with the account number data grouping.

In some embodiments, matching the normalized data item to a predetermined data grouping identifier pattern includes determining whether the normalized data item exactly matches at least one of one or more data grouping identifier patterns of predetermined potentially identifiable data groupings. For example, a listing of identifiable data groupings is specified and for each of the identifiable data groupings, one or more corresponding data grouping identifier patterns have been specified. The normalized data item may be compared with each of the data grouping identifier patterns of all the predetermined identifiable data groupings to identify an exact match to the data grouping identifier pattern, if any.

In some embodiments, matching the normalized data item to the predetermined data grouping identifier pattern includes determining whether the normalized data item is similar to any of one or more data grouping identifier patterns of predetermined potentially identifiable data groupings. For example, a measurement of similarity between the normalized data item and each pattern of the data grouping identifier patterns of all the predetermined identifiable data groupings are determined, and if a measurement of similarity is greater than a threshold for the closest matching pattern, the closest matching pattern is determined as matching the normalized data item.

If at 1406, it is determined that the normalized selected data item does match a predetermined data grouping identifier pattern, at 1408, it is determined whether the data subset of the selected data item includes other data items that confirm the match. For example, it is determined whether the data subset (e.g., column) of the selected data item includes other data items that confirm that the selected data item includes an identifier of a data grouping associated with a matching identifier pattern. For example, one or more testing criteria are associated with each type of predetermined data grouping, and one or more data items (e.g., content in spreadsheet cells of a trial balance) in the data subset of the selected data item (e.g., column that includes the selected data item) are tested using the testing criteria associated with the data grouping associated with the matching identifier pattern. Examples of the testing criteria include a specification of a type of content, a type of cell, and/or actual content that is to be included in the data item being tested to confirm that the tested data item belongs in the associated data grouping. The other data items of the data subset to be tested may be selected at random within the subset, selected from a portion of the data subset after the selected data item, and/or from a preconfigured portion of the data subset. In some embodiments, determining whether the data subset of the selected data item includes other data items that confirm identifier pattern match includes determining that a predetermined number and/or percentage of tested data items in the data subset meets associated testing criteria. In some embodiments, determining whether the data subset of the selected data item includes other data items that confirm identifier pattern match includes determining that all or a predetermined portion of all items in the data subset meets an associated testing criteria.

In the example shown in FIG. 13B, interface 1312 shows that column B of the shown trial balance has been automatically identified as the account name data grouping because in cell B5 of the trial balance, the "Account Name" data item has been normalized and matched to data grouping identifier pattern "accountname" of the account name data grouping. Before column B was identified as the account name data grouping, contents of cells B6, B7, and B8 were tested to determine that the contents of these cells meet an associated testing criteria that specifies that the account name data grouping includes cells with characters. In comparison, for column A of interface 1312, it has been automatically identified as the account number data grouping because in cell A5 of the trial balance, the "Account Number" data item has been normalized and matched to data grouping identifier pattern "accountnumber" of the account name data grouping. Before column A was identified as the account number data grouping, contents of cells A6, A7, and A8 were tested to determine that the contents of these cells meet an associated testing criteria that specifies that the account number data grouping includes cells with numeric values.

In an alternative embodiment, step 1408 is optional. For example, if at 1406 it is determined that the normalized selected data item does match a predetermined data grouping identifier pattern, the process proceeds to 1410.

If at 1408, it is determined that the data subset of the selected data item includes other data items that confirm the match, at 1410 the data subset of the selected item is identified as the data grouping of the matched data grouping identifier pattern. In some embodiments, identifying the data subset of the selected item as the data grouping includes identifying a column of the selected item as the data grouping (e.g., as one of the predetermined types of the predetermined data grouping). This identified data grouping may be displayed as a column identification of a received trial balance. For example, as shown in FIG. 13B, interface 1312 shows that column B of the shown trial balance has been automatically identified as the account name data grouping. In some embodiments, the identified data grouping is provided to a user for verification (e.g., verification received in 1206 of FIG. 12). In some embodiments, the identified data grouping is utilized to parse data included in the data subset of the selected data item (e.g., parsed in 1208 of FIG. 12).

In some embodiments, once the data grouping of the matched data grouping identifier pattern has been identified as the data grouping of the selected data item, the data grouping of the matched data grouping identifier is no longer eligible to be identified again as a data grouping of another data subset of the received trial balance. For example, in the event the process returns to 1406, all data grouping identifier patterns associated with the data grouping of the matched data grouping identifier are not included in the group of data grouping identifier patterns eligible to be matched with the normalized selected data item.

If at 1406, it is determined that the normalized selected data item does not match any predetermined data grouping identifier pattern, the process proceeds to 1412. If at 1408, it is determined that the data subset of the selected data item does not include other data items that confirm that the selected data item includes the identifier of the data grouping associated with the matching identifier pattern, the process proceeds to 1412.

At 1412, it is determined whether an additional valid data item remains in the received trial balance. For example, it is determined whether a next (e.g., next in traversal order) data item that matches a criteria (e.g., not blank and includes content other than numeric value in the first preconfigured number of data rows) exists in the trial balance received in 1202 of FIG. 12. If at 1412 it is determined that an additional valid data item remains in the received trial balance, the process returns to 1402 where a next (e.g., next in traversal reading order) valid data item is selected from the received trial balance. If at 1412 it is determined that an additional valid data item does not remain in the received trial balance, the process ends.

Figure 15:
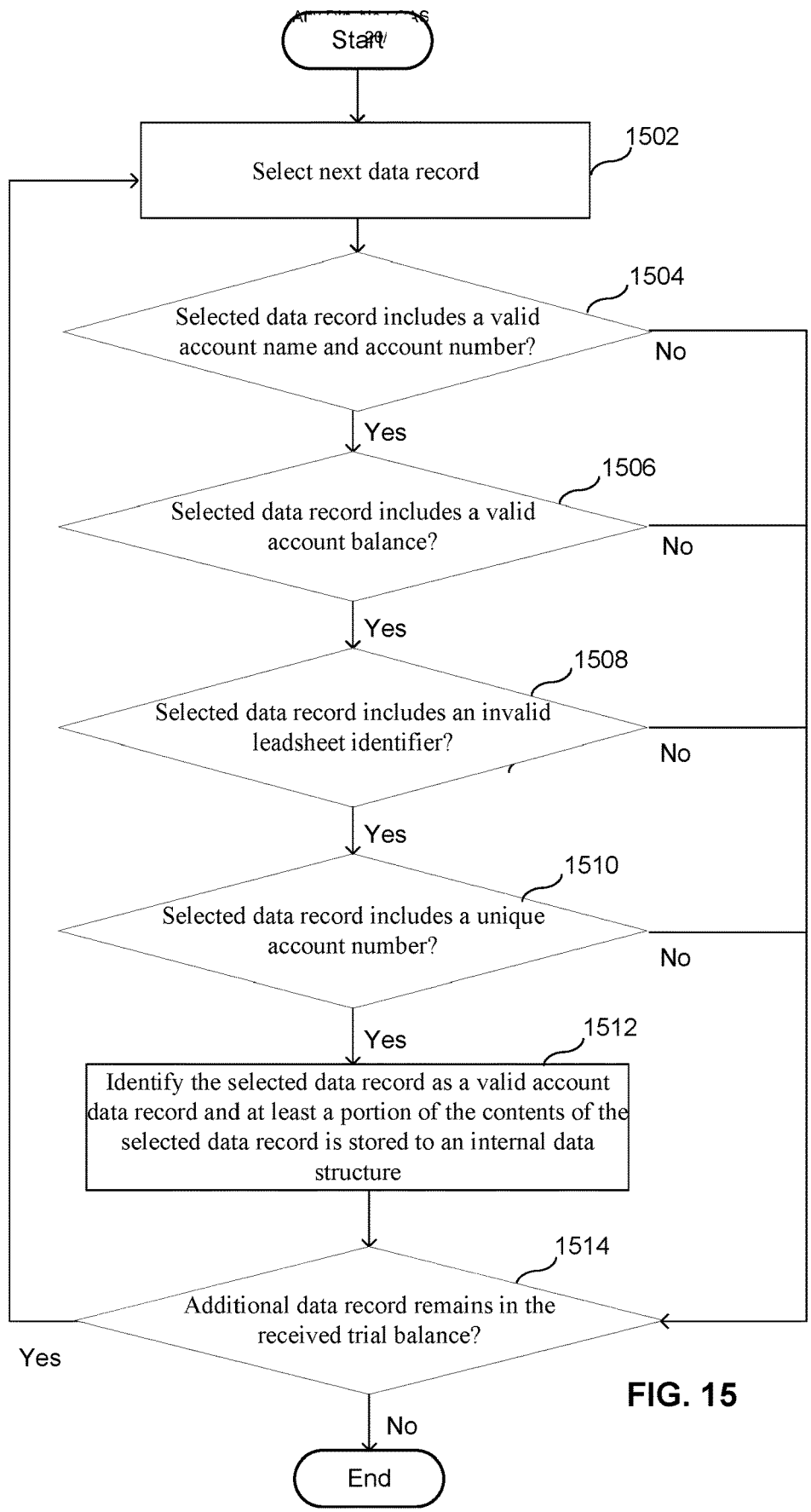
FIG. 15 is a flowchart illustrating an embodiment of a process for parsing a received trial balance using identified data groupings.

FIG. 15 is a flowchart illustrating an embodiment of a process for parsing a received trial balance using identified data groupings. The process of FIG. 15 may be implemented on server 106 and/or client device 102/104 of FIG. 1. In some embodiments, the process of FIG. 15 is included in 1208 of FIG. 12.

At 1502, a next data record is selected. In some embodiments, selecting the next data record includes selecting a next data row to be analyzed from a trial balance (e.g., spreadsheet) received in 1202 of FIG. 12. Examples of the data record include a spreadsheet row, a line, a chart row, a table row, a database record, a data structure record, and any other data record. In some embodiments, selecting the next data record includes selecting the next data record to analyze in the received trial balance. For example, the next data row to analyze in a received trial balance spreadsheet is selected for analysis. In some embodiments, selecting the next data record includes selecting a next data record that matches a criteria. For example, a data record in the trial balance meets the criteria if the data item includes content (i.e., not blank). In some embodiments, the next data record can be only selected within a specified portion of the received trial balance. In some embodiments, selecting the next data record includes selecting a data record that is next in a predetermined ordering of data records. For example, a next data record is selected in sequential order for processing. In some embodiments, the next data record includes a plurality of data rows. For example, it is determined that information associated with a single account spans multiple rows of a trial balance spreadsheet and the multiple rows associated with the single account are selected as the next data record.

At 1504, it is determined whether the selected data record includes a valid account name and account number. For example, data fields of the data record have been identified using the process of FIG. 14 and a first data field (e.g., data cell) identified as belonging to the account name data grouping (e.g., account name column) and a second data field (e.g., data cell) identified as belonging to the account number data field (e.g., account number column) are analyzed. In some embodiments, a data field of the data record includes a valid account name if the data field is not blank, includes one or more non-numeric characters, and/or includes data that is unique among other data fields of the associated data grouping (e.g., unique data in the account name spreadsheet column). In some embodiments, a data field of the data record includes a valid account number if the data field is not blank, includes only a numeric value, and/or includes data that is unique among other data fields of the associated data grouping (e.g., unique data in the account number spreadsheet column). If at 1504 it is determined that the data record includes a valid account name and account number, the process proceeds to 1506. If at 1504 it is determined that the data record does not include a valid account name and account number, the process proceeds to 1514. In an alternative embodiment, step 1504 is optional.

At 1506, it is determined whether the selected data record includes a valid account balance. In some embodiments, determining whether the data record includes the valid account balance includes determining whether the data record includes either a current account balance or a previous account balance. For example, data fields of the data record have been identified using the process of FIG. 14, and a data field (e.g., data cell) identified as belonging to a current year account balance grouping (e.g., current account balance column) and/or a data field (e.g., data cell) identified as belonging to the previous year account balance field (e.g., previous year account balance column), if in existence, is analyzed. In some embodiments, a data field of the data record includes a valid account balance if the data field identified as an account balance (e.g., current or previous) is not blank and includes only a numeric value (e.g., value is a number or spreadsheet cell is typed as including a numeric/monetary value). If at 1506 it is determined that the data record includes a valid account balance, the process proceeds to 1508. If at 1506 it is determined that the data record does not include a valid account balance, the process proceeds to 1514. In an alternative embodiment, step 1506 is optional.

At 1508, it is determined whether the selected data record includes an invalid leadsheet identifier. In some embodiments, determining whether the data record includes the invalid leadsheet identifier includes determining whether the data record includes a leadsheet identifier that does not identify to a specific leadsheet. For example, data fields of the data record have been identified using the process of FIG. 14 and a data field (e.g., data cell) of the data record identified as belonging to a trial balance identifier grouping (e.g., trial balance identifier column), if applicable, is analyzed to determine whether it includes an invalid leadsheet identifier. In some embodiments, the data field of the data record is compared with a group of one or more predetermined invalid leadsheet identifiers to determine whether the data field includes an entry from the group. If the data field includes the entry, it is determined that the data record includes an invalid leadsheet identifier. Contents of the data field may be normalized (e.g., spaces removed and case changed to lowercase) before being compared with entries of the group of invalid leadsheet identifiers. Examples of entries in the group of predetermined invalid leadsheet identifiers include: 'l/s', 'ls', 'leadsheets', 'leadcode', and 'lead'. For example, the predetermined invalid leadsheet identifiers identify that the selected data record does not include data about a specific account. If at 1508 it is determined that the selected data record includes an invalid leadsheet identifier, the process proceeds to 1510. If at 1508 it is determined that the selected data record does not include an invalid leadsheet identifier, the process proceeds to 1514. In an alternative embodiment, step 1508 is optional.

At 1510, it is determined whether the selected data record includes a unique account number. For example, data fields of the data record have been identified using the process of FIG. 14 and a data field (e.g., data cell) identified as belonging to the account number data group (e.g., account number column) is analyzed to determine whether it includes a unique identifier. In some embodiments, the account number data field of the selected record includes a unique account number if the data field includes contents that are unique across all account number entries of the account number data group (e.g., unique in the account number column). In some embodiments, the account number data field of the selected record includes a unique account number if the data field includes contents that are unique across all account number entries of the account number data group that are associated with the same fund/entity (e.g., fund/entity identified by a data field of the selected data record identified as belonging to the fund/entity identifier data group column). In some embodiments, if the selected data record includes a non-unique account number, an error message is provided that a duplicated account number has been found. If at 1510 it is determined that the selected data record includes a unique account number, the process proceeds to 1512. If at 1510 it is determined that the selected data record does not include a unique account number, the process proceeds to 1514. In an alternative embodiment, step 1510 is optional.

At 1512, the selected data record is identified as a valid account data record and at least a portion of the contents of the selected data record is stored to an internal data structure. In some embodiments, storing the contents of the selected data record includes importing/parsing/reading one or more data fields (e.g., spreadsheet data cells) of the selected data record and storing one or more results in an internal data structure of an audit software/service (e.g., software service provided by server 106 of FIG. 1). Examples of the internal data structure include a table, database, list, or any other data structure. The internal data structure may be stored in memory and/or stored in a storage such as storage 108 of FIG. 1. In some embodiments, how to parse data fields and/or where to place the imported/parsed/read data in the internal data structure is determined based at least in part on an identified/specified data grouping associated with the data field of the selected data record to be imported/parsed/read. For example, by knowing which data cell of a trial balance spreadsheet belongs to which predetermined trial balance data type (e.g., know which column contains which data), desired data from the trial balance can be exported from the received trial balance to the internal data structure of an audit software. In some embodiments, at 1512, a leadsheet associated with a selected data record is automatically identified. For example, a leadsheet identifier data grouping associated with a data field of the selected data record has been identified using the process of FIG. 14 and the account of the selected data record is assigned to a leadsheet identified by a leadsheet identifier included in the leadsheet identifier data field of the selected data record.

At 1514, it is determined whether an additional data record remains. For example, it is determined whether a next (e.g., next in traversal order) data record exists in the trial balance received in 1202 of FIG. 12. In some embodiments, it is determined whether an additional valid data record remains (e.g., within a specific portion of the trial balance). If at 1514 it is determined that an additional data record remains in the received trial balance, the process returns to

1502 where a next (e.g., next in traversal reading order) data record is selected from the received trial balance. If at 1514 it is determined that an additional data record does not remain in the received trial balance, the process ends. In some embodiments, if at 1514 it is determined that an additional data record does not remain in the received trial balance, using the data stored in 1512 for all accounts specified in the received trial balance, it is determined whether the trial balance balances (e.g., verify that all credits equal all debits of all the accounts specified in the trial balance). If the accounts of the trial balance do not balance, an error message is provided to a user.

In some embodiments, if a data record of the received trial balance is not processed at 1512 and reaches 1514, the data record is indicated as not a valid account data record. For example, a user is provided an indication of all of the rows/lines of a trial balance that have not been parsed/stored in the internal data structure and the user is able to verify whether all rows/lines of the trial balance that include account information have been recognized by an audit software and parsed/imported by the audit software on its internal data structure.

Figure 16:
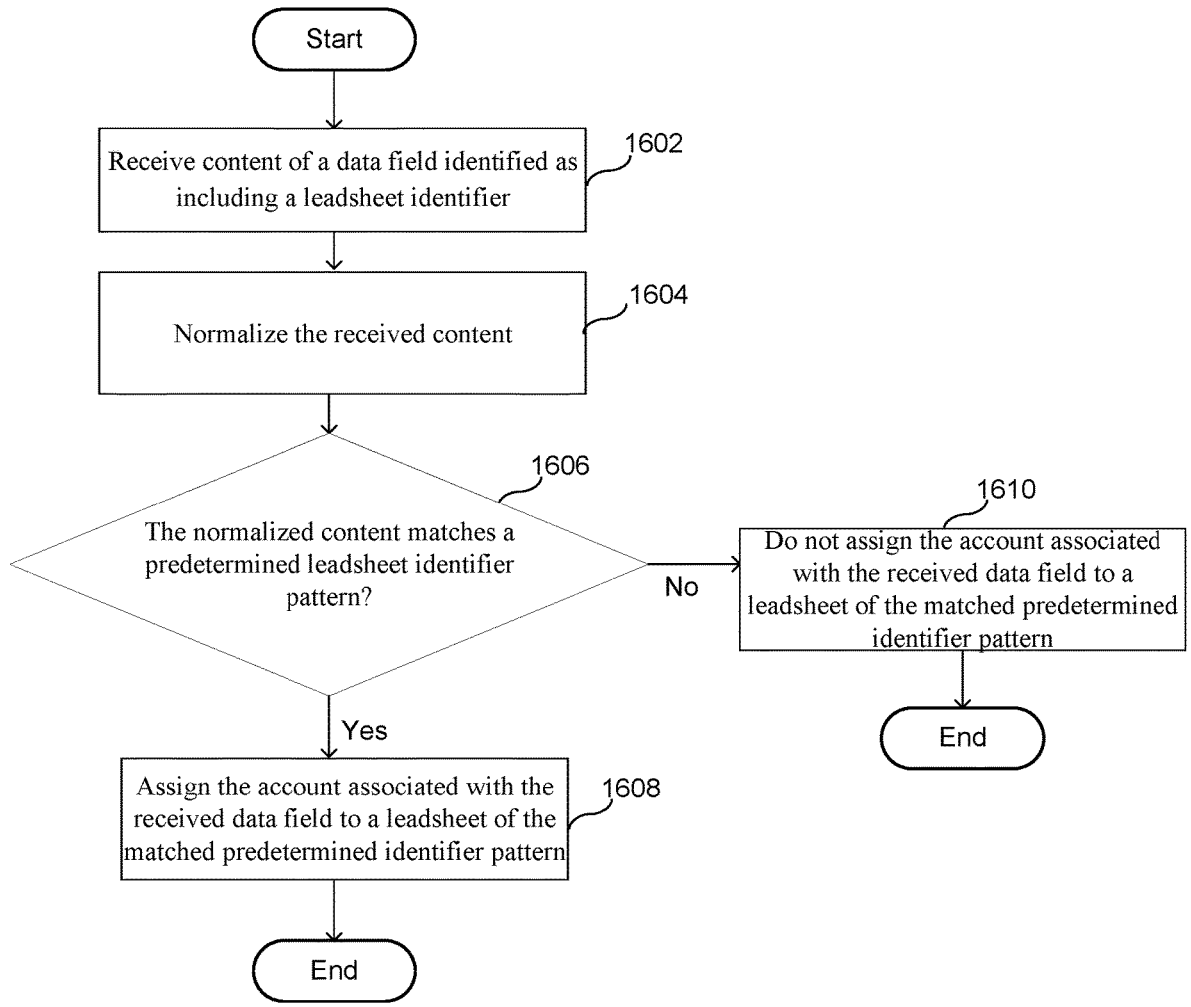
FIG. 16 is a flowchart illustrating an embodiment of a process for identifying a leadsheet.

FIG. 16 is a flowchart illustrating an embodiment of a process for identifying a leadsheet. The process of FIG. 16 may be implemented on server 106 and/or client device 102/104 of FIG. 1. In some embodiments, the process of FIG. 16 is included in 1210 of FIG. 12. In some embodiments, the process of FIG. 16 is included in 1512 of FIG. 15 and is repeated for each iteration of 1512.

At 1602, content of a data field identified as including a leadsheet identifier is received. For example, a column of a received trial balance has been identified as including identifiers of leadsheets associated with associated financial accounts of the corresponding rows (e.g., identified in 1204 of FIG. 12 and/or using the process of FIG. 14) and the data field included in the column is received for leadsheet identification. In some embodiments, the data field is included in the selected data record of 1512 of FIG. 15.

At 1604, the received content is normalized. In some embodiments, normalizing the received content includes formatting the content to place the content in a consistent state for comparison. Normalizing the content may include changing case of one or more characters and/or removing spacing of one or more characters. For example, the received content is converted to all lower case.

At 1606, it is determined whether the normalized content matches a predetermined leadsheet identifier pattern. For example, for each leadsheet that has been preconfigured to be automatically identified, one or more identifier patterns are predetermined. In some embodiments, each account in a trial balance is categorized under one or more leadsheets to allow grouping of accounts under account type groups. For example, by separating accounts under different account types, one account type group and/or accounts of a particular leadsheet may be audited differently from another account type group and/or accounts of a different leadsheet. For each predetermined leadsheet, one or more identifier patterns (e.g., permutations of known possible identifiers) that correspond to the specific leadsheet may be predetermined. Examples of the leadsheet identifiers include: 'cash', 'accounts receivable', 'inventory', 'accounts payable', etc.

The leadsheet identifier patterns may include a list of character strings (e.g., in the normalized format of 1604) of common identifiers of leadsheets that could be specified in a received trial balance. The leadsheet identifier patterns may capture variations, deviations, alternate spellings, synonyms, and abbreviations of an identifier that identifies a leadsheet. In some embodiments, a user may specify custom leadsheets desired by the user.

In some embodiments, matching the normalized content includes determining whether the normalized content matches or is sufficiently similar to any identifier patterns associated with predetermined leadsheets. In some embodiments, matching the normalized content to a predetermined leadsheet identifier pattern includes determining whether the normalized content matches at least one of one or more leadsheet identifier patterns of potentially identifiable leadsheets. The normalized content may be compared with each of the leadsheet identifier patterns of all the predetermined leadsheets to identify a matching leadsheet pattern, if any. In some embodiments, matching the normalized content to the predetermined leadsheet identifier pattern includes determining whether the normalized content is similar to any of one or more leadsheet identifier patterns of potentially identifiable leadsheets. For example, a measurement of similarity between the normalized content and each pattern of the leadsheet identifier patterns is determined, and if a measurement of similarity is greater than a threshold for the closest matching pattern, the closest matching pattern is determined as matching the normalized content.

If at 1606, it is determined that the normalized content matches a predetermined leadsheet identifier pattern, at 1608, the account associated with the received data field is assigned to a leadsheet of the matched predetermined identifier pattern. For example, if an exact match or a close similarity match (e.g., similarity measure meets a threshold) is found, the account associated with the normalized content (e.g., account specified by data record that includes the data field of the normalized content) may be identified as belonging to the identified leadsheet. In some embodiments, by identifying accounts specified in a trial balance under one or more leadsheets, the accounts are categorized by account type/category. For example, all accounts identified under the same leadsheet are accounts of the same type or category. By separating accounts under different account types, one account type group and/or accounts of a particular leadsheet may be audited/processed differently from another account type group and/or accounts of a different leadsheet. In some embodiments, a plurality of leadsheets belong to the same type/category. In some embodiments, the assigned leadsheet of the account is provided for verification at 1212 of FIG. 12.

If at 1606, it is determined that the normalized content does not match a predetermined leadsheet identifier pattern, at 1610, the account associated with the received data field is not assigned to a leadsheet. For example, the account associated with the received data field is assigned to an unassigned leadsheet category. A user may be prompted to manually identify the leadsheet associated with the account. For example, the user manually specifies the leadsheet for the account in 1212 of FIG. 12. In an alternative embodiment, rather than not assign a leadsheet to the account, a new leadsheet is created using the normalized content (e.g., added to a list of predetermined leadsheets with an associated leadsheet identifier set as the normalized content) and the account is assigned to the newly created leadsheet. This alternative embodiment may be utilized if desired by a user (e.g., option set using 1330 of FIG. 13B).

Figure 17:
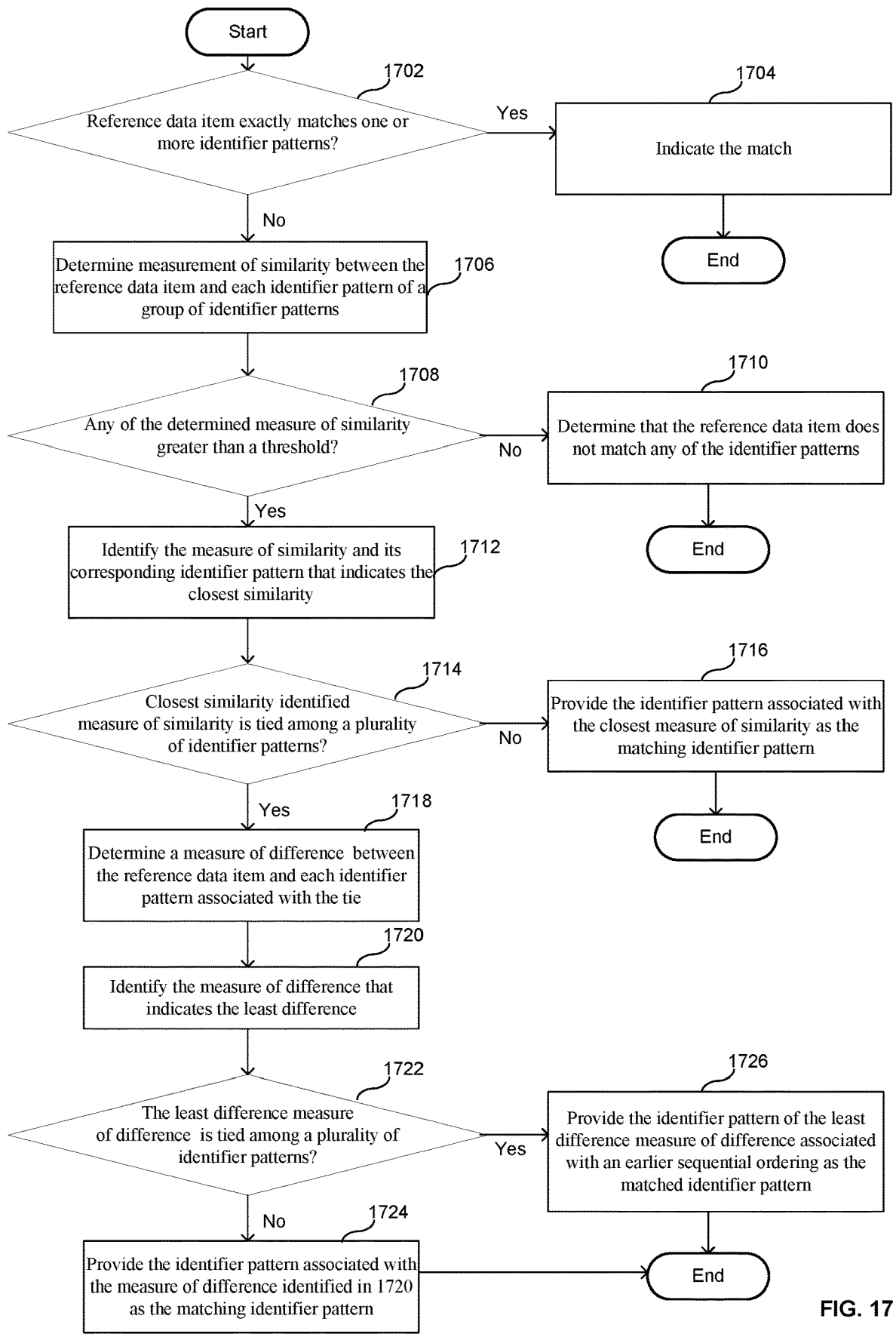
FIG. 17 is a flowchart illustrating an embodiment of a process for identifying whether a data item is similar to an identifier pattern.

FIG. 17 is a flowchart illustrating an embodiment of a process for identifying whether a data item is similar to an identifier pattern. The process of FIG. 17 may be implemented on server 106 and/or client device 102/104 of FIG. 1. In some embodiments, the process of FIG. 17 is included in 1204 and/or 1210 of FIG. 12. In some embodiments, the process of FIG. 17 is included in 1406 of FIG. 14. In some embodiments, the process of FIG. 17 is included in 1512 of FIG. 15 and/or 1606 of FIG. 16. In some embodiments, the process of FIG. 17 is utilized if fuzzy string matching is desired by a user (e.g., option 1328 in FIG. 13B is selected).

At 1702, it is determined whether a reference data item exactly matches one or more identifier patterns. In some embodiments, it is determined whether a selected data item matches any of one or more identifier patterns. For example, it is determined whether the reference data item (e.g., normalized content of selected data item) exactly matches (e.g., same as) a predetermined data grouping identifier pattern from a group of identifier patterns (e.g., in 1406 of FIG. 14). In another example, it is determined whether the reference data item (e.g., normalized content of selected data item) exactly matches (e.g., same as) a predetermined lead-sheet identifier pattern from a group of predetermined lead-sheet identifier patterns (e.g., in 1606 of FIG. 16).

If at 1702, it is determined that an exact match is found, at 1704 the match is indicated and the process ends. For example, the matched data grouping identifier pattern is identified as the matched item and the data grouping identifier of the matched identifier pattern is assigned to a data grouping of the reference data item. In another example, the matched predetermined leadsheet identifier pattern is identified as the matched pattern and account of the reference data item is assigned to the leadsheet of the matched identifier pattern.

If at 1702, it is determined that an exact match is not found, at 1706, a measurement of similarity between the reference data item and each identifier pattern of a group of identifier patterns is determined. For example, for each data grouping identifier pattern of a group of data grouping identifier patterns, a measurement of similarity between the reference data item (e.g., normalized) and the data grouping identifier pattern is determined. In another example, for each leadsheet identifier pattern of a group of data grouping identifier patterns, a measurement of similarity between the reference data item (e.g., normalized) and the leadsheet identifier pattern is determined.

In some embodiments, determining the measurement of similarity includes determining a Sorensen-Dice coefficient between the reference data item and each identifier pattern in a group of identifier patterns. A Sorensen-Dice coefficient may be defined as:

$$QS = \frac{2C}{A+B} = \frac{2|A \cap B|}{|A|+|B|}$$

Where "A" and "B" are the number of species in samples A and B, respectively, and "C" is the number of species shared by the two samples. "QS" is the quotient of similarity (measurement of similarity) and ranges from 0 to 1. For sets of keywords, the coefficient is defined as twice the shared information or intersection over the sum of cardinalities.

In some embodiments, when used as a measure of string similarity, the coefficient for two stings x and y using bigrams is:

$$s = \frac{2n_t}{n_x + n_y}$$

where $n_t$ is the number of character bigrams present in both strings, $n_x$ is the number of bigrams in string x and $n_y$ is the number of bigrams in string y. For example, to calculate the similarity of "equity" and "ekuiti," the set of bigrams in each string is found. This gives results in {eq, qu, ui, it, ty} and {ek, ku, ui, it, ti}. Each set has a cardinality of 5, and the intersection of these two sets has two elements {ui, it}. Plugging these numbers into the formula above, the measurement of similarity s=(2*2)/(5+5)=0.4.

At 1708, it is determined whether any of the determined measure of similarity is greater than a threshold. For example, if the measure of similarity is greater than the threshold, it is determined that the reference data item and an identifier pattern are similar enough to each other to determine that a match exists. In some embodiments, determining whether the determined measure of similarity is greater than a threshold includes determining that a calculated Sorensen-Dice coefficient is greater than the threshold (e.g., 0.7 threshold value). The threshold may be predetermined and/or dynamically determined.

If at 1708, it is determined that none of the determined measure of similarity is greater than the threshold, at 1710 it is determined that the reference data item does not match any of the identifier patterns and the process ends.

If at 1708, it is determined that at least one of the determined measures of similarity is greater than the threshold, at 1712 the measure of similarity and its corresponding identifier pattern that indicates the closest similarity (e.g., largest similarity measure value) are identified.

At 1714, it is determined whether the closest similarity identified measure of similarity is tied among a plurality of identifier patterns. For example, it is determined whether the measure of similarity between the reference data item and at least one closest matching identifier pattern is the same as another measure of similarity between the reference data item and another one of the closest matching identifier pattern. In some embodiments, only a single identifier pattern can be provided as the matching identifier pattern and the tie, if applicable, must be broken.

If at 1714, it is determined that the closest similarity identified measure of similarity is not tied, at 1716 the identifier pattern associated with the closest measure of similarity identified in 1712 is provided as the matching identifier pattern and the process ends. For example, the matched data grouping identifier pattern with the largest measure of similarity is identified as the selected identifier pattern and the data grouping identifier of the selected identifier pattern is assigned to a data grouping of the selected data item. In another example, the matched predetermined leadsheet identifier pattern with the largest measure of similarity is identified as the selected identifier pattern and account of the reference data item is assigned to the leadsheet of the selected identifier pattern.

If at 1714, it is determined that the closest similarity identified measure of similarity is tied, at 1718 a measure of difference is determined between the reference data item and each identifier pattern associated with the tie. An example of the measure of difference is the Levenshtein Edit Distance. In some embodiments, the Levenshtein Edit Distance is the minimum number of single-character insertions, deletions, and substitutions necessary to change one string into another. Mathematically, the Levenshtein distance between two strings a; b is given by $lev_{a,b}(|a|,|b|)$ where $$lev_{a,b}(i,j) = \begin{cases} \max(i,j) & \text{if } \min(i,j) = 0, \\ \min \begin{cases} lev_{a,b}(i-1,j)+1 \\ lev_{a,b}(i,j-1)+1 \\ lev_{a,b}(i-1,j-1)+1_{(a_i \neq b_j)} \end{cases} & \text{otherwise.} \end{cases}$$

where $1_{(ai \neq bj)}$, is the indicator function equal to 0 when $a_i=b_j$, and equal to 1 otherwise. In some embodiments, the first element in the minimum corresponds to deletion (from a to b), the second to insertion, and the third to match or mismatch, depending on whether the respective symbols are the same. The above mathematical representation is a recursive algorithm, and the first i and j are the lengths of the strings a and b. Using the example previously discussed with the measure of similarity between "equity" and "ekuiti," the Levenshtein distance (measure of difference) between these two string is 2. For example, two edits change "equity" into "ekuiti" (equity→ekuity→ekuiti).

At 1720, the measure of difference that indicates the least difference (e.g., smallest Levenshtein distance) is identified.

At 1722, it is determined whether the least difference measure of difference identified in 720 is tied among a plurality of identifier patterns. For example, it is determined whether the measure of difference between the reference data item and a least different identifier pattern is the same as another measure of difference between the reference data item and another least different identifier pattern.

If at 1722 it is determined that the least difference measure of difference is not tied, at 1724 the identifier pattern associated with the measure of difference identified in 1720 is provided as the matching identifier pattern. For example, the matched data grouping identifier pattern with the largest measure of similarity and smallest measure of difference is identified as the matching item and the data grouping identifier of the matched pattern is assigned to a data grouping of the reference data item. In another example, the matched predetermined leadsheet identifier pattern with the largest measure of similarity and smallest measure of difference is identified as the matched identifier pattern and account of the reference data item is assigned to the leadsheet of the matched identifier pattern.

If at 1722 it is determined that the least difference measure of difference is tied, at 1726 the identifier pattern of the least difference measure of difference associated with an earlier sequential ordering is provided as the matched identifier pattern. In some embodiments, because a second tie has been created with the tied measure of difference, the identifier pattern that appears first (e.g., or last in a different embodiment) in a list of identifier patterns is selected. For example, the matched data grouping identifier pattern with the largest measure of similarity, smallest measure of difference, and appearing earlier in a listing order is identified as the selected identifier pattern and the data grouping identifier of the selected identifier pattern is assigned to a data grouping of the reference data item. In another example, the matched predetermined leadsheet identifier pattern with the largest measure of similarity, smallest measure of difference, and appearing earlier in a listing order is identified as the selected identifier pattern and account of the reference data item is assigned to the leadsheet of the selected identifier pattern. In some embodiments, rather than breaking the measure of difference tie by selecting the identifier pattern based on sequential ordering, a random identifier pattern is selected from the identifier patterns associated with the tied measure of difference identified in 1720.

Figure 18:
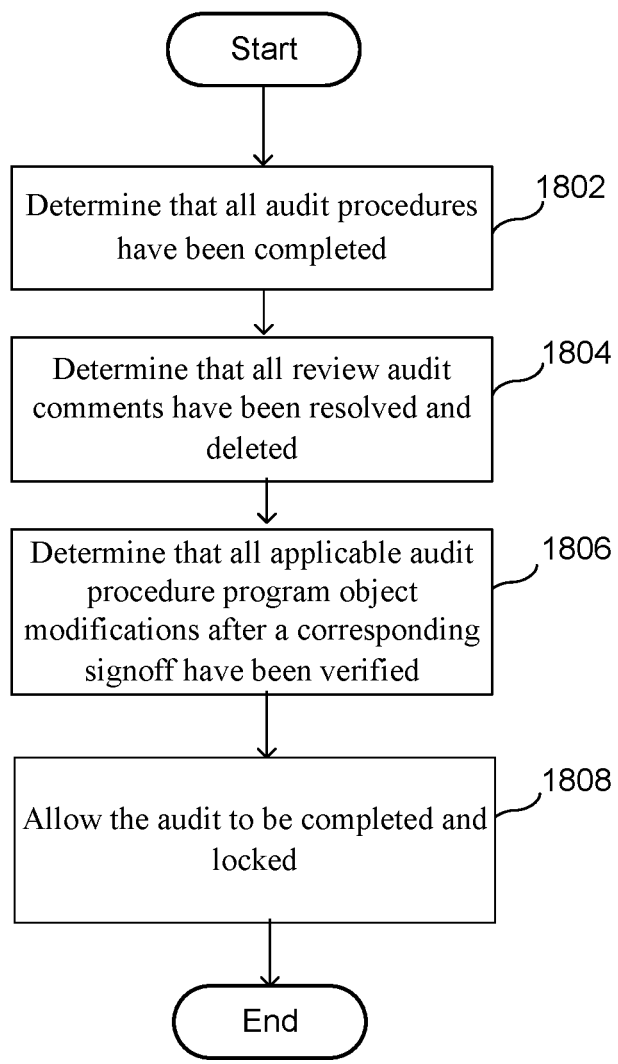
FIG. 18 is a flowchart illustrating an embodiment of a process for locking management of an audit.

FIG. 18 is a flowchart illustrating an embodiment of a process for locking management of an audit. The process of FIG. 18 may be implemented on server 106 of FIG. 1. For example, once all tasks/signoffs to perform an audit have been properly completed, the audit records generated and tracked while managing the audit using a network cloud-based audit management solution are locked to archive the audit management records and prevent further changes to the audit management records. By automatically verifying that the audit has been properly completed and is in a stage to be locked and completed, an auditor minimizes time and potential errors to complete the audit.

At 1802, it is determined that all audit procedures have been completed. For example, it is determined whether all applicable audit procedure program objects of the audit meet criteria (e.g., have been signed off at all required signoff levels/types) for completing/locking the audit. In some embodiments, determining whether all audit procedures have been completed includes determining that the overall audit procedure progress of all types of procedure signoffs has reached 100% as determined in 1002 of FIG. 10. In the event not all audit procedures have been completed, the process ends and the audit is not allowed to be locked.

At 1804, it is determined that all review audit comments have been resolved and deleted. For example, each audit procedure program object allows a user to provide and save comments that are required to be resolved before the audit is completed and locked and a verification is performed to ensure that unresolved review comments have been resolved and removed from being saved in archived locked record of the audit. In the event that not all review audit comments have been resolved and deleted, the process ends and the audit is not allowed to be locked.

At 1806, it is determined that all applicable audit procedure program object modifications after a corresponding signoff have been verified. For example, once an audit procedure has been signed off at one or more signoff levels/types, applicable modification to the audit procedure (e.g., change in description of audit procedure) requires a verification (e.g., indication by an authorized reviewer with valid authority) that the modification does not invalidate the signoff. In the event that not all applicable modifications after a signoff have been verified, the process ends and the audit is not allowed to be locked.

At 1808, the audit is allowed to be completed and locked. For example, when the audit is locked, data records of the audit are archived and not allowed to be modified. In some embodiments, only a user with a valid authority is authorized to lock the audit.

Figure 19:
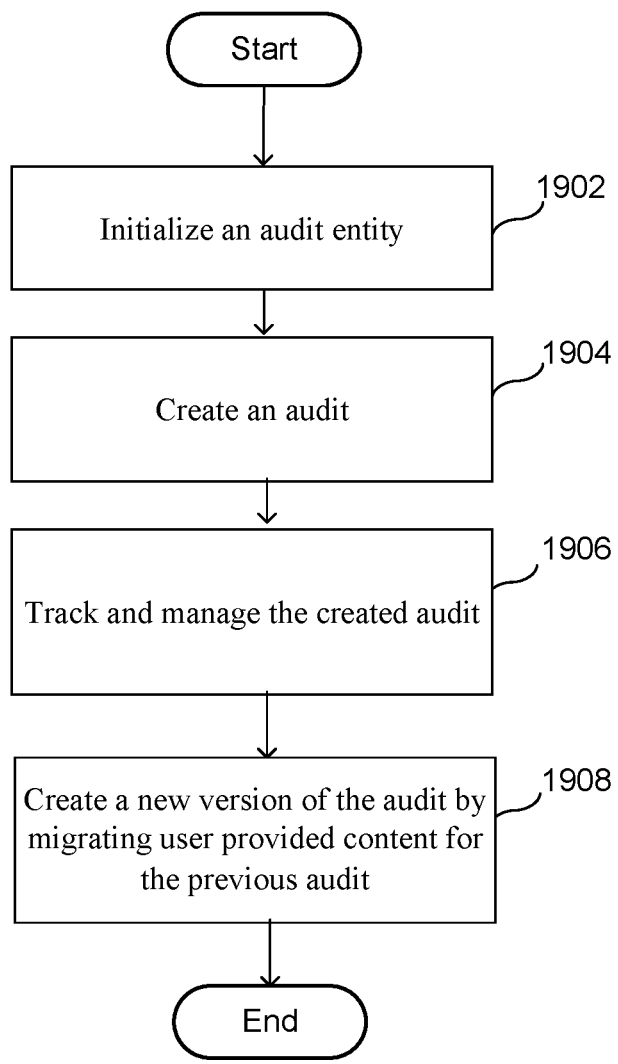
FIG. 19 is a flowchart illustrating an embodiment of a process for creating a new audit managed using a network cloud-based service accessible via a secure webpage.

FIG. 19 is a flowchart illustrating an embodiment of a process for creating a new audit managed using a network cloud-based service accessible via a secure webpage. The process of FIG. 19 may be implemented on server 106 of FIG. 1. For example, the process of FIG. 19 is implemented on a webpage server.

To perform the audit, an auditor is able to follow the audit program's procedures. An example of a procedure commonly found in many audit programs is "Attach and review the entity's organization chart." The auditor will then upload a copy of organization chart. The auditor may also leave a comment such as, "I received the organization chart from the VP of Human Resources." The auditor will then signoff on the procedure. The procedure may be reviewed by multiple other auditors at the auditing firm. The auditor may also add another procedure to this audit that states, "Attach and review the entity's Board of Advisors". Not all auditees will have a board of advisors, but if the auditor deems it important they may elect to create a procedure for it.

When the auditor begins the subsequent year audit, the auditor may want to reuse the much of the information found in the previous year's audit file. Workpapers and comments from the previous year may only need to be modified slightly in order to be used for this year's audit, e.g., an organization chart from the previous year might only need to be changed slightly to reflect the current management of the company, or it might not need to be changed at all. It may also need to be discarded and completely re-done. These workpapers and comments need to be assigned to the correct procedure in this year's audit. This is not a trivial task, as audit programs can change from year to year. If in this year's audit, the procedure reads, "Attach information concerning the company's management structure.", the auditor will need to confirm that the workpapers and comments from last year's procedure, which reads "Attach and review the entity's organization chart", is actually the same procedure, and the workpapers and comments from the previous year should be included.

Also, the customizations to the previous year's procedure will need to be considered. In the example above, the auditor deemed it necessary to add a procedure for the company's Board of Advisors. These new procedures will need to be considered in planning the current year's audit.

The trialbalance information will also need to be transferred. For the subsequent year audit, the auditor will receive the new trial balance from the auditee. The account balances from the previous year audit will become the subsequent year's previous year balances. The leadsheet grouping that the auditor applied to each account will need to be reapplied as well. The custom leadsheets from the previous year's audit will need to be considered in this year's audit as well.

Figure 20A:
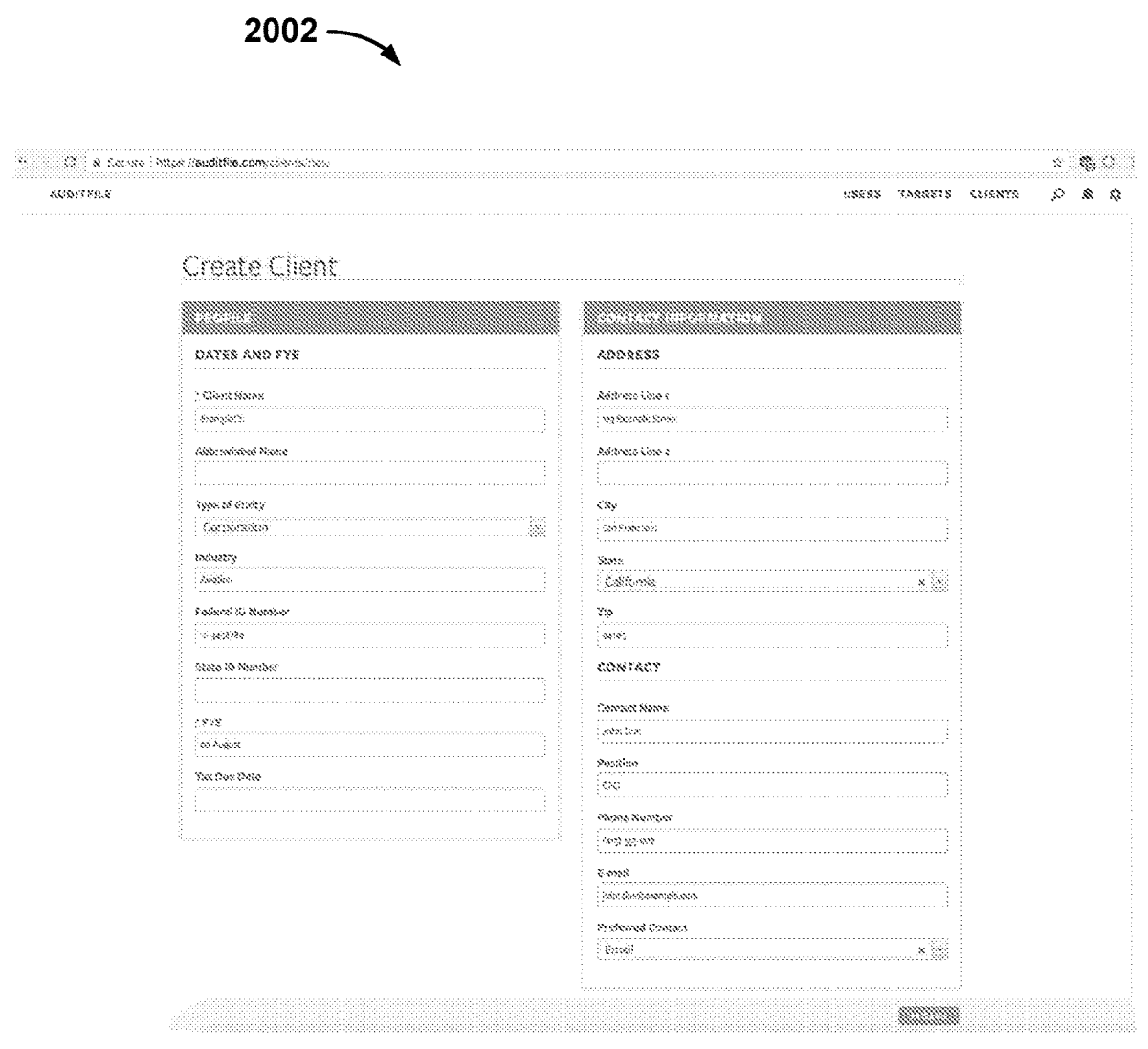
Figure 20B:
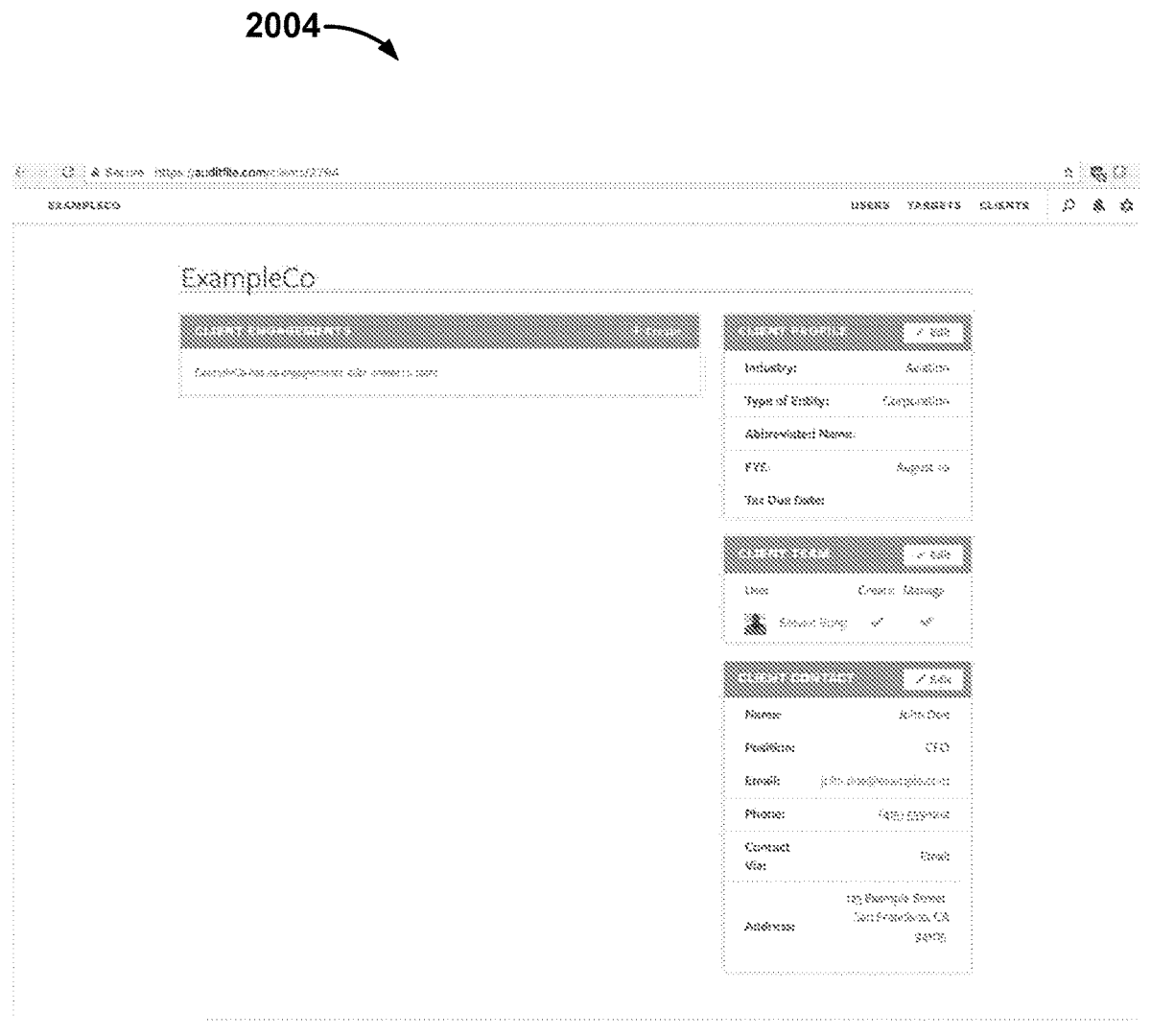
Figure 20C:
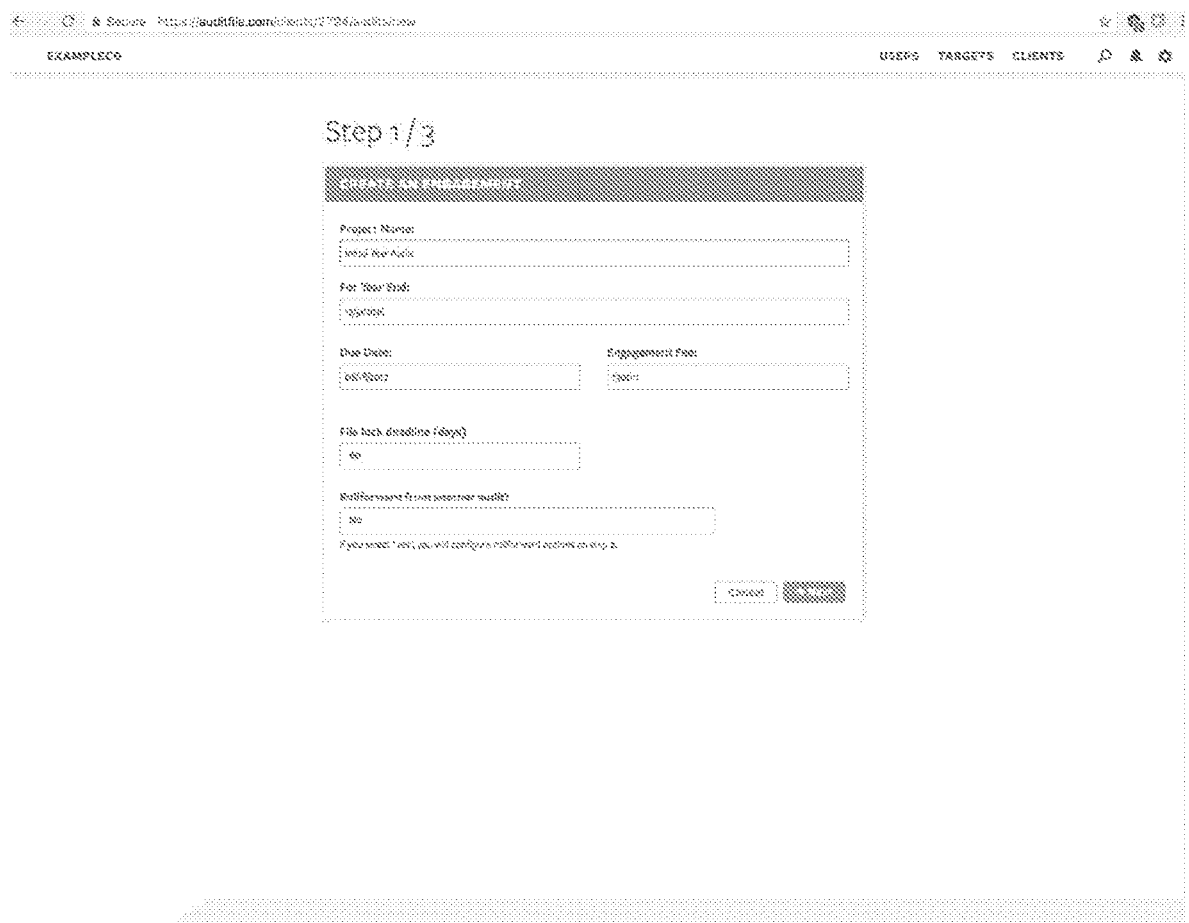
FIGS. 20A-20N are screenshots illustrating example interfaces.

A user/auditor may track and manage an audit using the network cloud-based service accessible via a secure Internet webpage. When managing and tracking an audit, a webpage showing an audit area can have many sections. An individual section can have many procedures. A procedure can have many workpapers and can have many comments. In screen shot 2002 of an example interface shown in FIG. 20A, "Cash" is the audit area, "Analytics" and "Inquiry" are example sections.

Returning to FIG. 19, at 1902, an audit entity is initialized. For example, information about a new client is entered via a web interface. In screen shot 2004 of an example interface shown in FIG. 20B, a new client is created using the name "ExampleCo," a fictitious manufacturing company. After information about the new client has been entered, the user is redirected to the example interface shown in screenshot 2006 of FIG. 20C, displaying a summary of the client.

Figure 20D:
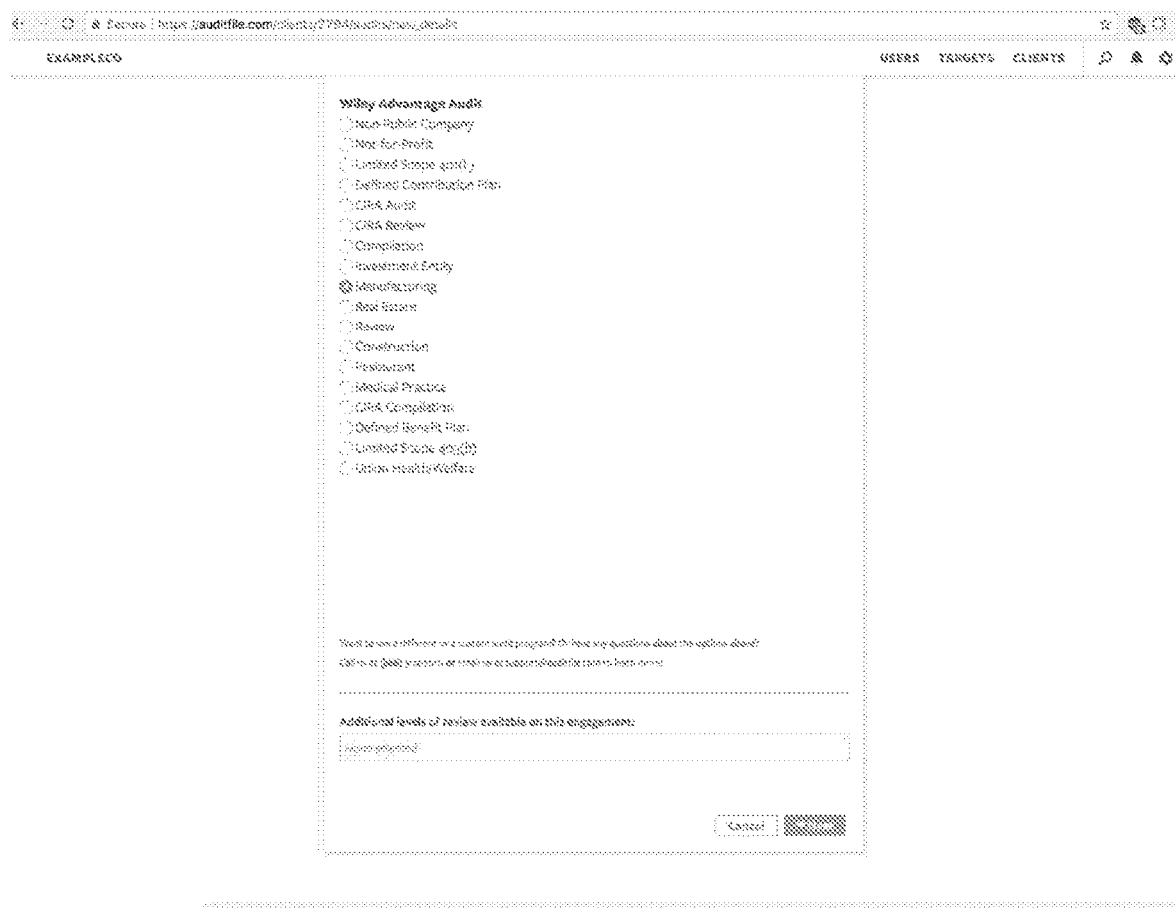
Figure 20E:
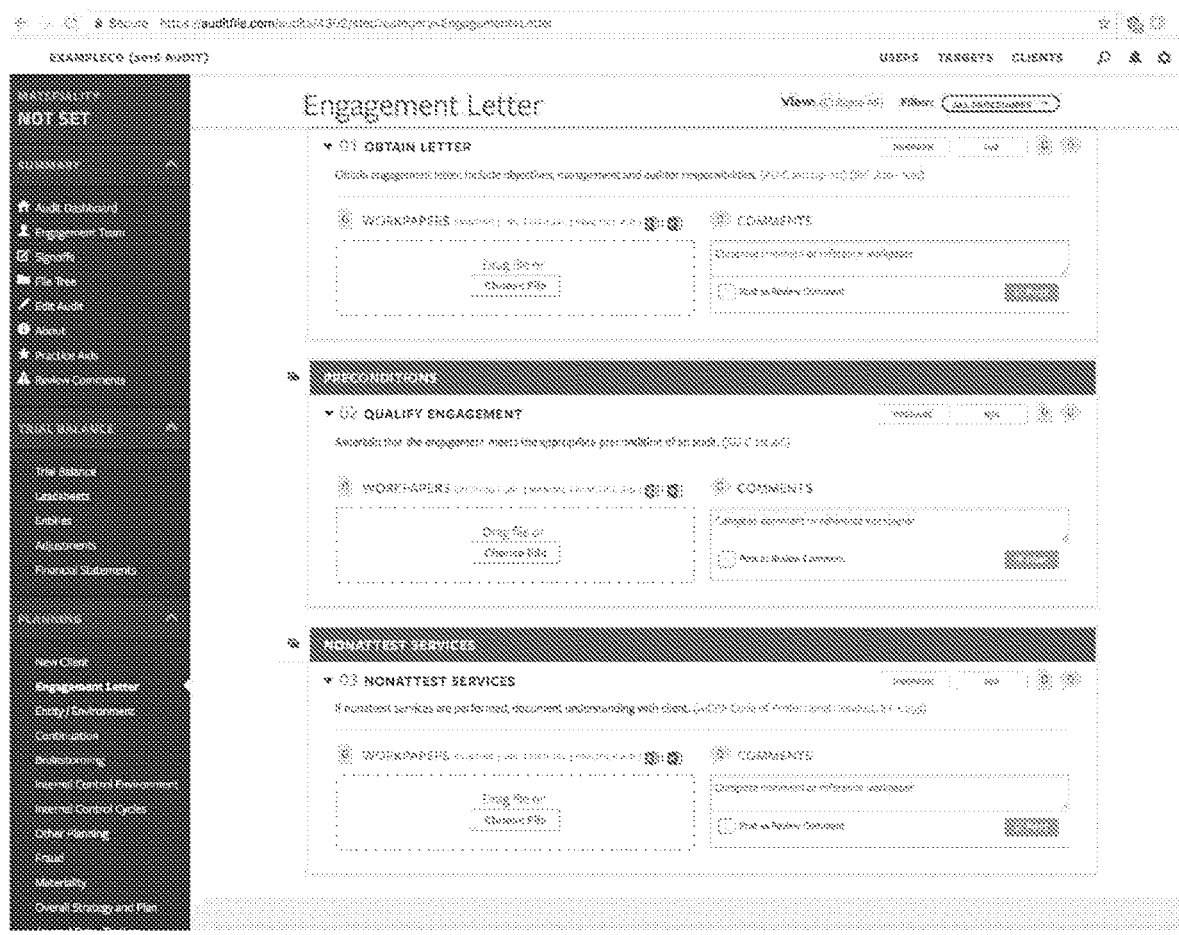

At 1904, an audit is created. For example, information about an audit to be performed for the client is entered via a web interface. In the example shown in FIG. 20C, a user creates an audit for the 2016 year by selecting the "Create" button. Then the user is redirected to the example interface in screenshot 2008 of FIG. 20D, showing input fields of the audit creation process. After the requested information is entered, the user is redirected to the example interface shown in screenshot 2010 of FIG. 20E, where a user is able select an audit type that leverages industry-specific audit guides to tailor the audit for the selected audit type. Then the user may be redirected to an interface where members of the engagement/auditor team are able to be specified. Next the user is redirected to a dashboard interface where the user is able to manage the audit.

Figure 20F:
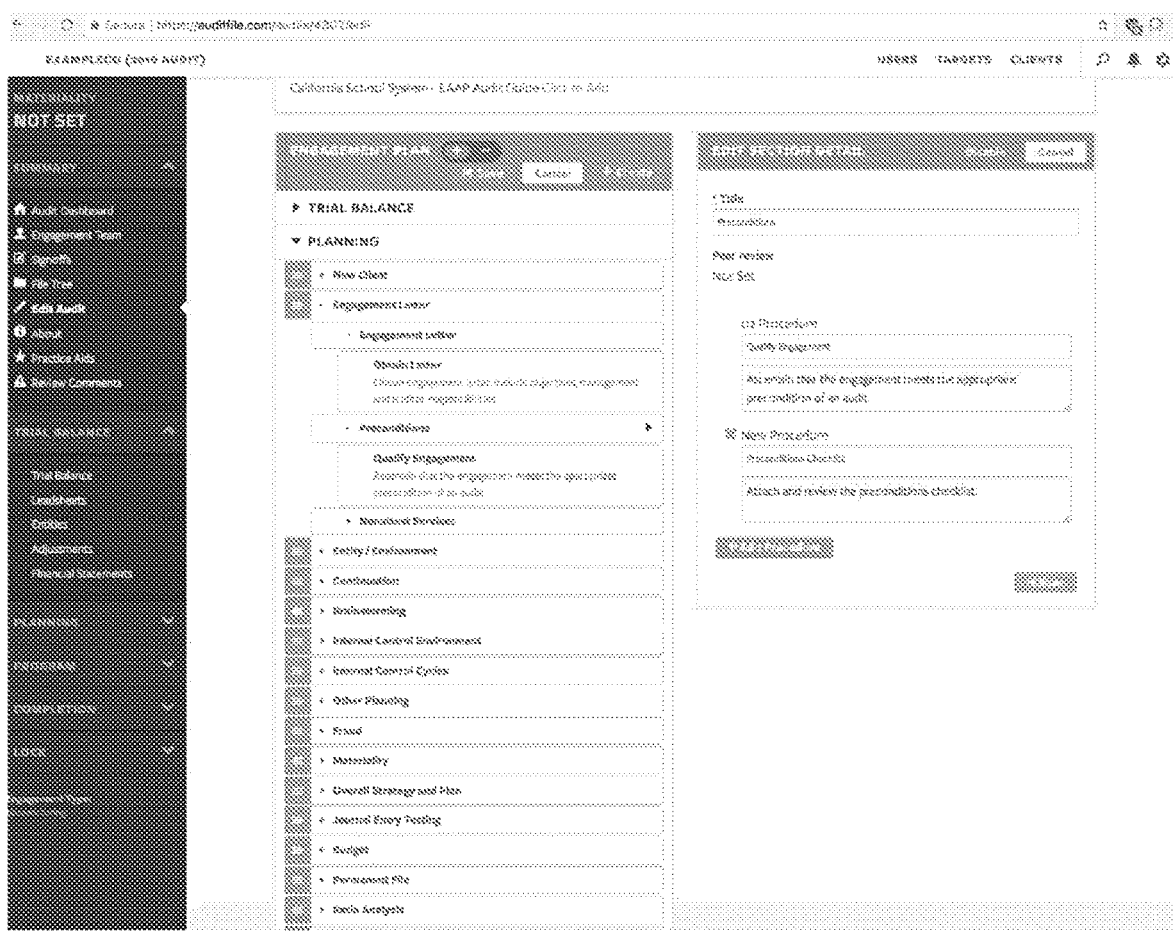

At 1906, the created audit is tracked and managed. When a user selects the "Engagement Letter" area in the dashboard, three procedures are initially provided as shown in the example interface shown in screenshot 2012 of FIG. 20F.

Figure 20G:
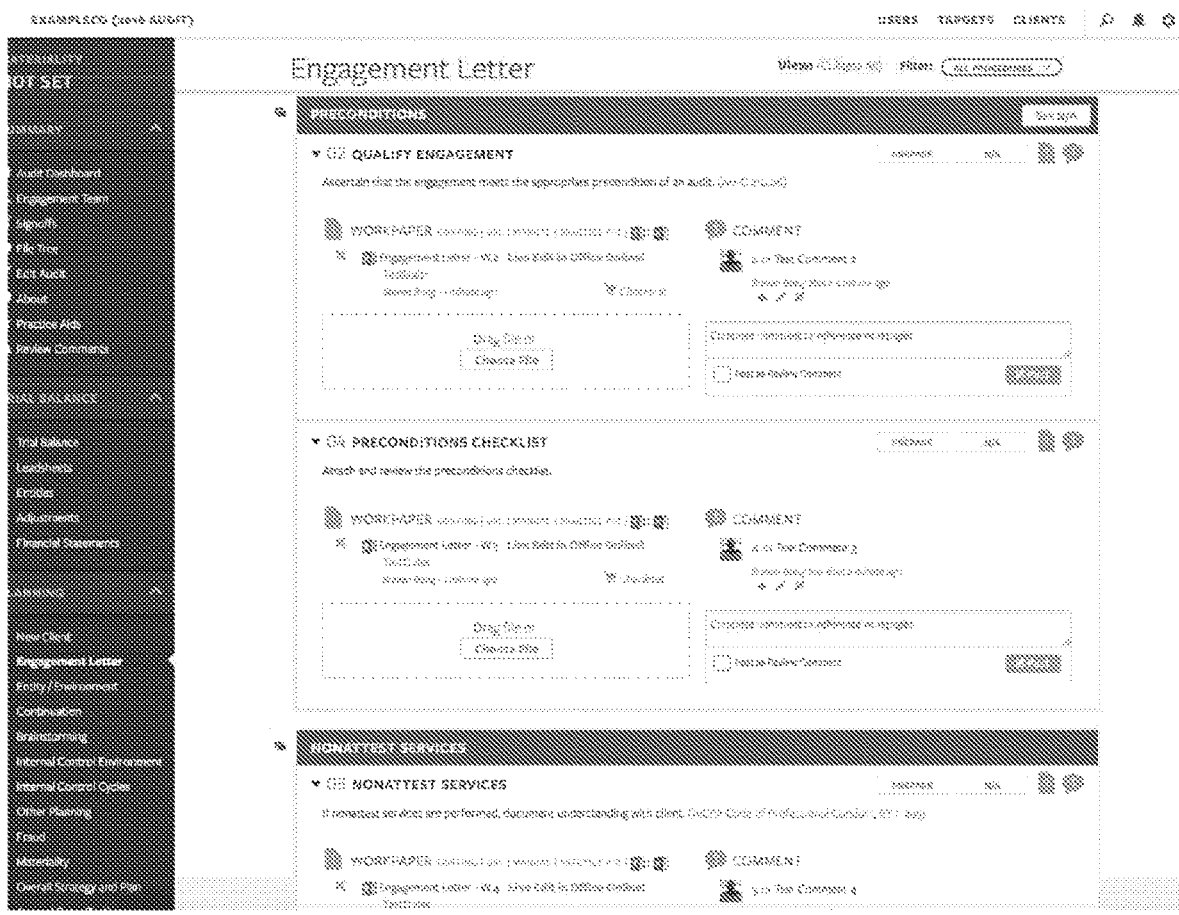

For sake of an example demonstration, a procedure is created directly beneath the current "Preconditions" procedure. If the user determines that another step should be added, the user will click on the "Edit Audit" on the sidebar. The user is redirected to the "Edit Audit" screen as shown in the example interface in screenshot 2014 of FIG. 20G. The user then scrolls down the Engagement Plan box. After clicking "Edit", the user navigates to the "Engagement Letter" area. The user clicks on the "Engagement Letter" button, which expands to show the three sections. To add a procedure to the "Preconditions" section, the user selects the "Preconditions" button on the left. On the right, a new box will appear to edit the section. A user clicks on "Add Procedure" to add another procedure. The procedure's title is entered as "Preconditions Checklist" and the content as "Attach and review the preconditions checklist." The user then clicks "Save". If the user navigates back to the "Engagement Letter" area, the user will see a new procedure numbered 4 under procedure numbered 2. The procedure is numbered 4 since a procedure numbered 3 already exists. This done to preserve the integrity of each procedure's unique numerical identifier.

Figure 20H:
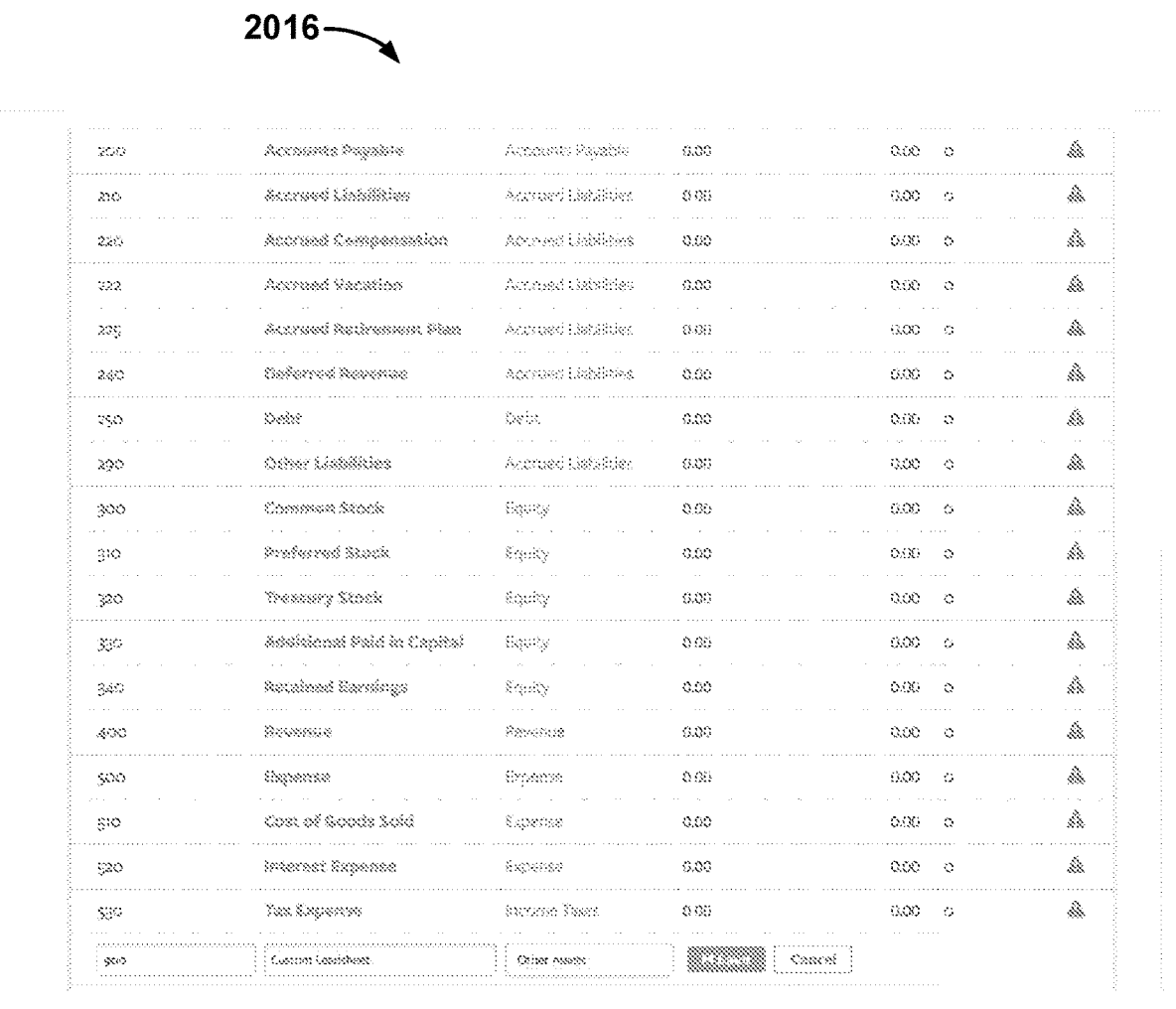
Figure 20I:
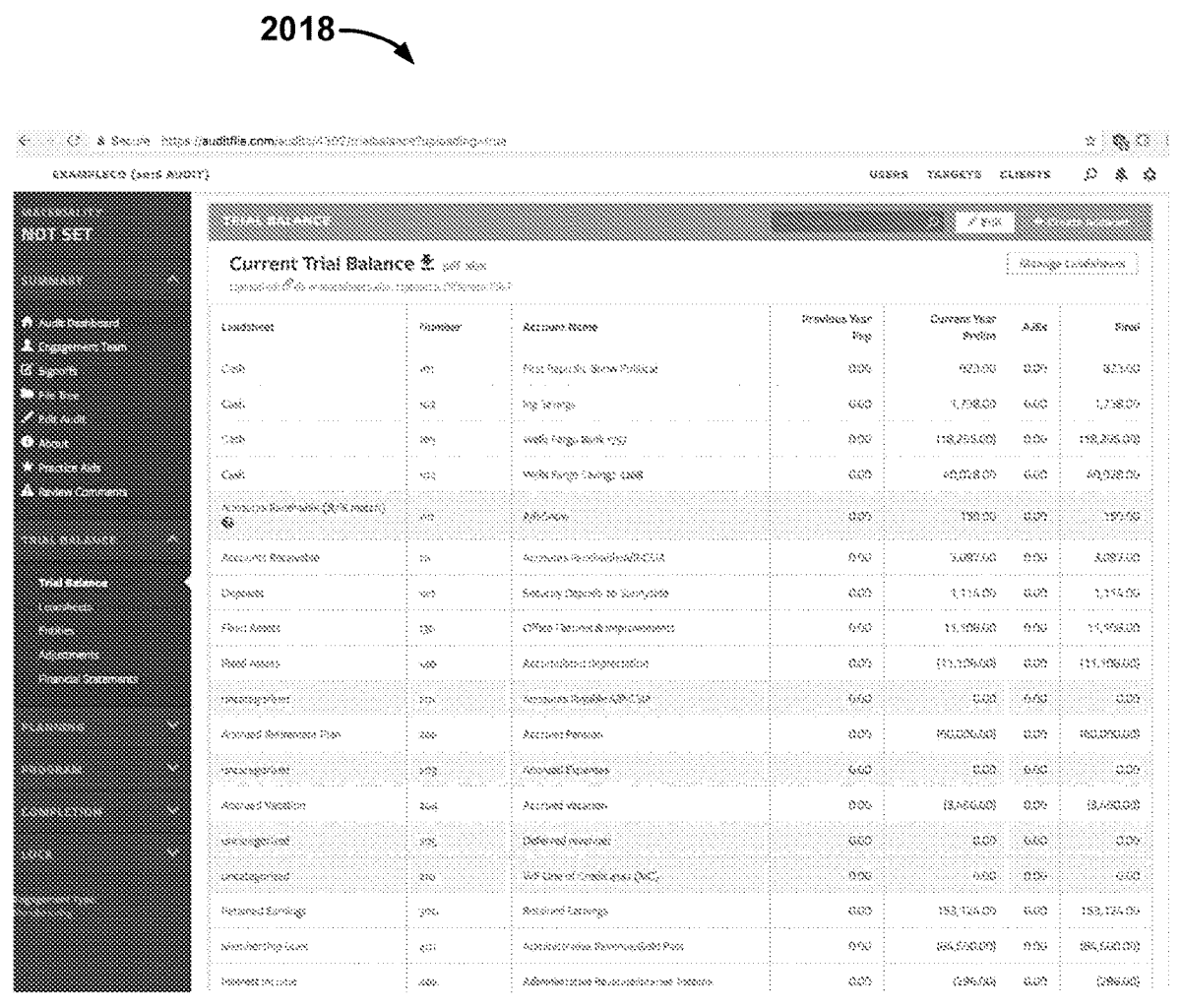

The user is also able to upload workpapers and post comments to each of the four procedures on in this area. The example interface in screenshot 2016 of FIG. 20H, shows the interface where the user is able to upload workpapers and post comments to procedures. The user is also able to create a custom leadsheet. A user can click on the "Leadsheets" hyperlink on the sidebar. There the user is presented with a screen summarizing the leadsheets. To create a leadsheet, click "Create". A new leadsheet will appear at the bottom of the screen as shown in the example interface shown in screenshot 2018 of FIG. 20I. In the example shown, the number for the leadsheet is entered as 900 and the leadsheet name as "Custom Leadsheet." It is assigned to the "Other Assets" program. A user can click "Save" to create the new leadsheet. The user is also able to upload a trial balance, as shown in the example interface shown in screenshot 2020 of FIG. 20J.

At 1908, a new version of the audit is created by migrating (e.g., roll-forward) user provided content for the previous audit. For example, custom procedures, text comments, computer files, workpapers, and/or trial balance from the previous audit may be migrated/rolled forward from the previous audit and automatically categorized under the corresponding sections of the new audit.

Figure 21:
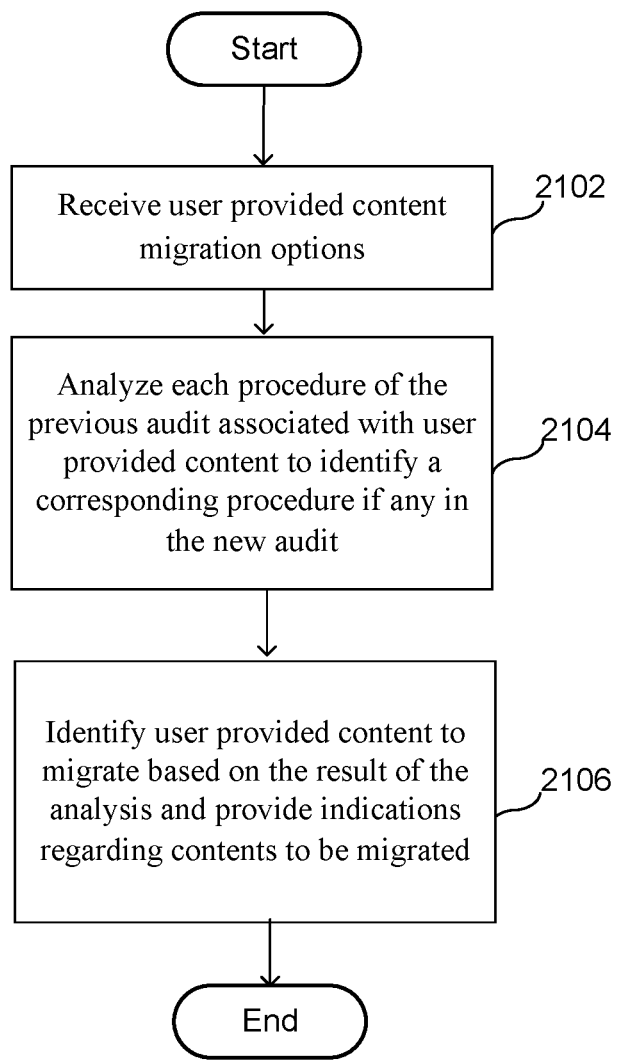
FIG. 21 is a flowchart illustrating an embodiment of a process for migrating user provided data.

FIG. 21 is a flowchart illustrating an embodiment of a process for migrating user provided data. The process of FIG. 21 may be implemented on server 106 of FIG. 1. In some embodiments, at least a portion of the process of FIG. 21 is included 1908 of FIG. 19.

Figure 20K:
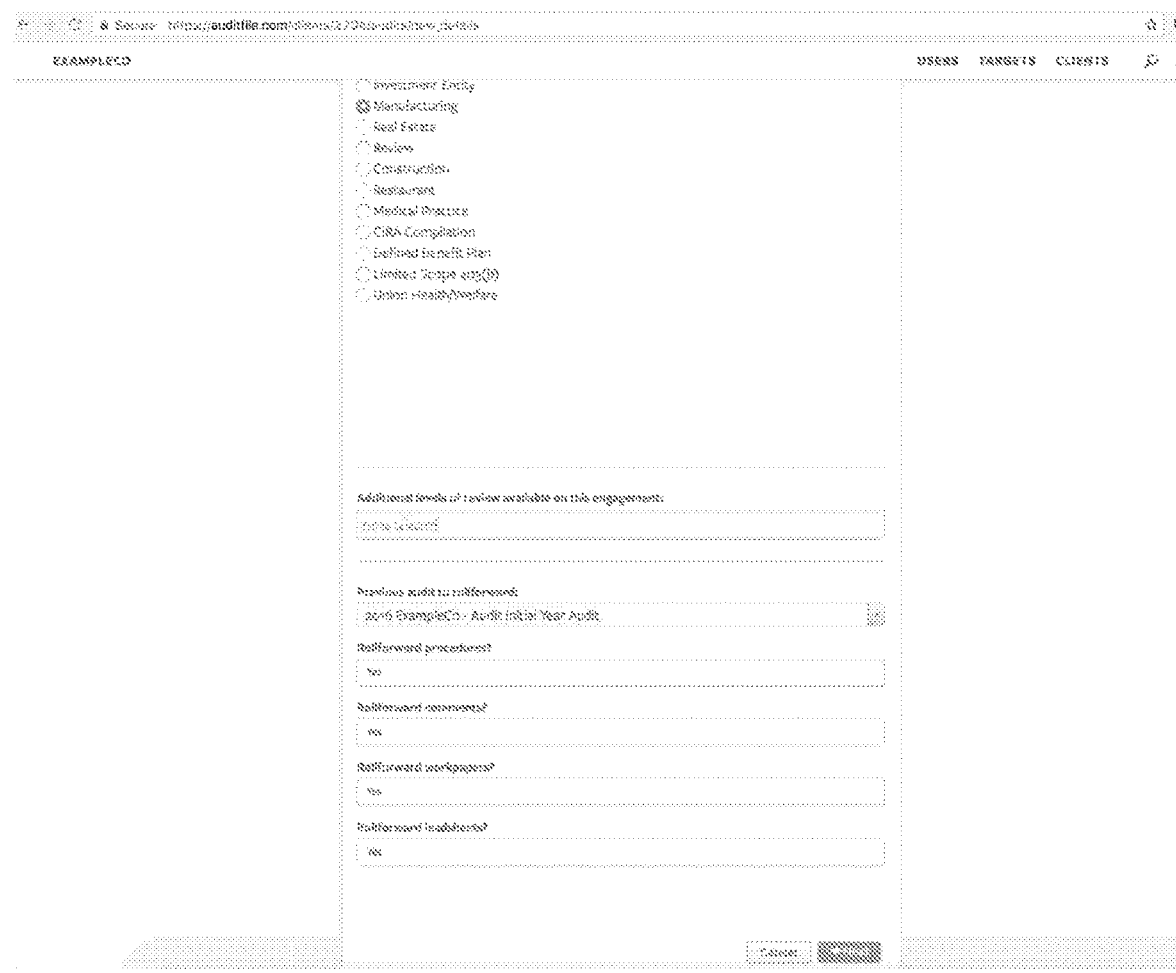
Figure 20L:
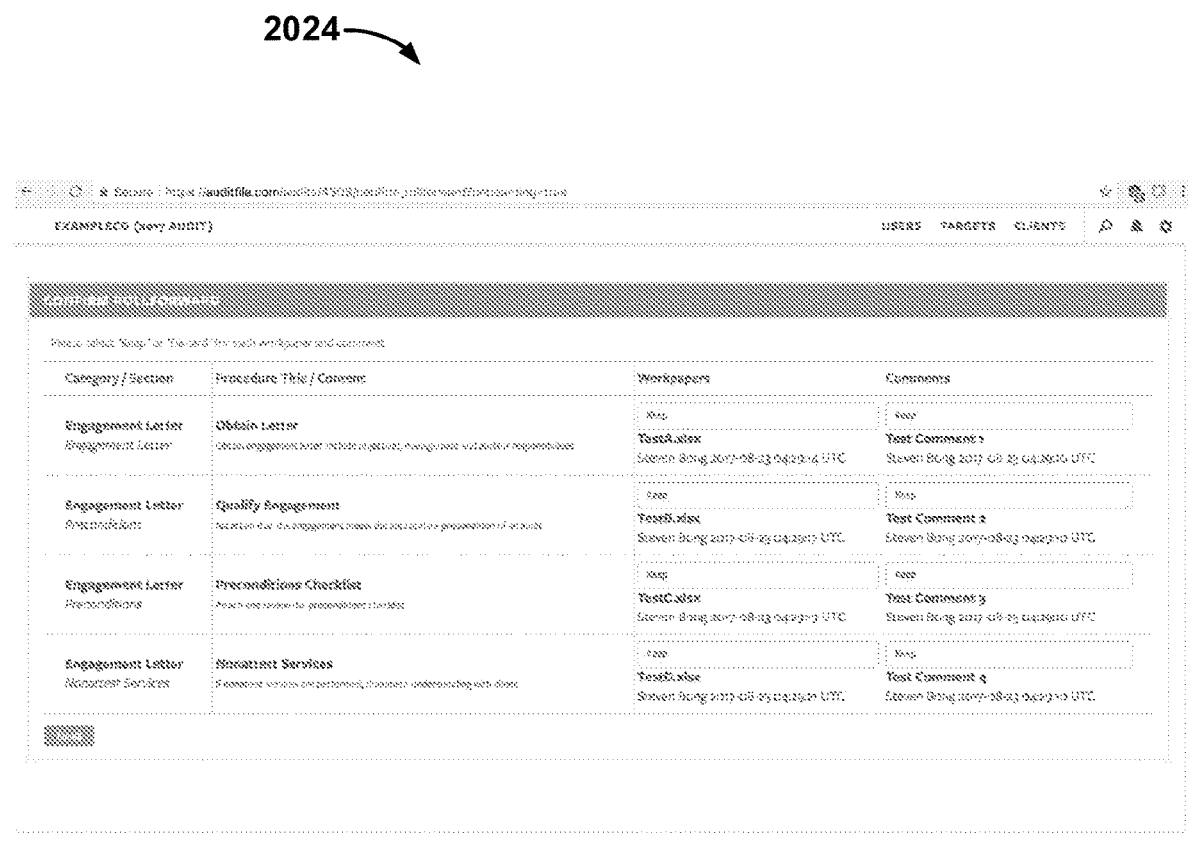

At 2102, user provided content migration (e.g., roll-forward) options are received. For example, a new "2017 Audit" is created for the previously discussed "ExampleCo" example. On ExampleCo's client screen, a user can click "Create" to create a new audit. On Step 1 of the new audit process shown in the example interface in screenshot 2022 of FIG. 20K, the user will selects "Yes" under the "Rollforward from another audit?" selection box. This will enable the roll-forward settings on the next screen. The user enters the other information for the new audit, and clicks "Next." On the next screen shown in the example interface in screenshot 2024 of FIG. 20L, the user is prompted to select an audit program. "Manufacturing" is selected again. The user is also prompted to select the audit which will be rolled forward to the new audit. The user is given the option to individually select whether to rollforward procedures, comments, workpapers, and/or leadsheets. When user clicks "Next," user may be redirected to a screen prompting the user to select members of the engagement team.

In some embodiments, when a user selects "Rollforward Procedures", all user-added procedures in the previous audit are added to the new audit. Since each procedure belongs to a section and each section belongs to an area, this implies that each procedure also belongs to an area. For each user-added procedure in the previous audit (i.e., UAPPA). An algorithm may search the new audit for an area that matches the UAPPA's area. If a match (e.g., by direct string matching) is not found a new area with the UAPPA's area name is created, a new section with the UAPPA's section name is created, and a new procedure is also created. If a match is found, but a section match is not found, a new section will be created and the UAPPA's content will be copied to a new procedure in that new section. If an area and section are found, the procedure is added only if the UAPPA's content is not a direct duplicate of a procedure in the new audit's current area and section.

At 2104, each procedure of the previous audit associated with user provided content is analyzed to identify a corresponding procedure if any in the new audit. For example, using a text matching algorithm, a title and descriptive text of each procedure of both the previous audit and the new audit are analyzed in an attempt identify matches.

Figure 20M:
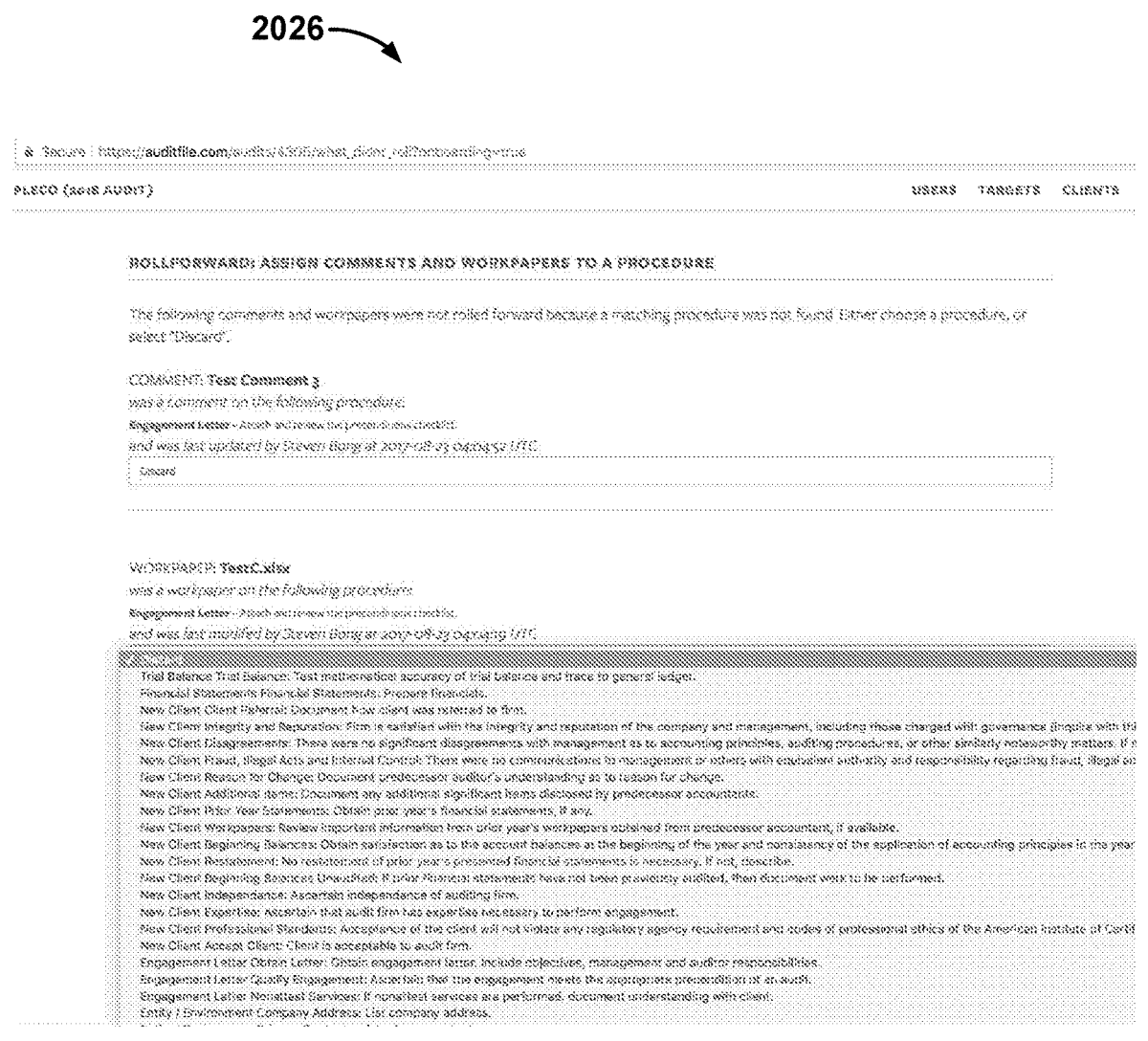

At 2106, user provided content to migrate are identified based on the result of the analysis and indications regarding contents to be migrated are provided. For example, the user is provided the screen shown in the example interface in screenshot 2026 of FIG. 20M displaying a migration/roll-forward plan where each workpaper and comment from the previous audit. Using the analysis result, each comment and workpaper is automatically assigned to a migration destination procedure in the new audit. The user is able to modify aspects of the migration plan.

Figure 20N:
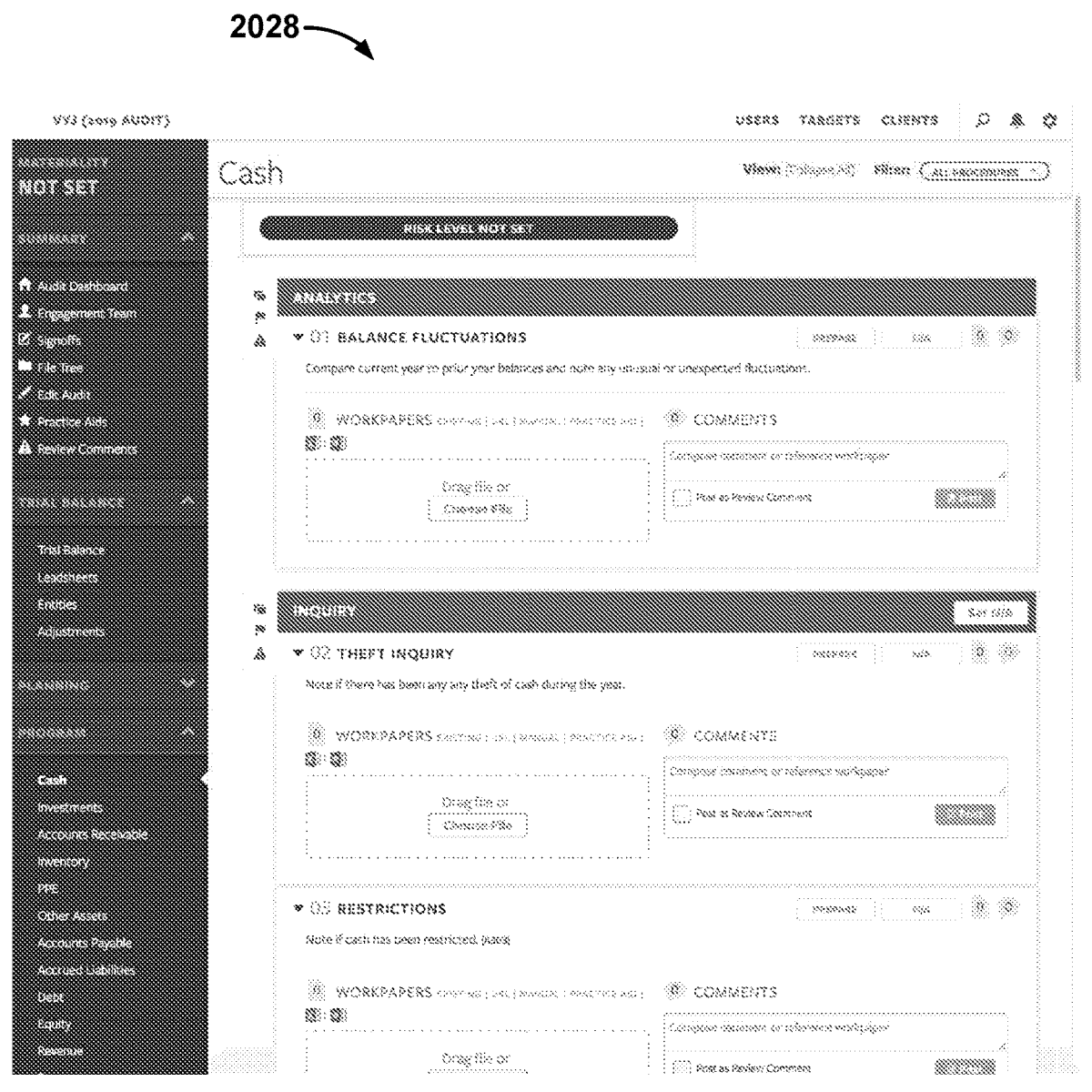

At 2108, an indication regarding content that were unable to be automatically identified for roll-forward/migration is provided. For example, if any user provided contents were unable to be matched to a procedure on the new audit, the user is shown the example interface in screenshot 2028 of FIG. 20N, alerting the user of the unmatched user provided content. Using this interface, the user is able to either discard the user content, or assign it to a user selected procedure in the new audit.

Figure 22:
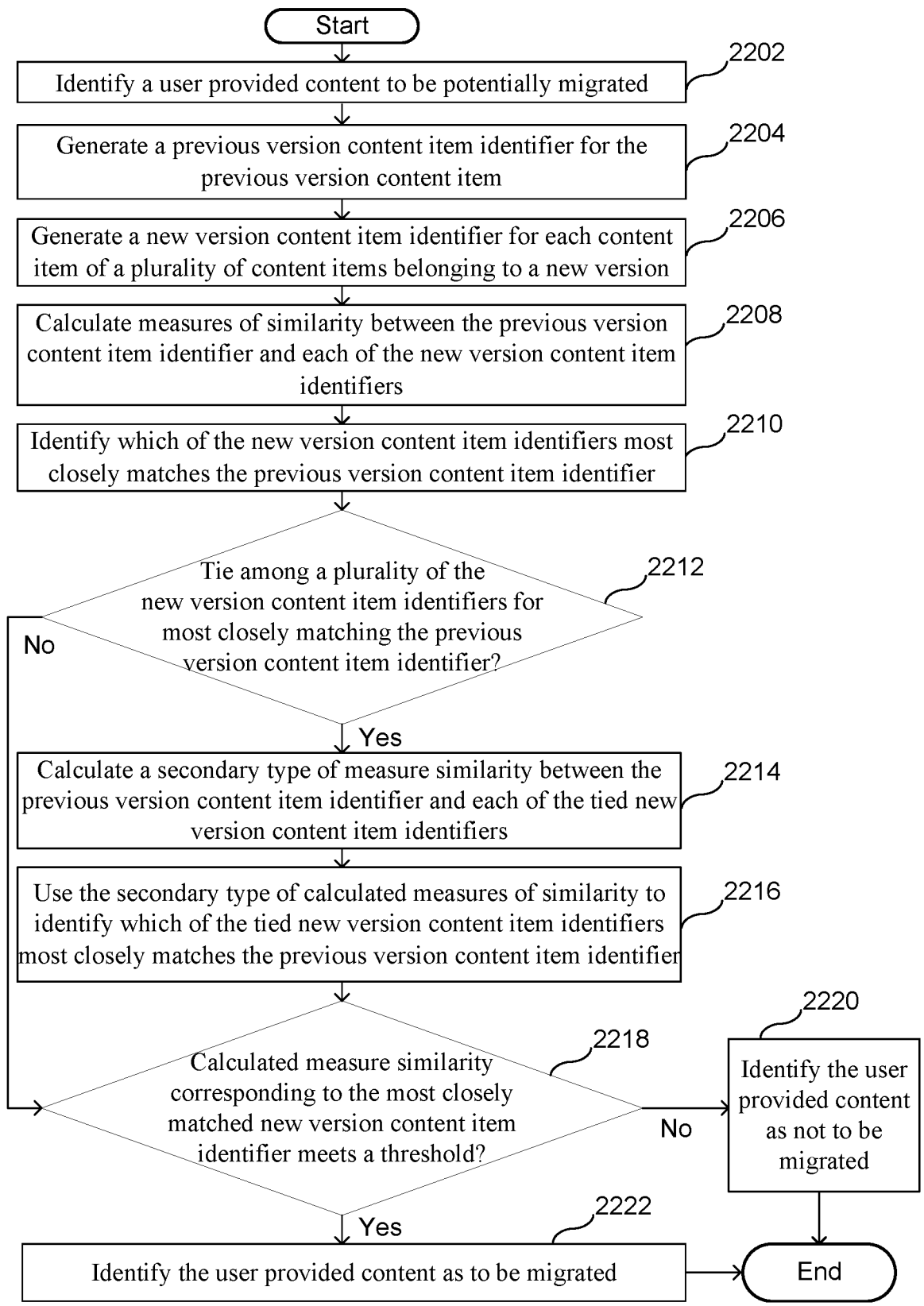
FIG. 22 is a flowchart illustrating an embodiment of a process for matching content items.

FIG. 22 is a flowchart illustrating an embodiment of a process for matching content items. The process of FIG. 22 may be implemented on server 106 of FIG. 1. In some embodiments, at least a portion of the process of FIG. 22 is included 2104 and/or 2106 of FIG. 21.

At 2202, a user provided content to be potentially migrated (e.g., rolled-forward) is identified. The user provided content belongs to a previous version content item of a content page (e.g., webpage, web application content, etc.) accessible via the Internet. Examples of the user provided content include a text comment, a computer file, a numerical entry, an option selection, a workpaper, a trial balance, or any other content or indication provided by a user that are desired to be migrated to any applicable content item in a new version of the content page. An example of the content item is a section item (e.g., including a title and body content) of hierarchically organized content (e.g., content page with a plurality of items of title and body content). Examples of the previous version content item include a section of a webpage, an audit procedure, item of a hierarchically organized content, and any other content entity. In some embodiments, the user provided content to be potentially migrated is one of a plurality of user provided contents to be each analyzed for migration/roll-forward.

At 2204, a previous version content item identifier for the previous version content item is generated. In some embodiments, a content from a title of the previous version content item and a content from a description the previous version content item are combined. For example, at least portions of the title and text body contents of the previous version content item are combined together into a single string of characters and reformatted to a standardized format. In the audit example, for a procedure content item in a previous audit content page, the text of the procedure content (e.g., text description of the procedure) is appended to the title of the procedure. In some embodiments, the previous version content item identifier has been normalized. Normalizing the content may include changing case of one or more characters and/or removing spacing of one or more characters. For example, to normalize the identifier, non-alphanumeric characters are removed except for the single space character (e.g., ' ', ANSI character 32) and all alphabet characters converted to lowercase. In a specific example, if the previous procedure's title is "Bank Reconciliation" and the previous procedure's content is "Prepare and upload a bank reconciliation", the previous version content item identifier that is formed is: "bank reconciliation prepare and upload a bank reconciliation."

At 2206, a new version content item identifier for each content item of a plurality of content items belonging to a new version of the content page are generated including by combining a content from a title of the corresponding content item belonging to the new version and a content from a description text of the corresponding content item belonging to the new version. For example, at least portions of the title and text body contents of the new version content item is combined together into a single string of characters and reformatted to the standardized format. The new version may correspond to next or subsequent version of the published content. Similarly in the audit example, the text description of the new version's procedure is appended to the title of the new version's procedure. In some embodiments, the new version content item identifier has been normalized. Normalizing the content may include changing case of one or more characters and/or removing spacing of one or more characters. For example, to normalize the identifier, non-alphanumeric characters are removed except for the single space character (e.g., ' ', ANSI character 32) and all alphabet characters converted to lowercase.

At 2208, measures of similarity between the previous version content item identifier and each of the new version content item identifiers are calculated. The calculated measures of similarity are used to identify which of the new version content item identifiers most closely matches the previous version content item identifier. For example, a highest/largest measure of similarity value is identified and the new version content item identifier corresponding to this highest measure of similarity value is selected as the new version content item identifier most closely matching the previous version content item identifier.

In some embodiments, a measure of similarity is a ratio value that can range from zero and one and is calculated as twice the shared information or intersection over the sum of cardinalities. For example, the measure of similarity (S) for two stings x and y using bigrams is calculated using the equation: $S=2\,n_t/(n_x+n_y)$, where $n_t$ is the number of character bigrams present in both strings, $n_x$ is the number of bigrams in string x and $n_y$ is the number of bigrams in stringy. For example, to calculate the similarity of "equity" and "ekuiti", first the set of bigrams in each string is found. This result in {eq, qu, ui, it, ty} and {ek, ku, ui, it, ti}. Each set has a cardinality of 5, and the intersection of these two sets has two elements, "ui" and "it". Plugging these numbers into the formula, $S=2*2/(5+5)=0.4$.

At 2210, the calculated measures of similarity are used to identify which of the new version content item identifiers most closely matches the previous version content item identifier. For example, the highest value of the calculated measures of similarity is identified and the new version content item identifier corresponding to the highest value is identified as most closely matching the previous version content item identifier.

At 2212, it is determined whether the calculated measures indicates that there is a tie among a plurality of the new version content item identifiers for most closely matching the previous version content item identifier. For example it is determined whether the same highest value of the calculated measures of similarity has been calculated for a plurality of the new version content item identifiers.

If at 2212 it is determined that there is not tie, the process proceeds to 2218

If at 2212 it is determined that there is tie, at 2214, a secondary type of measure similarity (i.e., different type from the initially calculated measure of similarity) between the previous version content item identifier and each of the tied new version content item identifiers are calculated. For example, the secondary type of measures similarity are calculated as string distances between the previous version content item identifier and each of the tied new version content item identifier are calculated. In some embodiments, given two strings $s_1$ and $s_2$, their distance $d_w$ is calculated as: $d_w=d_j+(fp(1-d_j))$, where $d_j$ is the a distance component value for strings $s_i$ and $s_2$, f is the length of common prefix at the start of the string up to a maximum of four characters and p is a constant scaling factor (e.g., value of 0.1) for how much the score is adjusted upwards for having common prefixes.

The distance component value $d_j$ is calculated by the according to the formula $$d_j = \begin{cases} 0 & \text{if } m = 0 \\ \frac{1}{3}\left(\frac{m}{|s_1|} + \frac{m}{|s_2|} + \frac{m-t}{m}\right) & \text{otherwise} \end{cases}$$

where $|s_i|$ is the length of the string $s_i$, m is the number of matching characters, and t is half the number of transpositions. Two characters from $s_1$ and $s_2$ respectively, are considered matching only if they are the same and not farther than $[\max (|s_1|,|s_2|)/2]-1$. Each character of $s_1$ is compared with all its matching characters in $s_2$. The number of matching, but different sequence order, characters divided by 2 defines the number of transpositions. For example, each character of $s_1$ is compared with all its matching characters in $s_2$. The number of matching (but different sequence order) characters divided by 2 defines the number of transpositions. In comparing "crate" with "trace", only 'r' 'a' 'e' are the matching characters, thus in this case m=3. While 'c' and 't' appear in both strings, they are farther than 1, i.e., floor(5/2)−1=1. Therefore, t=0. In comparing "dwayne" versus "duane", the matching characters are in the same order d-a-n-e, so the number of transpositions is 0. Thus for example, strings "pattern" and "pattren" have a distance value $d_w$ of 0.961904762046678. In another example, strings "pattern language" and "language of patterns" have a distance value $d_w$ of 0.672222222222222.

In some embodiments, the second type of measure of similarity is more accurate in measuring similarity than the initial type of measure of similarity. However because calculating the secondary type is more computationally expensive as compared to the first, only calculating the secondary type when required (e.g., to break a tie) improves efficiency.

At 2216, the secondary type of calculated measures of similarity are used to identify which of the tied new version content item identifiers most closely matches the previous version content item identifier. For example, the highest value of the secondary type of calculated measures of similarity is identified and the new version content item identifier corresponding to the highest value is identified as most closely matching the previous version content item identifier. In some embodiments, if there is still a tie for most closely matching the previous version content item identifier among a plurality of the new version content item identifiers, the process proceeds to 2220.

At 2218, it is determined whether the calculated measure similarity corresponding to the most closely matched new version content item identifier meets a threshold. For example, it is determined whether the calculated measure similarity (e.g., either type of calculated measure similarity) is greater than a threshold value (e.g., different threshold values for the different types of calculated measure similarity). For example, if the most closely matched new version content item identifier is not similar enough to the previous version content item identifier as indicated by a low value for the calculated measure of similarity, the previous version content item identifier likely does not correspond to any of the new version content item identifiers.

If at 2218, it is determined that the calculated measure similarity corresponding to the most closely matched new content item identifier does not meet the threshold, at 2220 the user provided content is identified as not to be migrated/rolled-forward. For example, the user provided content is indicated as not being migrated/rolled forward in the interface shown in screenshot 2028 of FIG. 20N.

If at 2218, it is determined that the calculated measure similarity corresponding to the most closely matched new content item identifier does meet the threshold, at 2222, the user provided content is identified as to be migrated/rolled-forward. For example, the user provided content is indicated being migrated/rolled-forward in the example migration/roll-forward plan shown in screenshot 2026 of FIG. 20M. The user may confirm the indication to migrate/roll forward the user provided content after making any desired changes to the plan (e.g., change whether to migrate/roll-forward or change migration/roll-forward destination).

In some embodiments, migrating/rolling-forward the user provided content includes copying content included in the user provided content from data storage of the previous version content item to data storage of the corresponding new version content item. In some embodiments, migrating/rolling-forward the user provided content includes associating the user provided content with the corresponding new version content item. In some embodiments, migrating/rolling-forward the user provided content includes displaying the user provided content as belonging to the corresponding new version content item (e.g., display under corresponding procedure of a new webpage for a new version of the audit). In some embodiments, migrating/rolling-forward the user provided content includes modifying data and/or metadata of the user provided content prior to copying the user provided content. For example, a filename, a timestamp, a creation time, a creator identifier, a date/time identifier, a version identifier, and/or any other included content or metadata may be modified to reflect the migration/roll-forward. In some embodiments, migrating/rolling-forward the user provided content includes replacing/deleting content of the corresponding new version content item. For example, when rolling forward leadsheets, all leadsheets in the new audit are deleted prior to copying the leadsheets from the prior version of the audit.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for automatically migrating computer content, comprising:
   identifying, using a processor, a user provided content provided via the Internet, wherein the user provided content belongs to a previous version content item of a content page accessible via the Internet;
   generating, using the processor, a previous version content item identifier for the previous version content item by combining a content from a title of the previous version content item and a content from a description text of the previous version content item;
   generating, using the processor, a new version content item identifier for each content item of a plurality of content items belonging to a new version of the content page, by combining a content from a title of the corresponding content item belonging to the new version and a content from a description text of the corresponding content item belonging to the new version;
   calculating, using the processor, measures of similarity between the previous version content item identifier and each of the new version content item identifiers;
   using the calculated measures of similarity to identify which of the new version content item identifiers most closely matches the previous version content item identifier;
   determining, using the processor, whether the calculated measure of similarity corresponding to the most closely matched new version content item identifier meets a threshold, comprising:
      determining whether the calculated measures indicates that there is a tie among a plurality of the new version content item identifiers for most closely matching the previous version content item identifier; and
      in response to a determination that the calculated measures indicates that there is a tie among the plurality of the new version content item identifiers for most closely matching the previous version content item identifier:
         calculating secondary measures of similarity between the previous version content item identifier and each of the tied new version content item identifiers;
         using the calculated secondary measures of similarity to identify which of the tied new version content item identifiers most closely matches the previous version content item identifier;
         determining whether a calculated secondary measure of similarity corresponding to the most closely matched tied new version content item identifier meets the threshold; and
         in response to a determination that the calculated secondary measure of similarity corresponding to the most closely matched tied new version content item identifier does not meet the threshold, determining that the most closely matched new version content item identifier does not meet the threshold; and
      in the event that the calculated measure of similarity corresponding to the most closely matched new version content item identifier meets the threshold, identifying, using the processor, the user provided content for automatic migration to the new version's content item corresponding to the most closely matched new version content item identifier.

2. The method of claim 1, wherein the user provided content includes a text comment provided by a user.

3. The method of claim 1, wherein the user provided content includes a computer file provided by a user.

4. The method of claim 1, wherein the previous version content item is one a plurality of content items on the content page.

5. The method of claim 1, wherein the previous version content item tracks a progress of a procedure.

6. The method of claim 1, wherein the content page is a protected webpage only accessible by authorized users.

7. The method of claim 1, wherein combining the content from the title of the previous version content item and the content from the description text of the previous version content item includes concatenating the title of the previous version content item and the description text of the previous version content item to form a string as the previous version content item identifier.

8. The method of claim 1, wherein the previous version content item identifier and each of the new version content item identifiers have been normalized by removing all characters that are not alphanumeric and unifying capitalization cases.

9. The method of claim 1, wherein calculating the measures of similarity includes determining a total number of unique bigrams in the previous version content item identifier, determining a total number of unique bigrams for each of the new version content item identifiers, and comparing the unique bigrams of the previous version content item identifier with the unique bigrams for each of the new version content item identifiers.

10. The method of claim 1, wherein the calculated measure of similarity is a value that can only range between zero and one.

11. The method of claim 1, wherein using the calculated measures of similarity to identify which of the new version content item identifiers most closely matches the previous version content item identifier includes identifying a highest value of the calculated measures of similarity.

12. The method of claim 1, wherein calculating the secondary measures of similarity includes determining numbers of transpositions between the previous version content item and each of the tied new version content item identifiers.

13. The method of claim 1, wherein in the event that the calculated measure of similarity corresponding to the most closely matched new version content item identifier does not meet the threshold, the user provided content is identified as not being automatically migrated.

14. The method of claim 1, wherein identifying the user provided content for automatic migration includes presenting for verification to a user, an automatically generated migration plan.

15. The method of claim 14, wherein the migration plan is able to be modified by the user.

16. A system for automatically migrating computer content, comprising:

a processor configured to:
identify a user provided content provided via the Internet, wherein the user provided content belongs to a previous version content item of a content page accessible via the Internet;
generate a previous version content item identifier for the previous version content item by combining a content from a title of the previous version content item and a content from a description text of the previous version content item;
generate a new version content item identifier for each content item of a plurality of content items belonging to a new version of the content page, by combining a content from a title of the corresponding content item belonging to the new version and a content from a description text of the corresponding content item belonging to the new version;
calculate measures of similarity between the previous version content item identifier and each of the new version content item identifiers;
use the calculated measures of similarity to identify which of the new version content item identifiers most closely matches the previous version content item identifier;
determine whether the calculated measure of similarity corresponding to the most closely matched new version content item identifier meets a threshold, comprising to:
determine whether the calculated measures indicates that there is a tie among a plurality of the new version content item identifiers for most closely matching the previous version content item identifier; and
in response to a determination that the calculated measures indicates that there is a tie among the plurality of the new version content item identifiers for most closely matching the previous version content item identifier:
calculate secondary measures of similarity between the previous version content item identifier and each of the tied new version content item identifiers;
use the calculated secondary measures of similarity to identify which of the tied new version content item identifiers most closely matches the previous version content item identifier;
determine whether a calculated secondary measure of similarity corresponding to the most closely matched tied new version content item identifier meets the threshold; and
in response to a determination that the calculated secondary measure of similarity corresponding to the most closely matched tied new version content item identifier does not meet the threshold, determine that the most closely matched new version content item identifier does not meet the threshold; and
in the event that the calculated measure of similarity corresponding to the most closely matched new version content item identifier meets the threshold, identify the user provided content for automatic migration to the new version's content item corresponding to the most closely matched new version content item identifier; and
a memory coupled to the processor and configured to provide the processor with instructions.

17. A computer program product for automatically migrating computer content, the computer program product being embodied in a non-transitory computer readable storage medium and comprising computer instructions for:
identifying a user provided content provided via the Internet, wherein the user provided content belongs to a previous version content item of a content page accessible via the Internet;
generating a previous version content item identifier for the previous version content item by combining a content from a title of the previous version content item and a content from a description text of the previous version content item;
generating a new version content item identifier for each content item of a plurality of content items belonging to a new version of the content page, by combining a content from a title of the corresponding content item belonging to the new version and a content from a description text of the corresponding content item belonging to the new version;
calculating measures of similarity between the previous version content item identifier and each of the new version content item identifiers;
using the calculated measures of similarity to identify which of the new version content item identifiers most closely matches the previous version content item identifier;
determining whether the calculated measure of similarity corresponding to the most closely matched new version content item identifier meets a threshold, comprising:
determining whether the calculated measures indicates that there is a tie among a plurality of the new version content item identifiers for most closely matching the previous version content item identifier; and
in response to a determination that the calculated measures indicates that there is a tie among the plurality of the new version content item identifiers for most closely matching the previous version content item identifier:
calculating secondary measures of similarity between the previous version content item identifier and each of the tied new version content item identifiers;
using the calculated secondary measures of similarity to identify which of the tied new version content item identifiers most closely matches the previous version content item identifier;
determining whether a calculated secondary measure of similarity corresponding to the most closely matched tied new version content item identifier meets the threshold; and
in response to a determination that the calculated secondary measure of similarity corresponding to the most closely matched tied new version content item identifier does not meet the threshold, determining that the most closely matched new version content item identifier does not meet the threshold; and
in the event that the calculated measure of similarity corresponding to the most closely matched new version content item identifier meets the threshold, identifying the user provided content for automatic migration to the new version's content item corresponding to the most closely matched new version content item identifier.

* * * * *

UNITED STATES PATENT AND TRADEMARK OFFICE
CERTIFICATE OF CORRECTION

PATENT NO. : 10,891,294 B1
APPLICATION NO. : 15/709311
DATED : January 12, 2021
INVENTOR(S) : Steven Riley Bong, Gary Jude Bong and Kevin Richard Bong Page 1 of 1

It is certified that error appears in the above-identified patent and that said Letters Patent is hereby corrected as shown below:

In the Specification

In Column 23, Line(s) 36, delete "$t_{yp}e$" and insert --type--, therefor.

In Column 25, Line(s) 40, delete "$t_{yp}es$" and insert --types--, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*